(12) United States Patent
Yoshizumi

(10) Patent No.: US 8,199,221 B2
(45) Date of Patent: Jun. 12, 2012

(54) IMAGE RECORDING APPARATUS, IMAGE RECORDING METHOD, IMAGE PROCESSING APPARATUS, IMAGE PROCESSING METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 12/487,180

(22) Filed: Jun. 18, 2009

(65) Prior Publication Data
US 2009/0322896 A1    Dec. 31, 2009

(30) Foreign Application Priority Data
Jun. 25, 2008    (JP) .................. 2008-166243

(51) Int. Cl.
H04N 5/76    (2006.01)
H04N 5/235    (2006.01)
(52) U.S. Cl. ................ 348/231.99; 348/222.1
(58) Field of Classification Search ........... 348/222.1, 348/231.2, 231.9, 236.1, 231.99, 207.99; 382/203
See application file for complete search history.

(56) References Cited

U.S. PATENT DOCUMENTS

| 6,614,994 B2 * | 9/2003 | Ohishi et al. ............... 396/55 |
| 2006/0210264 A1 | 9/2006 | Saga | |
| 2008/0144906 A1 * | 6/2008 | Allred et al. ............... 382/131 |
| 2008/0154907 A1 * | 6/2008 | Prasad et al. ............... 707/10 |
| 2008/0174676 A1 * | 7/2008 | Squilla et al. ............ 348/231.6 |

FOREIGN PATENT DOCUMENTS

| EP | 1 648 166 A2 | 4/2006 |
| EP | 1 648 166 A3 | 4/2006 |
| EP | 1 783 772 A2 | 5/2007 |
| EP | 7 783 772 A3 | 5/2007 |
| JP | 2006-115406 | 4/2006 |
| JP | 2006-217478 | 8/2006 |
| JP | 2008-78951 | 4/2008 |
| JP | 2009-225103 | 10/2009 |
| WO | WO 2007/004207 A2 | 1/2007 |

* cited by examiner

Primary Examiner — Trung Diep
(74) Attorney, Agent, or Firm — Oblon, Spivak, McClelland, Maier & Neustadt, L.L.P.

(57) ABSTRACT

An image recording apparatus includes an imaging unit to obtain captured image data; an image configuration determining unit to determine an appropriate image configuration; an image configuration acquisition control unit to execute image configuration acquisition control to obtain captured image data of image content having the appropriate image configuration; a capturing/recording unit to record the captured image data when the captured image data of the image content having the appropriate image configuration is obtained; a capturing history information holding unit to hold capturing history information; an image configuration exhaustion determining unit to determine whether the captured image data of the image content having the appropriate image configuration has been recorded a predetermined number of times; and a recording setting unit to prevent recording of captured image data of image content having the appropriate image configuration determined to have been recorded the predetermined number of times.

14 Claims, 43 Drawing Sheets

FACE ORIENTATION DETECTION

FIG. 19
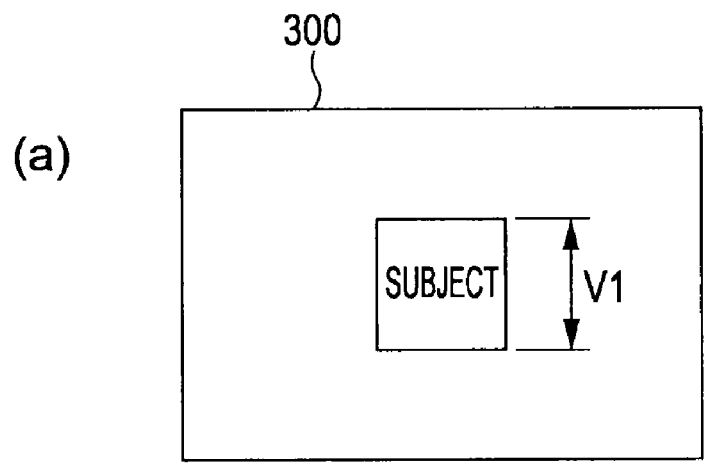
ZOOM FACTOR = Z1
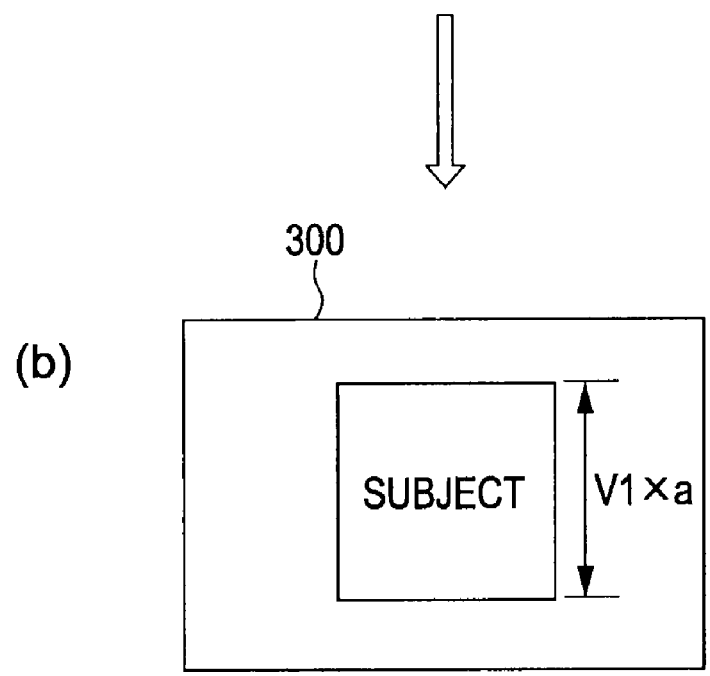
ZOOM FACTOR = Z1×a

FIG. 23

| CAPTURING HISTORY INFORMATION UNIT | | FILE NAME | CAPTURING DATE/TIME INFORMATION | PAN/TILT POSITION INFORMATION | NUMBER-OF-SUBJECTS INFORMATION | INDIVIDUAL RECOGNITION INFORMATION | IN-FRAME POSITION INFORMATION | SIZE INFORMATION | FACE ORIENTATION INFORMATION | EXPRESSION INFORMATION |
|---|---|---|---|---|---|---|---|---|---|---|
| | 1 | FILE NAME | CAPTURING DATE/TIME INFORMATION | PAN/TILT POSITION INFORMATION | NUMBER-OF-SUBJECTS INFORMATION | INDIVIDUAL RECOGNITION INFORMATION | IN-FRAME POSITION INFORMATION | SIZE INFORMATION | FACE ORIENTATION INFORMATION | EXPRESSION INFORMATION |
| | 2 | FILE NAME | CAPTURING DATE/TIME INFORMATION | PAN/TILT POSITION INFORMATION | | | | SIZE INFORMATION | FACE ORIENTATION INFORMATION | EXPRESSION INFORMATION |
| | n | FILE NAME | CAPTURING DATE/TIME INFORMATION | PAN/TILT POSITION INFORMATION | NUMBER-OF-SUBJECTS INFORMATION | INDIVIDUAL RECOGNITION INFORMATION | IN-FRAME POSITION INFORMATION | SIZE INFORMATION | FACE ORIENTATION INFORMATION | EXPRESSION INFORMATION |

FIG. 24

| | FILE NAME | CAPTURING DATE/TIME INFORMATION | PAN/TILT POSITION INFORMATION | INDIVIDUAL RECOGNITION INFORMATION |
|---|---|---|---|---|
| 1 | FILE NAME | CAPTURING DATE/TIME INFORMATION | PAN/TILT POSITION INFORMATION | INDIVIDUAL RECOGNITION INFORMATION |
| 2 | FILE NAME | CAPTURING DATE/TIME INFORMATION | PAN/TILT POSITION INFORMATION | INDIVIDUAL RECOGNITION INFORMATION |
| n | FILE NAME | CAPTURING DATE/TIME INFORMATION | PAN/TILT POSITION INFORMATION | INDIVIDUAL RECOGNITION INFORMATION |

CAPTURING HISTORY INFORMATION UNIT

FIG. 25

| | INDIVIDUAL SUBJECT ID | INDIVIDUAL FEATURE PARAMETERS | IN-FRAME POSITION INFORMATION | SIZE INFORMATION | FACE ORIENTATION INFORMATION | EXPRESSION INFORMATION |
|---|---|---|---|---|---|---|
| 1 | INDIVIDUAL SUBJECT ID | INDIVIDUAL FEATURE PARAMETERS | IN-FRAME POSITION INFORMATION | SIZE INFORMATION | FACE ORIENTATION INFORMATION | EXPRESSION INFORMATION |
| 2 | INDIVIDUAL SUBJECT ID | INDIVIDUAL FEATURE PARAMETERS | | | | |
| m | INDIVIDUAL SUBJECT ID | INDIVIDUAL FEATURE PARAMETERS | IN-FRAME POSITION INFORMATION | SIZE INFORMATION | FACE ORIENTATION INFORMATION | EXPRESSION INFORMATION |

INDIVIDUAL RECOGNITION INFORMATION UNIT

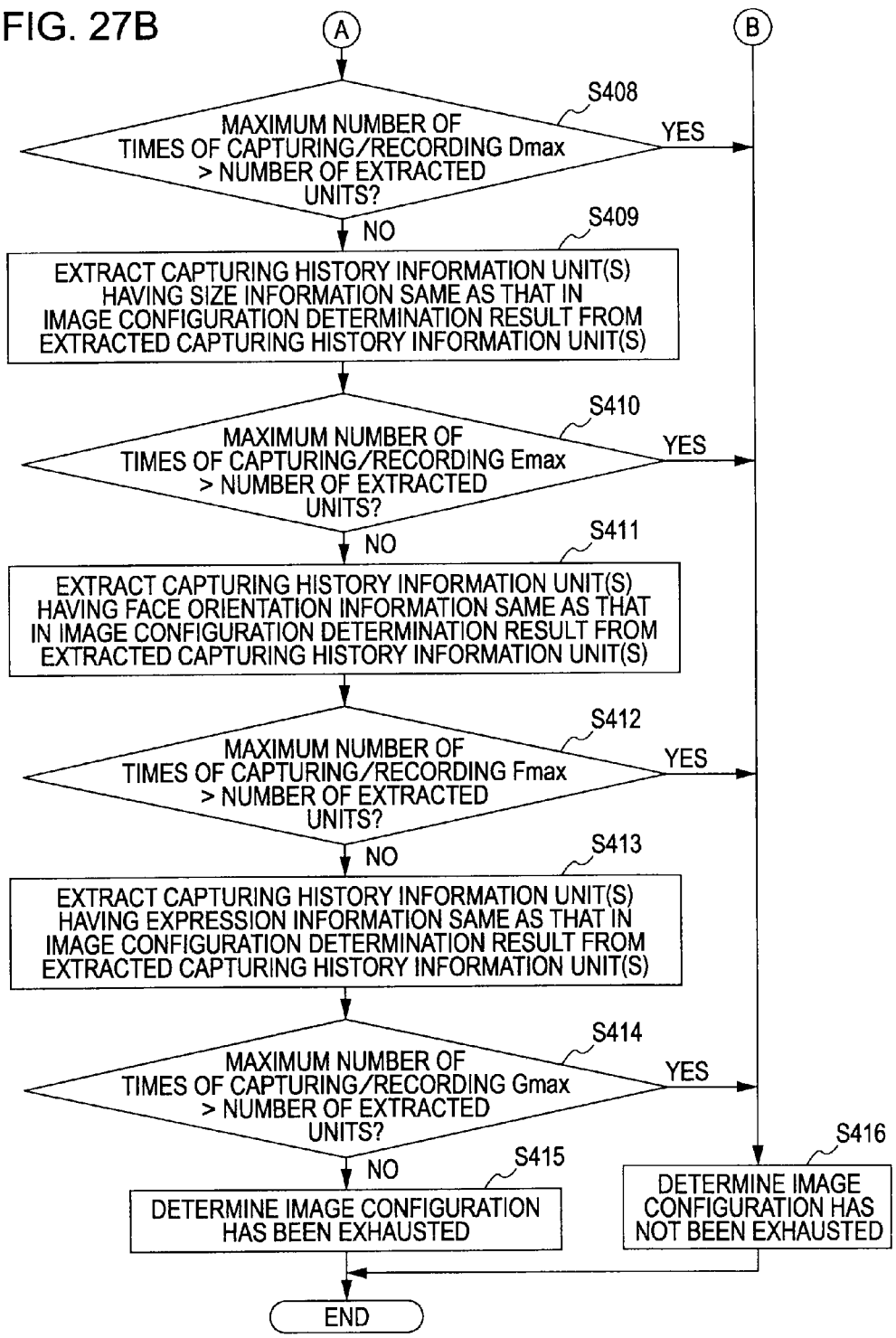

FIG. 31

| REGISTERED DATA UNIT | INDIVIDUAL SUBJECT ID | FEATURE PARAMETER 1 | FEATURE PARAMETER 2 | ... | FEATURE PARAMETER j | MAIN SUBJECT INFORMATION |
|---|---|---|---|---|---|---|
| 1 | | | | | | |
| 2 | | | | | | |
| ... | | | | | | |
| i | | | | | | |

IMAGE RECORDING APPARATUS, IMAGE RECORDING METHOD, IMAGE PROCESSING APPARATUS, IMAGE PROCESSING METHOD, AND PROGRAM

BACKGROUND OF THE INVENTION

1. Field of the Invention

The present invention relates to an image recording apparatus and an image recording method to record captured image data. Also, the present invention relates to an image processing apparatus and an image processing method to execute a determining process on image content of captured image data. Also, the present invention relates to programs executed by the image recording apparatus and the image processing apparatus.

2. Description of the Related Art

In the field of an imaging apparatus such as a digital still camera, a digital still camera to detect a smile of a subject as a person and then automatically execute capturing and recording (hereinafter capturing/recording) has been becoming widespread.

For example, Patent Document 1 (Japanese Unexamined Patent Application Publication No. 2006-217478) describes a structure of automatically determining a plurality of images to form a panorama image by calculating the amount of movement of an image capturing apparatus by using a detection result output from a gyro unit or a GPS (Global Positioning System) unit provided in the image capturing apparatus and then capturing/recording the images.

Such a structure has a function of automatically determining the content of an image appropriate to be captured/recorded when capturing/recording is automatically executed.

SUMMARY OF THE INVENTION

For easy understanding, assume the state where an imaging apparatus is set at a fixed point and then capturing by an automatic capturing function based on the above-described smile detection is continued. In this case, images having similar content are captured/recorded: a subject with a smiling face is taken in the same composition repeatedly, unless the person as a subject is intentionally changed.

According to Patent Document 1, images having different content can be automatically captured/recorded on the basis of the amount of movement of the image capturing apparatus. The structure according to Patent Document 1 is surely effective to obtain images to form a panorama image, but is not suitable for ordinary capturing/recording with a person as a subject other than a panorama image, because the structure depends on only the amount of movement of the image capturing apparatus.

Accordingly, the present invention is directed to providing a structure to determine image content in order to prevent images of similar content from being redundantly obtained.

An image recording apparatus according to an embodiment of the present invention includes: an imaging unit for obtaining captured image data through capturing; image configuration determining means for determining an appropriate image configuration on the basis of image content of the captured image data; image configuration acquisition control means for executing image configuration acquisition control to obtain captured image data of image content having the appropriate image configuration determined by the image configuration determining means; capturing/recording means for recording the captured image data on a storage medium at timing when the captured image data of the image content having the appropriate image configuration is obtained through execution of the image configuration acquisition control; capturing history information holding means for holding capturing history information that is information about image configurations of respective pieces of captured image data recorded by the capturing/recording means; image configuration exhaustion determining means for determining whether the captured image data of the image content having the appropriate image configuration same as the appropriate image configuration determined by the image configuration determining means has been recorded a predetermined number of times by referring to the capturing history information; and recording setting means for preventing recording by the capturing/recording means of captured image data of image content having the appropriate image configuration that is determined to have been recorded the predetermined number of times by the image configuration exhaustion determining means.

Here, the image configuration means a state of specific elements determining image content in a frame, or image content that is actually formed in accordance with the state of the specific elements, as described below.

In the above-described structure, an image configuration regarded as appropriate (appropriate image configuration) is determined on the basis of image content of captured image data. Then, image content of captured image data having the determined appropriate image configuration is actually obtained, the captured image data can be recorded. That is, an image having favorable image content can be automatically captured/recorded.

When captured image data having the image configuration same as the determined appropriate image configuration has been recorded the predetermined number of times, the captured image data having the determined appropriate image configuration is not recorded.

In this way, according to an embodiment of the present invention, when captured images having favorable image content are automatically recorded, many images having a similar image configuration can be prevented from being recorded.

BRIEF DESCRIPTION OF THE DRAWINGS

FIG. 19 illustrates a first example of changing an image configuration determining algorithm;

FIG. 23 illustrates an example of a structure of capturing history information in the imaging system of the embodiment;

FIG. 24 illustrates another example of the structure of the capturing history information in the imaging system of the embodiment;

FIG. 25 illustrates another example of the structure of the capturing history information in the imaging system of the embodiment;

FIG. 31 illustrates an example of a structure of an individual registration table;

DESCRIPTION OF THE PREFERRED EMBODIMENTS

Hereinafter, in the description given about a best mode to carry out the invention (hereinafter referred to as an embodiment), the following terms are used: composition; frame; angle of view; capturing view angle; and image configuration.

"Composition" is also called framing and is a positioning state (including the size and orientation) of a subject in a frame.

"Frame" is an area range corresponding to one screen within which an image is placed and typically has a vertically-long or horizontally-long rectangular outer shape.

"Angle of view" is also called a zoom angle and is an angle defining the range of a frame determined by the position of a zoom lens in an optical system of an imaging apparatus. Typically, the angle of view depends on a focal length of an imaging optical system and the size of an imaging plane (image sensor or a film). Here, an element that is changeable depending on a focal length is called an angle of view.

"Capturing view angle" is the range defined by a frame of an image obtained through capturing by an imaging apparatus placed at a fixed position, the range being determined by an angle in a pan (horizontal) direction and an angle in a tilt (vertical) direction (elevation angle and depression angle) in addition to the above-described angle of view.

For example, the composition means a positioning state of a subject existing within a frame defined by the capturing view angle.

"Image configuration" includes the above-described composition and is a state of a specific element determining image content in a frame or image content actually formed in accordance with the state of the specific element.

For example, assume that there are two images both of which have the same subject of the same person and the same composition. In this case, the expression of the person as a subject is included in an element forming image content. Also, assume that the subject in one of the two images is smiling and the subject in the other is not smiling. In this case, the two images have the same composition but have different image configurations.

Before describing a structure of an apparatus according to the embodiment, an effect to be obtained by the embodiment is described with reference to FIGS. 1A and 1B.

A description is given below with reference to FIGS. 1A and 1B under the assumption that an imaging apparatus such as a digital still camera automatically executes capturing and recording (hereinafter capturing/recording) of an image when the content of the image to be obtained through capturing satisfies a predetermined condition.

Figure 1A:
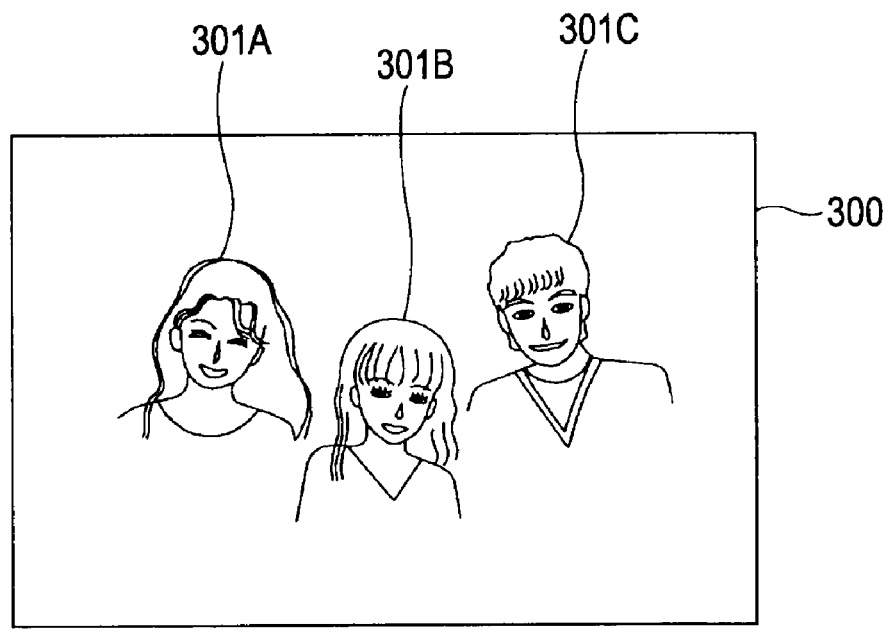
FIGS. 1A and 1B illustrate comparison of two pieces of image content that can be determined to have a same image configuration as an image obtained through capturing.

FIG. 1A illustrates an example of content of an image obtained through capturing, that is, the state where three subjects 301A, 301B, and 301C exist in a frame 300.

In such a case where the three subjects are detected by the imaging apparatus, the condition for capturing/recording is satisfied when the subjects 301A, 301B, and 301C are evenly positioned in vertical and horizontal directions in the frame 300 and when the sizes of the subjects are within a predetermined range.

The image illustrated in FIG. 1A satisfies such a condition. Thus, the imaging apparatus captures/records the image of this image configuration when obtaining the image configuration illustrated in FIG. 1A.

Figure 1B:
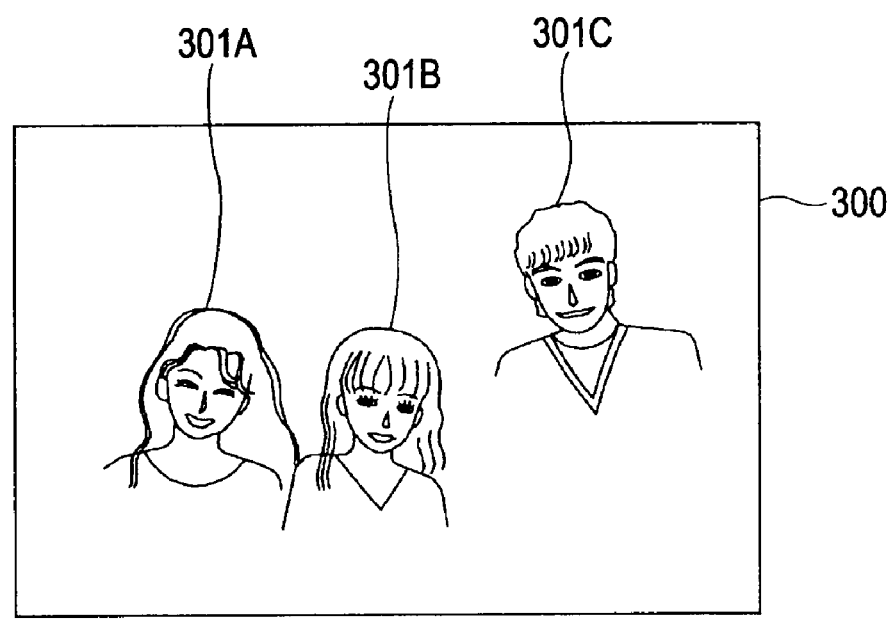

Also, assume that the imaging apparatus detects the same subjects 301A, 301B, and 301C illustrated in FIG. 1B thereafter. The image content illustrated in FIG. 1B is not the same as that illustrated in FIG. 1A in a strict meaning, but satisfies the condition of the case where three subjects are detected. Thus, the imaging apparatus captures/records the image illustrated in FIG. 1B.

As can be understood from the description given above, in the case where automatic capturing/recording is executed when an image satisfies the specific condition of image content, many similar images are captured unless the content including a subject of the images captured by the imaging apparatus is not intentionally changed. This is not interesting for a user who sees the captured images. Furthermore, the similar images are captured/recorded redundantly and wastefully, and thus the space of a recording medium is wasted.

Accordingly, the embodiment suggests a structure to prevent similar images from being redundantly captured, as described below.

Figure 2:
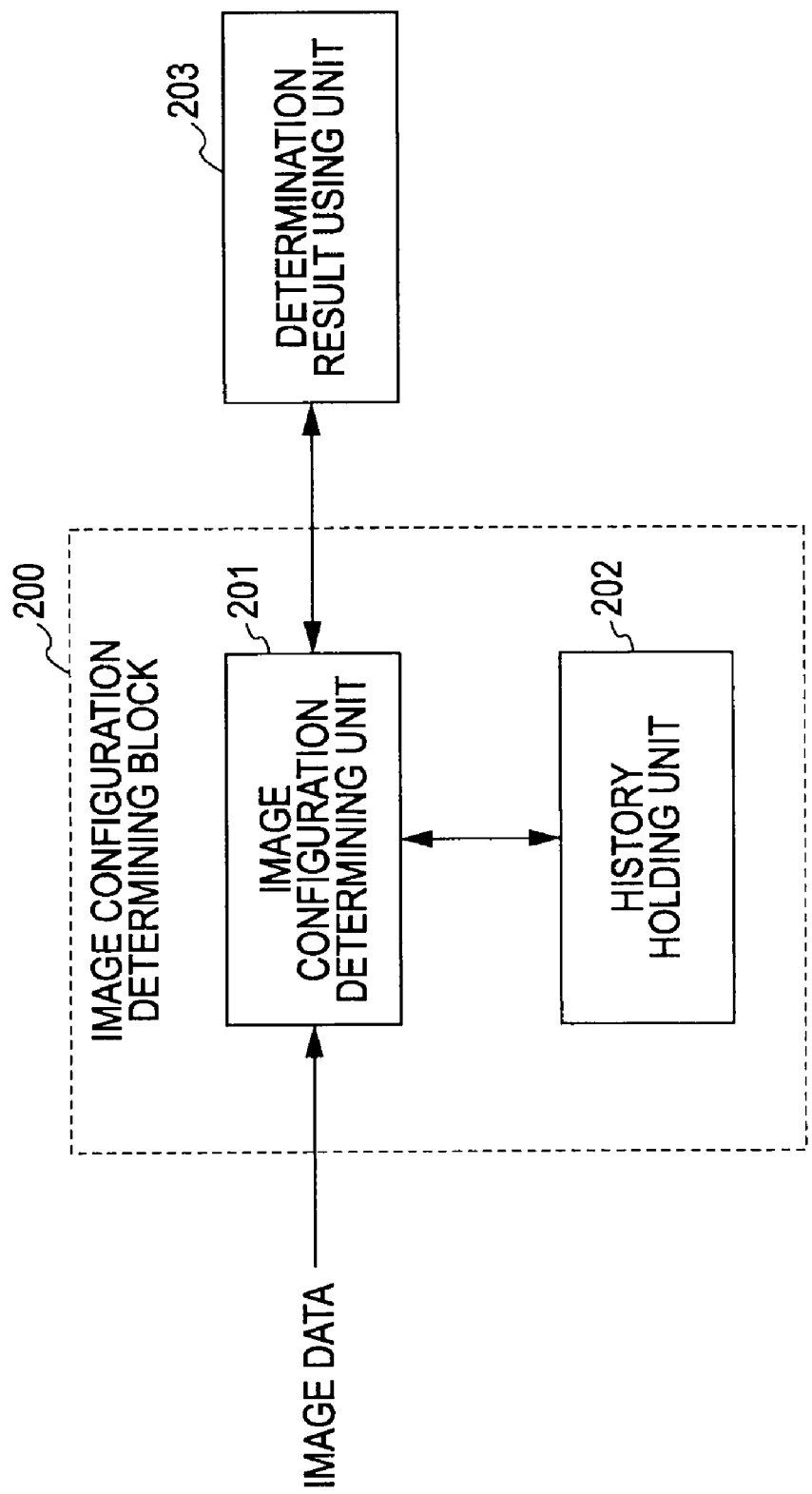
FIG. 2 illustrates an example of a basic structure of an image configuration determining block according to an embodiment.

FIG. 2 conceptually illustrates an example of the most basic structure according to the embodiment.

FIG. 2 illustrates an image configuration determining block 200. The image configuration determining block 200 takes in image data and executes an image configuration determining process, and includes an image configuration determining unit 201 and a history holding unit 202 as illustrated in FIG. 2.

In addition to the image configuration determining block 200, a determination result using unit 203 is illustrated here. The determination result using unit 203 executes a predetermined operation by using a determination result about an image configuration obtained from the image configuration determination block 200. The image configuration determining block 200 controls the process and operation executed by the determining result using unit 203 in accordance with an image configuration determination result obtained through an image configuration determining process executed by the image configuration determining block 200.

Actually, the determination result using unit 203 varies depending on the application of the image configuration determining block 200 illustrated in FIG. 2. For example, when the image configuration determining block 200 is applied to automatic capturing/recording in an imaging apparatus such as a digital still camera, the determination result using unit 203 serves as a capturing/recording unit to record captured image data having image content according to an image configuration determination result in the imaging apparatus.

In the image configuration determining block 200, the image configuration determining unit 201 takes in image data and executes an image configuration determining process to determine an image configuration that can be obtained from the image content and that can be regarded as appropriate (appropriate image configuration) on the basis of the image content of the image data that has been taken in. Then, information of a determination result of the image configuration determining process is obtained.

The image configuration determining process executed by the image configuration determining unit 201 can be realized when a CPU (Central Processing Unit) or the like executes a program. That is, the image configuration determining process can be realized by software. In accordance with necessity, an image signal process by software or hardware may be executed together.

As described above, the determination result using unit 203 executes a predetermined operation in accordance with an image configuration determination under control by the image configuration determining unit 201 according to an image configuration determination result, and executes a predetermined operation by using information of the image configuration determination result.

For example, assume that the determination result using unit 203 is the above-described capturing/recording unit. In this case, the image configuration determining unit 201 controls the determination result using unit 203 so as to obtain image content of captured image data having an appropriate image configuration according to a determination result of the image configuration determining process, and then allows the determination result using unit 203 to execute capturing/recording at the timing when an appropriate image configuration is obtained.

Also, after completing the operation of the determination result using unit 203 reflecting the image configuration determination result as described above, the image configuration determining unit 201 allows the history holding unit 202 to store and hold information of the determination result used at this time (determination result usage information). Accordingly, a set of determination result usage information held in the history holding unit 202 forms determination result usage history information.

Figure 3:
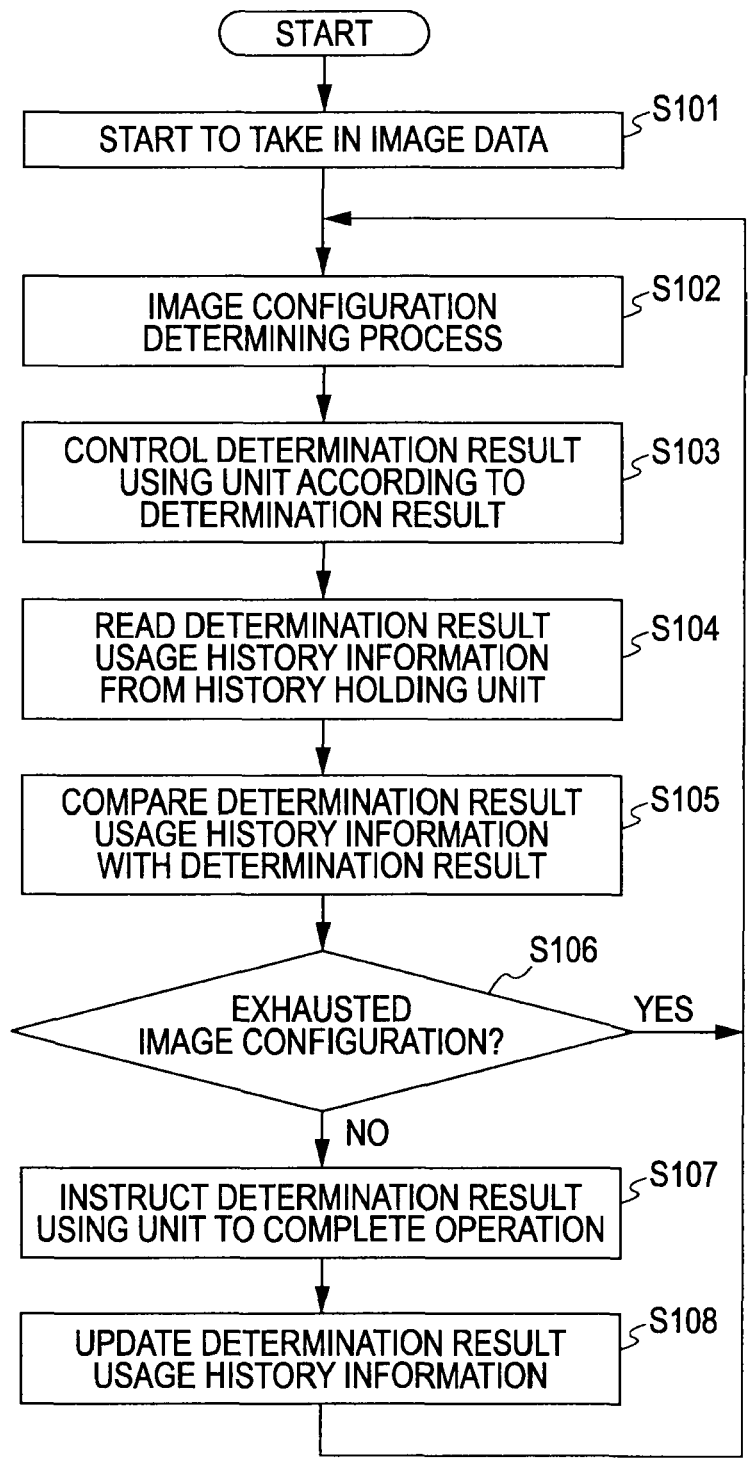
FIG. 3 is a flowchart illustrating an example of a process procedure executed by the image configuration determining block illustrated in FIG. 2.

FIG. 3 illustrates an example of a process procedure executed by the image configuration determining block 200 illustrated in FIG. 2. In the following description, respective steps are executed by the image configuration determining unit 201 in the image configuration determining block 200.

In step S101, the image configuration determining unit 201 starts to take in image data.

In step S102, the image configuration determining unit 201 executes the above-described image configuration determining process by using the image data that has been taken in.

Accordingly, the image configuration determining unit 201 obtains, as a determination result (image configuration determination result), information indicating a state of a predetermined parameter (image configuration forming element) to satisfy a condition as an appropriate image configuration.

In step S103, the image configuration determining unit 201 controls the determination result using unit 203 so that the image configuration determination result obtained in step S102 is reflected. For example, when the determination result using unit 203 is the above-described capturing/recording unit, the image configuration determining unit 201 controls the capturing/recording unit so as to obtain image content of the image configuration obtained as the determination result.

In step S104, the image configuration determining unit 201 obtains the determination result usage history information by reading it from the history holding unit 202. In step S105, the image configuration determining unit 201 compares the determination result of the image configuration obtained in step S102 with pieces of determination result usage information forming the determination result usage history information. The determination result of the image configuration compared here may include a result of an operation according to the control in step S103 and information (parameters) indicating the states of various setting items obtained in the determination result using unit 203, in addition to the information corresponding to the determination result itself obtained in the image configuration determining process in step S102. For example, in the above-described capturing/recording unit, the parameters can be camera setting information, such as a position of a zoom lens (angle of view), aperture, shutter speed, and white balance.

Then, on the basis a result of the comparison in step S105, the image configuration determining unit 201 determines in step S106 whether the image configuration indicated by the determination result obtained in step S102 has been exhausted.

Here, "exhausted" means that the determination result using unit 203 has executed completion of an operation using a determination result of an image configuration having the same content a predetermined number of times.

As can be understood from the description given above, the determination result usage information that forms the determination result usage history information held in the history holding unit 202 indicates the determination result of the image configuration that was used by the determination result using unit 203 to complete a predetermined operation. Thus, as a result of the comparison in step S105, if the number of pieces of the determination result usage information having the same content (or having approximation within a predetermined range) as the determination result of the image configuration obtained in step S102 is the same as or larger than the above-described predetermined number of times, a positive determination result is obtained in step S106.

On the other hand, as a result of the comparison in step S105, if the number of pieces of the determination result usage information having the same content (or having approximation within a predetermined range) as the determination result of the image configuration obtained in step S102 is smaller than the above-described predetermined number of times, a negative determination result is obtained in step S106.

If it is determined in step S106 that the image configuration has not been exhausted and a negative determination result is obtained, the process proceeds to step S107, where the image configuration determining unit 201 instructs the determination result using unit 203 to complete the operation executed by the control in step S103. Accordingly, the determination result using unit 203 completes the operation, thereby causing an operation result on which the image configuration determined in step S102 is reflected. For example, when the determination result using unit 203 is the above-described capturing/recording unit, the image configuration determining unit 201 provides instructions to record captured image data as instructions to complete the operation in step S107. In response to the instructions, the capturing/recording unit executes an operation of recording the captured image data obtained at the time, i.e., the captured image data that is obtained at the time by the control in step S103 and that has the image content of the determined image configuration, on a recording medium. Accordingly, the operation of recording the image data of the image configuration according to the determination result on a recording medium is completed.

After completion of the operation of the determination result using unit 203, the image configuration determining unit 201 updates the determination result usage history information held in the history holding unit 202. That is, the image configuration determining unit 201 registers information indicating the determination result obtained in step S102 as new determination result usage information in the determination result usage history information. The determination result usage information may include information of the above-described parameters that are set in the determination result using unit 203 in accordance with the control in step S103.

On the other hand, if it is determined in step S106 that the image configuration has been exhausted and a positive determination result is obtained, steps S107 and S108 are not executed and the process returns to step S102, where the image configuration determining process is executed.

According to this process, if the state where no significant change occurs in the image configuration of the taken image data continues thereafter, a positive determination result is obtained in step S106, so that the determination result using unit 203 does not complete and set an operation on which a determination result is reflected. In other words, the determination result using unit 203 does not repeat completion of an operation according to a determination result of the same appropriate image configuration more than necessary.

If the image content of taken image data changes at some time, a determination result about an appropriate image configuration according to the new image content is obtained even in the image configuration determining process based on the same algorithm. At this time, a negative determination result is obtained in step S106, so that an image configuration determination result about the new image content is output.

In the example illustrated in FIG. 3, if it is determined in step S106 that the image configuration has been exhausted and a positive determination result is obtained, the process returns to step S102 to execute the image configuration determining process. Alternatively, the image configuration determining process may not be executed thereafter. In this case, too, it can be prevented that the determination result using unit 203 executes and completes an operation on which a determination result of a similar image configuration is reflected more than a necessary number of times.

Figure 4:
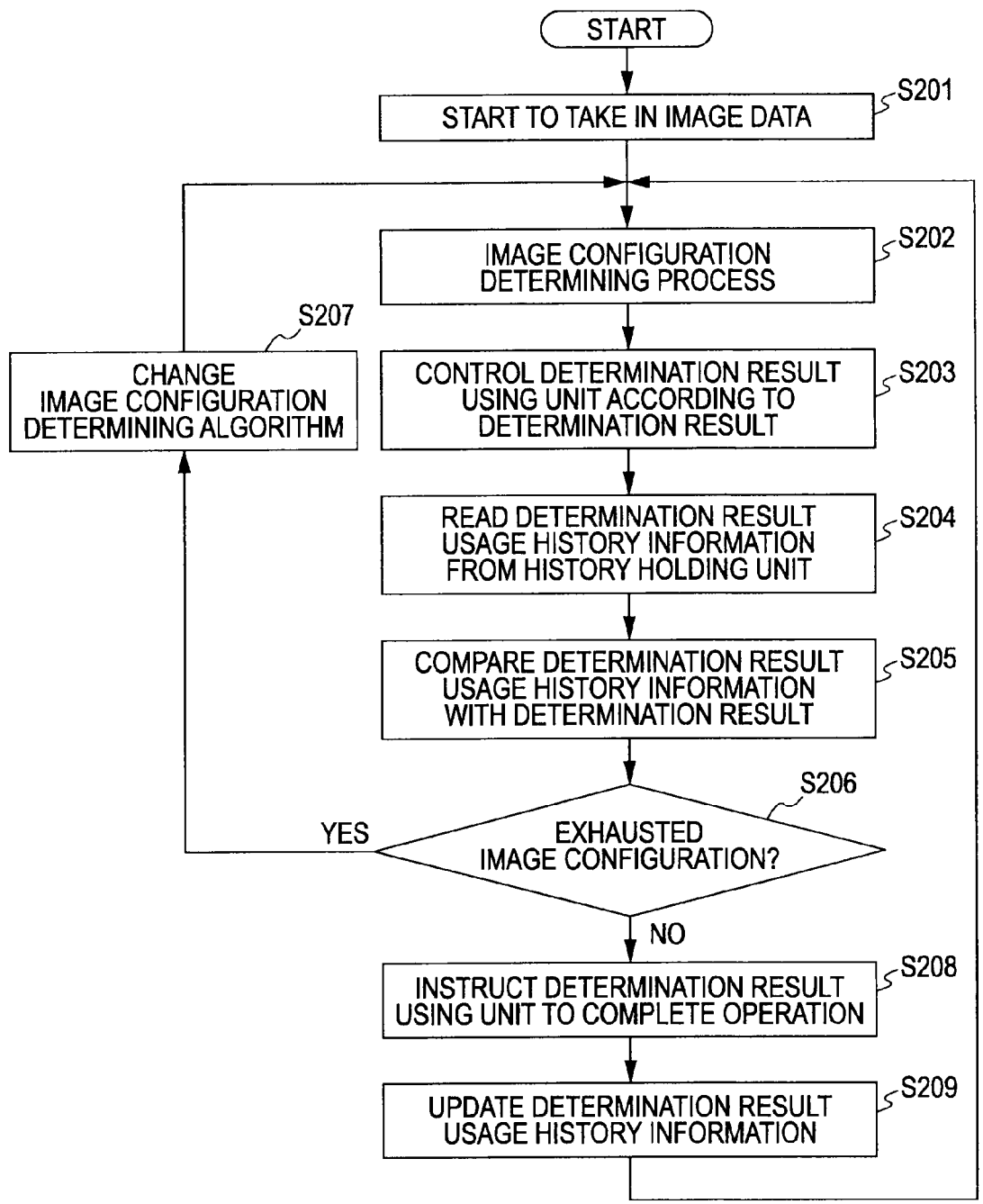
FIG. 4 is a flowchart illustrating another example of the process procedure executed by the image configuration determining block illustrated in FIG. 2.

FIG. 4 illustrates another example of the process procedure executed by the image configuration determining block 200 illustrated in FIG. 2. In this example, too, respective steps are executed by the image configuration determining unit 201 in the image configuration determining block 200.

Steps S201 to S206 and steps S208 and S209 in FIG. 4 are the same as steps S101 to S108 in FIG. 3.

Note that, in the process procedure in FIG. 4, if a positive determination result is obtained in a process of determining whether the image configuration has been exhausted in step S206, step S207 is executed and then the process returns to step S202.

In this example, the image configuration determining unit 201 has a plurality of algorithms for the image configuration determining process (image configuration determining algorithms), appropriately selects one of the image configuration determining algorithms, and can execute the image configuration determining process based on the selected image configuration determining algorithm.

Then, in step S207, the image configuration determining unit 201 changes the image configuration determining algorithm that is currently set to another image configuration determining algorithm. Accordingly, when the process returns to step S202, the image configuration determining process based on the different image configuration determining algorithm is executed.

In the structure illustrated in FIG. 2, an exhausted image configuration is continuously obtained as determination result as long as a significant change in image content (e.g., change of subject) does not occur in the image taken into the image configuration determining unit 201.

On the other hand, if the image configuration determining algorithm is changed in accordance with acquisition of a determination result of an exhausted image configuration as in FIG. 4, the determination result using unit 203 can execute an operation by reflecting an appropriate image configuration different from a previous configuration even if the image content of taken image data has no significant change.

For example, when the determination result using unit 203 is a capturing/recording unit, a plurality of captured images on which determination results of different image configurations are reflected can be recorded even if the image content of image data obtained through capturing has no significant change.

Next, a description is given about an imaging system including a digital still camera and a pan/tilt head to which the digital still camera is attached, as a more specific example applying the structure to determine an image configuration described above with reference to FIGS. 2 to 4. The imaging system according to this embodiment is capable of capturing/recording a still image having image content on which a determined image configuration is reflected.

Figure 5:
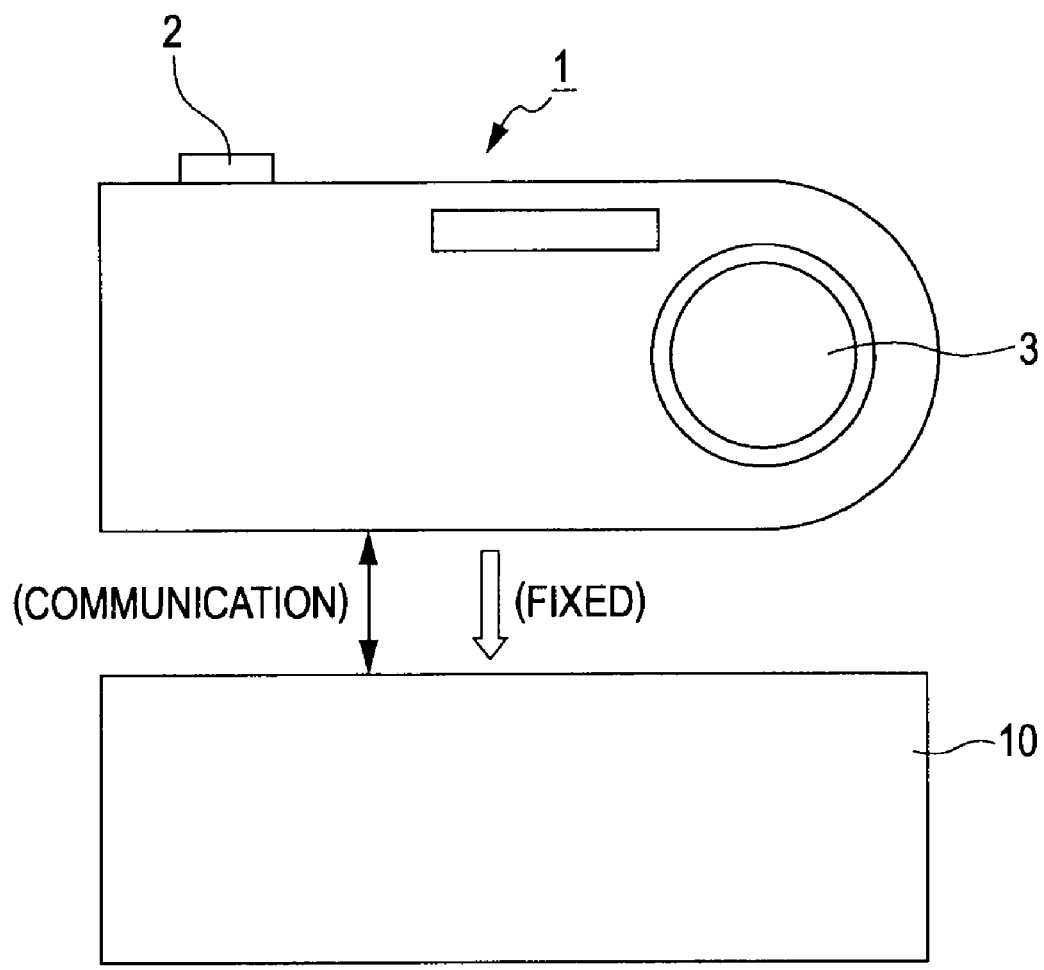
FIG. 5 illustrates a digital still camera and a pan/tilt head included in an imaging system according to the embodiment.

FIG. 5 is a front view illustrating an example of an outer structure of the imaging system according to this embodiment.

As illustrated in FIG. 5, the imaging system of this embodiment includes a digital still camera 1 and a pan/tilt head 10.

The digital still camera 1 is capable of generating still image data on the basis of imaging light obtained through capturing by a lens unit 3 provided on a panel on the front side of a main body, and storing the still image data in a storage medium loaded inside. That is, the digital still camera 1 has a function of storing an image captured as a photo as still image data in the storage medium. When such photography is manually performed, a user presses a shutter (release) button provided on a top surface of the main body.

The digital still camera 1 can be attached to the pan/tilt head 10 by fixing it. That is, the pan/tilt head 10 and the digital still camera 1 have a mechanism unit enabling mutual attachment.

The pan/tilt head 10 has a pan/tilt mechanism to move the digital still camera 1 attached thereto in both pan (horizontal) and tilt directions.

Figure 6A:
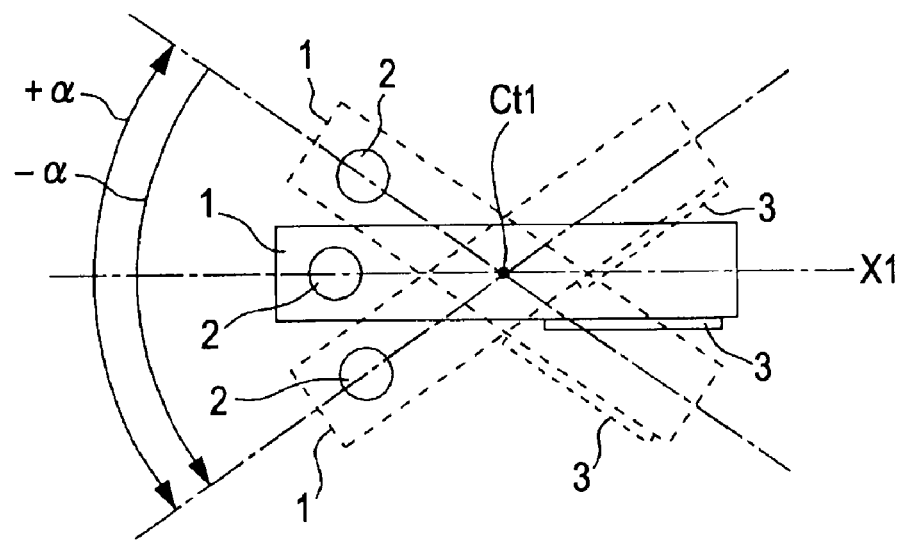
FIGS. 6A and 6B schematically illustrate an example of motions in pan and tilt directions of the digital still camera attached to the pan/tilt head in the imaging system of the embodiment.
Figure 6B:
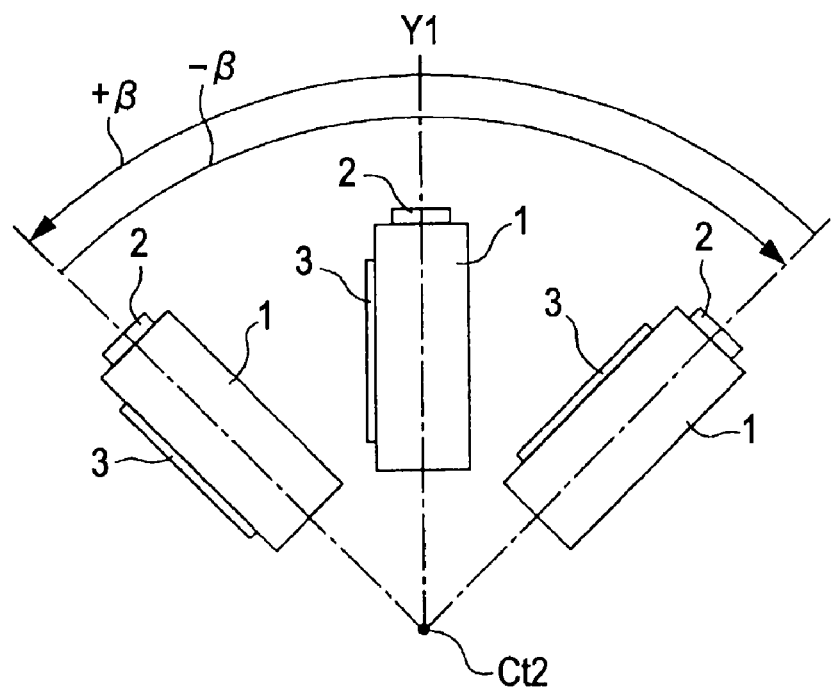

An example of movements of the digital still camera 1 in the pan and tilt directions caused by the pan/tilt mechanism of the pan/tilt head 10 is illustrated in FIGS. 6A and 6B. FIGS. 6A and 6B illustrate the digital still camera 1 attached to the pan/tilt head 10, viewed from the top and side, respectively.

Regarding the pan direction, a positional state where the lateral direction of the main body of the digital still camera 1 coincides with a straight line X1 illustrated in FIG. 6A is regarded as a reference. With this reference, when being rotated around a rotation axis Ct1 along a rotation direction $+\alpha$, a panning motion in the right direction is given to the digital still camera 1. On the other hand, when being rotated along a rotation direction $-\alpha$, a panning motion in the left direction is given to the digital still camera 1.

Regarding the tilt direction, a positional state where the longitudinal direction of the main body of the digital still camera 1 coincides with a vertical straight line Y1 illustrated in FIG. 6B is regarded as a reference. With this reference, when being rotated around a rotation axis Ct2 along a rotation direction $+\beta$, a tilting motion in the downward direction is given to the digital still camera 1. On the other hand, when being rotated along a rotation direction $-\beta$, a tilting motion in the upward direction is given to the digital still camera 1.

Maximum permissible rotation angles in the $\pm\alpha$ directions and $\pm\beta$ directions illustrated in FIGS. 6A and 6B are not described. However, the maximum permissible rotation angles should preferably be as large as possible to maximize opportunities to capture images of subjects.

Figure 7:
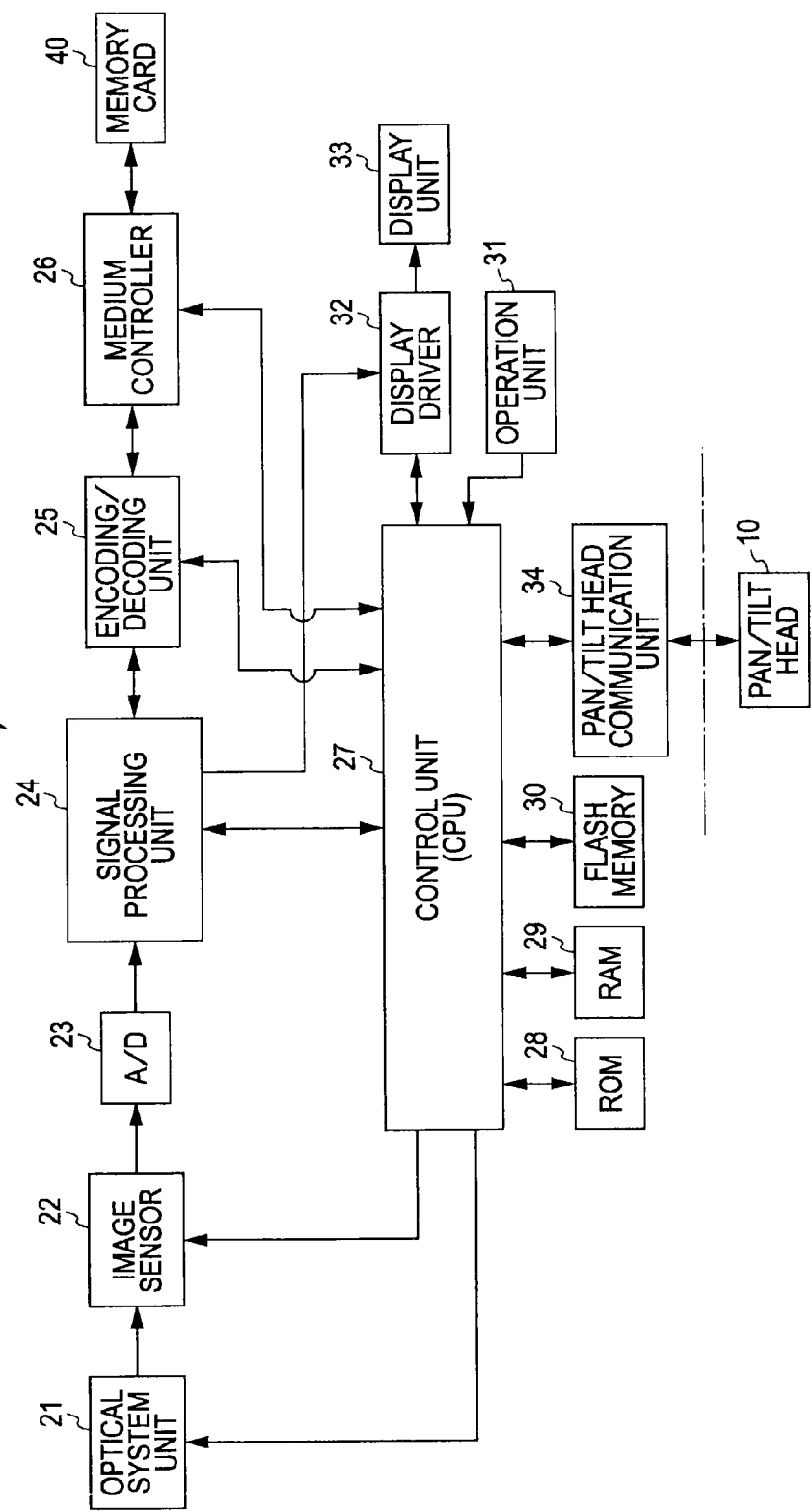
FIG. 7 is a block diagram illustrating an example of an internal structure of the digital still camera included in the imaging system of the embodiment.

FIG. 7 illustrates an example of an internal structure of the digital still camera 1.

Referring to FIG. 7, an optical system unit 21 includes an image capturing lens group including a predetermined number of lenses, such as a zoom lens and a focus lens, and an aperture. The optical system unit 21 allows incident light as imaging light to be focused on a light receiving surface of an image sensor 22.

Also, the optical system unit 21 includes a drive mechanism unit to drive the above-described zoom lens, focus lens, and aperture. The operation of the drive mechanism unit is controlled by so-called camera control executed by a control unit 27, such as zoom (angle of view) control, auto-focus adjustment control, and auto-exposure control.

The image sensor 22 performs so-called photoelectric conversion of converting the imaging light obtained in the optical system unit 21 to an electric signal. For this purpose, the image sensor 22 receives, on the light receiving surface of a photoelectric conversion device, the imaging light from the optical system unit 21, and sequentially outputs signal charges accumulated according to the intensity of received light at predetermined timing. Accordingly, an electric signal (image signal) corresponding to the imaging light is output. The photoelectric conversion device (imaging device) adopted as the image sensor 22 is not particularly limited, and can be a CMOS (Complementary Metal-Oxide Semiconductor) sensor or a CCD (Charge Coupled Device) under the present circumstances, for example. When the CMOS sensor is adopted, the device (unit) corresponding to the image sensor 22 may include an analog-digital converter corresponding to an A/D converter 23 described below.

An image signal output from the image sensor 22 is input to the A/D converter 23, is converted to a digital signal there, and is input to a signal processing unit 24.

The signal processing unit 24 takes in the digital image signal output from the A/D converter 23 in units of still images (frame images), for example. Then, the signal processing unit 24 performs predetermined signal processing on the image signal in units of still images, so as to generate captured image data (captured still image data), which is image signal data corresponding to a still image.

In the case where the captured image data generated by the signal processing unit 24 in the above-described manner is recorded as image information on a memory card 40, which is a storage medium, the captured image data corresponding to one still image is output from the signal processing unit 24 to an encoding/decoding unit 25.

The encoding/decoding unit 25 executes compression coding based on a predetermined still image compression coding method on the captured image data in units of still images output from the signal processing unit 24 and adds a header or the like in accordance with control by the control unit 27, thereby converting the captured image data to captured image data compressed in the predetermined method. Then, the encoding/decoding unit 25 transfers the captured image data generated in this way to a medium controller 26. The medium controller 26 writes and records the transferred captured image data on the memory card 40 in accordance with the control by the control unit 27. The memory card 40 used here is a storage medium that has an outer shape of a card according to a predetermined standard and that includes a nonvolatile semiconductor storage element, such as a flash memory. Alternatively, the storage medium to store image data may have a type and format other than those of the memory card.

The signal processing unit 24 according to this embodiment is capable of executing image processing to detect a subject by using captured image data. A subject detecting process in this embodiment is described below.

Also, the digital still camera 1 is capable of displaying a so-called through image, which is an image currently being captured, by allowing a display unit 33 to execute image display by using captured image data obtained in the signal processing unit 24. For example, the signal processing unit 24 takes in the image signal output from the A/D converter 23 and generates captured image data corresponding to a still image as described above. By continuing this operation, the signal processing unit 24 sequentially generates captured image data corresponding to frame images of a moving image, and then transfers the sequentially-generated captured image data to a display driver 32 in accordance with the control by the control unit 27. Accordingly, a through image is displayed.

The display driver 32 generates a drive signal to drive the display unit 33 on the basis of the captured image data input from the signal processing unit 24 in the above-described manner and outputs the drive signal to the display unit 33. Accordingly, images based on the captured image data in units of still images are sequentially displayed in the display unit 33. When those images are seen by a user, the images captured at the time are displayed in the display unit 33 like moving images. That is, through images are displayed.

Also, the digital still camera 1 is capable of reproducing captured image data recorded on the memory card 40 and displaying the image in the display unit 33.

For this purpose, the control unit 27 specifies captured image data and gives a command to read the data from the memory card 40 to the medium controller 26. In response to the command, the medium controller 26 accesses an address on the memory card 40 storing the specified captured image data, reads the data, the transfers the read data to the encoding/decoding unit 25.

The encoding/decoding unit 25 extracts substance data as compressed still image data from the captured image data transferred from the medium controller 26 in accordance with the control by the control unit 27, executes a process of decoding the compression coding on the compressed still image data, and obtains captured image data corresponding to a still image. Then, the encoding/decoding unit 25 transfers the captured image data to the display driver 32. Accordingly, the image corresponding to the captured image data recorded in the memory card 40 is reproduced and displayed in the display unit 33.

In addition to the above-described through images and reproduced images of captured image data, a user interface image can be displayed in the display unit 33. In that case, the control unit 27 generates image data to be displayed as a necessary user interface image in accordance with an operation status at the time and outputs the generated image data to the display driver 32. Accordingly, the user interface image is displayed in the display unit 33. The user interface image can be displayed as a specific menu screen separately from a through image or a reproduced image of captured image data on the display screen of the display unit 33. Alternatively, the user interface image can be displayed by being superimposed on or combined with part the through image or reproduced image of captured image data.

The control unit 27 actually includes a CPU (Central Processing Unit) and constitutes a microcomputer together with a ROM (Read Only Memory) 28 and a RAM (Random Access Memory) 29. The ROM 28 stores a program that should be executed by the CPU as the control unit 27 and various pieces of setting information related to the operation of the digital still camera 1. The RAM 29 serves as a main storage device for the CPU.

In this case, a flash memory 30 is provided as a nonvolatile storage area used to store various pieces of setting information that should be changed (rewritten) in accordance with a user operation or an operation history. When a nonvolatile memory, such as a flash memory, is adopted as the ROM 28, part of the storage area in the ROM 28 may be used instead of the flash memory 30.

An operation unit 31 includes various operation elements provided in the digital still camera 1 and an operation information signal output unit to generate an operation information signal according to an operation performed on those operation elements and output the signal to the CPU. The control unit 27 executes a predetermined process in response to the operation information signal input from the operation unit 31. Accordingly, an operation of the digital still camera 1 according to a user operation is executed.

A pan/tilt head communication unit 34 executes communication between the pan/tilt head 10 and the digital still camera 1 in accordance with a predetermined communication method. The pan/tilt head communication unit 34 has a physical-layer structure enabling transmission/reception of communication signals to/from a communication unit of the pan/tilt head 10 in a wired or wireless manner in the state where the digital still camera 1 is attached to the pan/tilt head 10, and also has a structure to realize communication corresponding to a predetermined layer higher than the physical layer.

Figure 8:
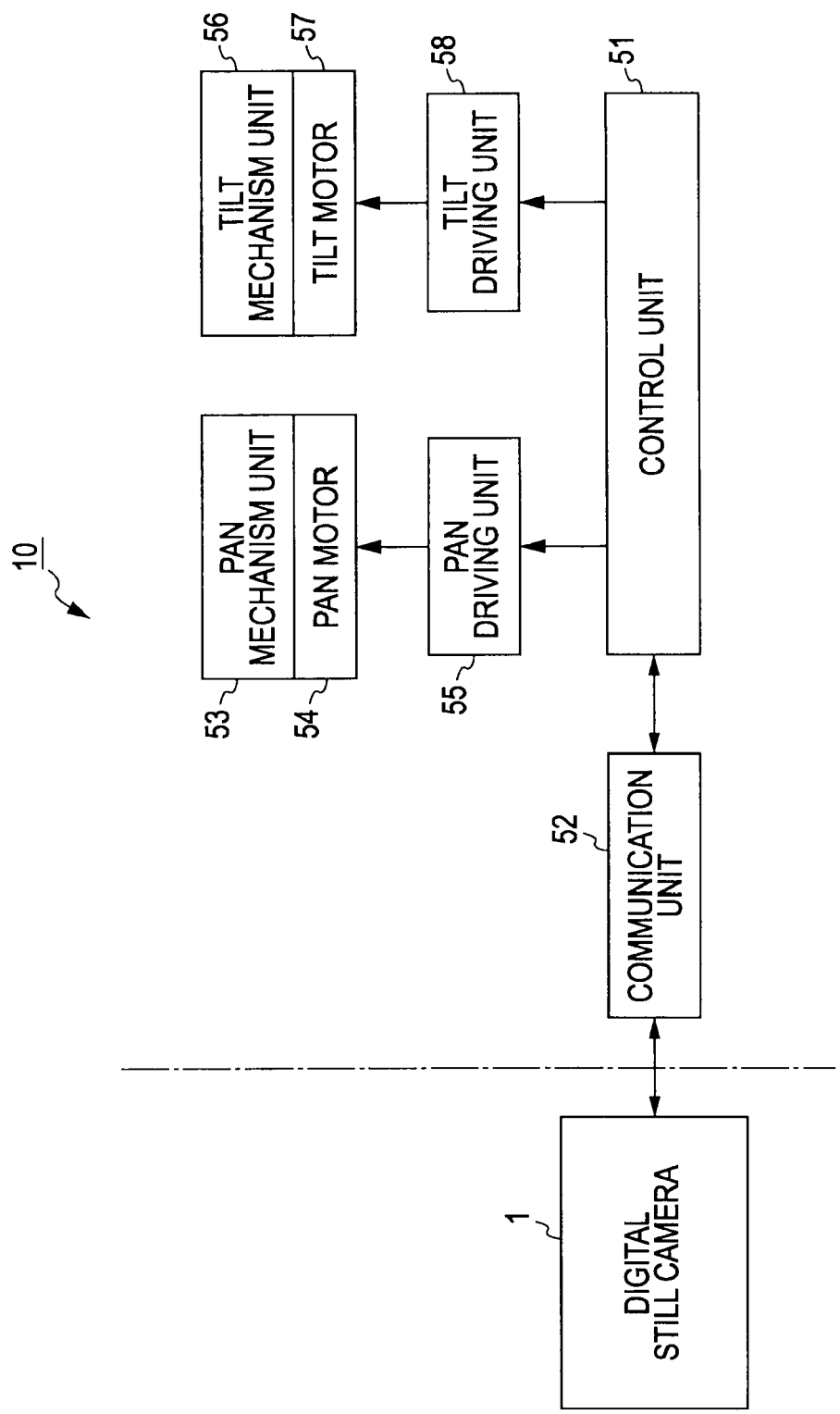
FIG. 8 is a block diagram illustrating an example of an internal structure of the pan/tilt head included in the imaging system of the embodiment.

FIG. 8 is a block diagram illustrating an example of a structure of the pan/tilt head 10.

As described above, the pan/tilt head 10 has the pan/tilt mechanism, and includes a pan mechanism unit 53, a pan motor 54, a tilt mechanism unit 56, and a tilt motor 57, which correspond to the pan/tilt mechanism.

The pan mechanism unit 53 has a mechanism to move the digital still camera 1 attached to the pan/tilt head 10 in the pan (horizontal) directions illustrated in FIG. 6A. The motion of this mechanism can be obtained by rotating the pan motor 54 in a forward or reverse direction. Likewise, the tilt mechanism unit 56 has a mechanism to move the digital still camera 1 attached to the pan/tilt head 10 in the tilt (vertical) directions illustrated in FIG. 6B. The motion of this mechanism can be obtained by rotating the tilt motor 57 rotates in a forward or reverse direction.

A control unit 51 includes a microcomputer that is formed by combining a CPU, a ROM, and a RAM, for example, and controls the motions of the above-described pan mechanism unit 53 and the tilt mechanism unit 56. For example, when the control unit 51 controls the motion of the pan mechanism unit 53, the control unit 51 outputs a control signal corresponding to a movement amount and a movement direction necessary for the pan mechanism unit 53 to the pan driving unit 55. The pan driving unit 55 generates a motor drive signal corresponding to the control signal input thereto and outputs the signal to the pan motor 54. The motor drive signal causes the pan motor 54 to rotate in a predetermined rotation direction and at a predetermined rotation angle. As a result, the pan mechanism unit 53 is driven to move by the corresponding movement amount in the corresponding movement direction.

Likewise, when the control unit 51 controls the motion of the tilt mechanism unit 56, the control unit 51 outputs a control signal corresponding to a movement amount and a movement direction necessary for the tilt mechanism unit 56 to the tilt driving unit 58. The tilt driving unit 58 generates a motor drive signal corresponding to the control signal input thereto and outputs the signal to the tilt motor 57. The motor drive signal causes the tilt motor 57 to rotate in a predetermined rotation direction and at a predetermined rotation angle. As a result, the tilt mechanism unit 56 is driven to move by the corresponding movement amount in the corresponding movement direction.

A communication unit 52 executes communication with the pan/tilt head communication unit 34 in the digital still camera 1 attached to the pan/tilt head 10 in accordance with a predetermined communication method. Like the pan/tilt head communication unit 34, the communication unit 52 has a physical-layer structure enabling transmission/reception of communication signals to/from the communication unit on the other side in a wired or wireless manner and a structure to realize communication corresponding to a predetermined layer higher than the physical layer.

Figure 9:
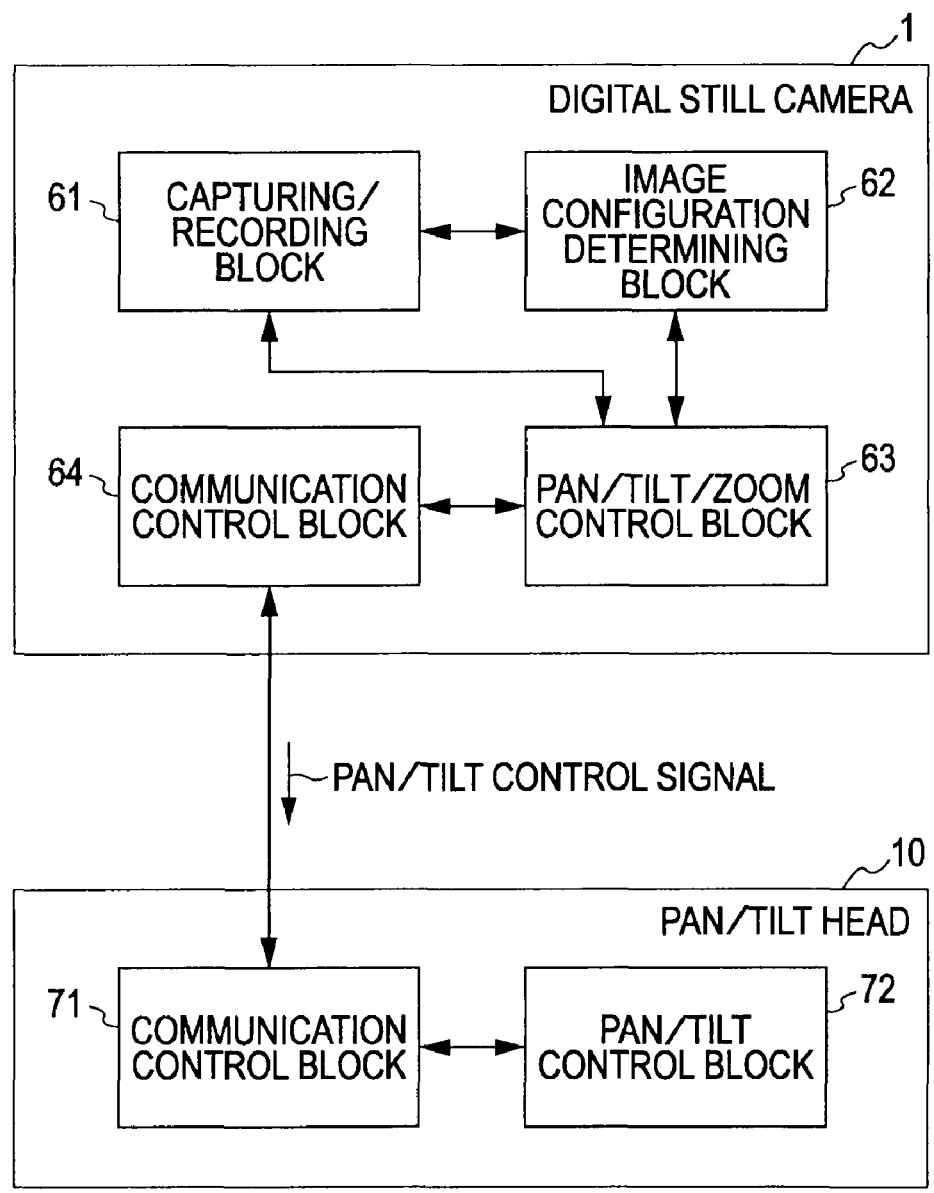
FIG. 9 is a block diagram illustrating an example of an internal structure of the imaging system of the embodiment.

FIG. 9 is a block diagram corresponding to respective functional operations illustrating the inside of the digital still camera 1 and the pan/tilt head 10 included in the imaging system according to this embodiment.

Referring to FIG. 9, the digital still camera 1 includes a capturing/recording block 61, an image configuration determining block 62, a pan/tilt/zoom control block 63, and a communication control block 64.

The capturing/recording block 61 executes a control process to obtain an image obtained through capturing as image signal data (captured image data) and store the captured image data in a storage medium. The capturing/recording block 61 includes an optical system for capturing an image, an imaging device (image sensor), a signal processing circuit to generate captured image data from a signal output from the imaging device, and a recording controlling/processing system to write the captured image data on the storage medium to record (store) the data.

In this case, recording of captured image data (capturing/recording) in the capturing/recording block 61 is executed on the basis of instructions and control of the image configuration determining block 62 (image configuration determining process unit 212).

The image configuration determining block 62 takes in and receives captured image data that is output from the capturing/recording block 61 and executes a process to determine an image configuration on the basis of the captured image data.

Furthermore, the image configuration determining block 62 also executes image configuration acquisition control to obtain captured image data having image content based on the determined image configuration.

The image configuration determining block 62 corresponds to the image configuration determining block 200 illustrated in FIG. 2.

The pan/tilt/zoom control block 63 executes pan/tilt/zoom control so that a composition and a capturing view angle according to a determined appropriate image configuration can be obtained in response to the instructions from the image configuration determining block 62. That is, in the image configuration acquisition control, the image configuration determining block 62 notifies the pan/tilt/zoom control block 63 of the composition and capturing view angle that should be obtained in accordance with the determined appropriate image configuration. The pan/tilt/zoom control block 63 calculates a movement amount of the pan/tilt mechanism of the pan/tilt head 10 to orient the digital still camera 1 in the capturing direction to obtain the indicated composition and capturing view angle, and generates a pan/tilt control signal to provide instructions about the movement according to the calculated movement amount.

Also, the pan/tilt/zoom control block 63 calculates a zoom position to obtain the determined appropriate angle of view, and controls the zoom mechanism included in the capturing/recording block 61 to obtain the zoom position.

The communication control block 64 executes communication with a communication control block 71 in the pan/tilt head 10 in accordance with a predetermined communication protocol. The pan/tilt control signal generated by the pan/tilt/zoom control block 63 is transmitted to the communication control block 71 in the pan/tilt head 10 through communication by the communication control block 64.

The pan/tilt head 10 includes the communication control block 71 and a pan/tilt control block 72, as illustrated in FIG. 9.

The communication control block 71 executes communication with the communication control block 64 in the digital still camera 1. When receiving the above-described pan/tilt control signal, the communication control block 71 outputs the pan/tilt control signal to the pan/tilt control block 72.

The pan/tilt control block 72 corresponds to an execution function of a process related to pan/tilt control among control processes executed by the microcomputer (not illustrated here) on the side of the pan/tilt head 10.

The pan/tilt control block 72 controls the pan drive mechanism unit and the tilt drive mechanism unit (not illustrated here) in response to the pan/tilt control signal input thereto. Accordingly, panning/tilting to obtain necessary horizontal and vertical view angles for an appropriate image configuration is performed.

In this case, the image configuration determining block 62 executes a subject detecting process in the manner described below. If no subject is detected as a result of the subject detecting process, the pan/tilt/zoom control block 63 can execute pan/tilt/zoom control to search for a subject in response to instructions, for example.

Figure 10:
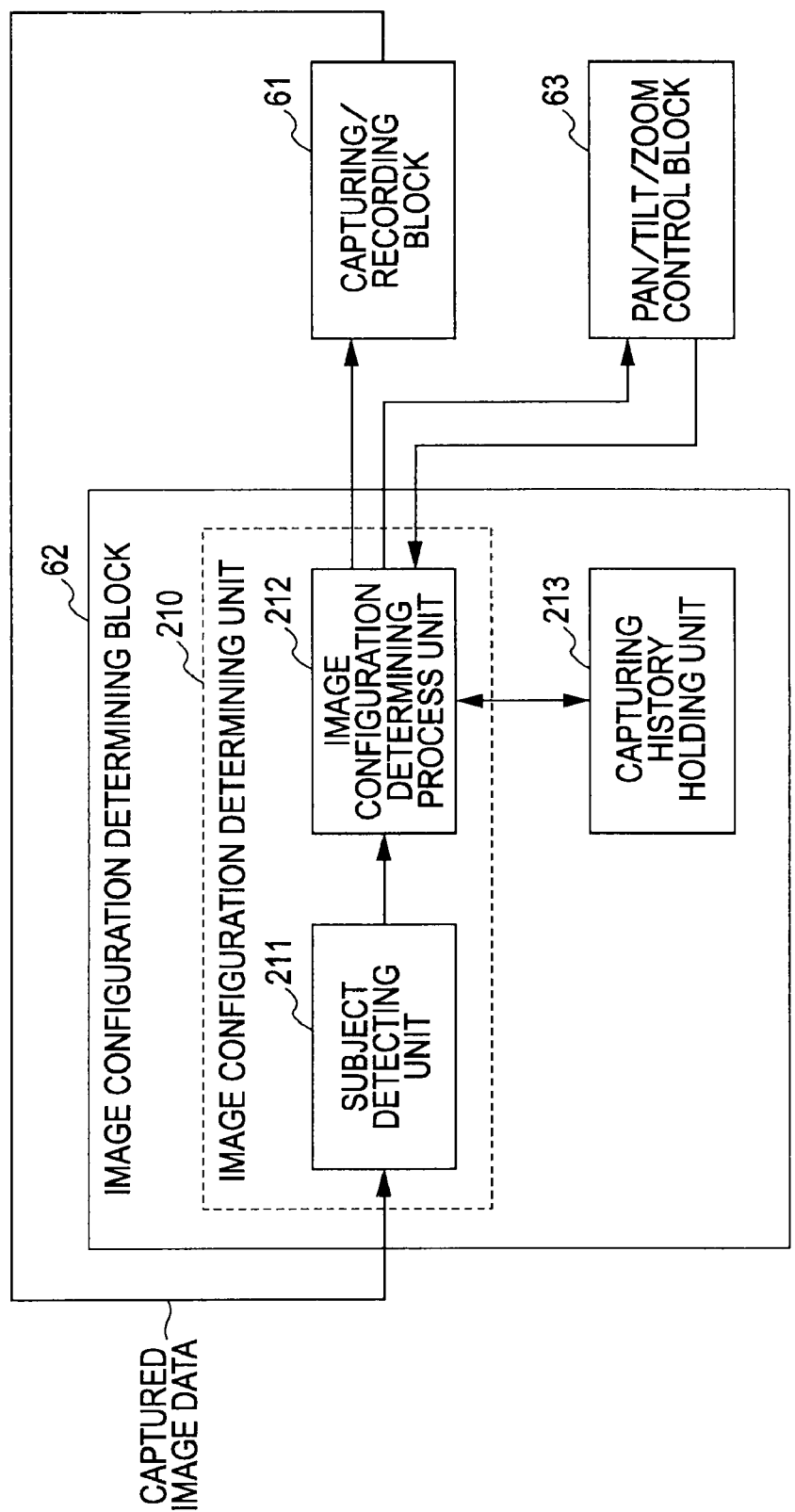
FIG. 10 is a block diagram illustrating an example of an internal structure of an image configuration determining unit illustrated in FIG. 9.

FIG. 10 illustrates an example of an internal structure of the image configuration determining block 62 illustrated in FIG. 9. The image configuration determining block 62 illustrated in this figure roughly includes an image configuration determining unit 210 and a capturing history holding unit 213. The image configuration determining unit 210 corresponds to the image configuration determining unit 201 illustrated in FIG. 2, whereas the capturing history holding unit 213 corresponds to the history holding unit 202.

Furthermore, the image configuration determining unit 210 in this case includes a subject detecting unit 211 and the image configuration determining process unit 212.

Also, FIG. 10 illustrates the capturing/recording block 61 and the pant/tilt/zoom control block 63 corresponding to the determination result using unit 203 in FIG. 2, together with the image configuration determining block 62.

The subject detecting unit 211 takes in captured image data output from the capturing/recording block 61 and executes a subject detecting process.

The subject detecting process is a process of discriminating and detecting a subject as a person from the image content of the captured image data that has been taken in. The information obtained as a detection result (individual subject detection information) includes the number of subjects as persons, position information in the frame of the respective subjects or individual subjects (e.g., a position in the frame can be expressed by X and Y coordinates of a pixel in a matrix), and the size in the image of the individual subjects (occupied area).

As a specific method for the subject detecting process, a technique of face detection can be used. Some methods for face detection are used in related arts. The method to be adopted in this embodiment is not particularly limited, and an appropriate method may be adopted in view of detection accuracy, difficulty level in design, a method adopted for stillness detection described below, and so on.

Furthermore, the subject detecting unit 211 in this embodiment executes, as the subject detecting process, an individual recognizing process of discriminating an individual on a detected individual subject. Thus, the above-described individual subject detection information includes individual recognition information indicating an individual recognition result of each detected individual subject.

Also, an algorithm of the individual recognizing process is not particularly limited in this embodiment, as in the method for face detection.

Then, the subject detecting unit 211 obtains information including a set of the above-described individual subject detection information as detected subject information. For example, the subject detecting unit 211 supplies the detected subject information to the image configuration determining process unit 212 together with captured image data taken in by itself.

The subject detecting process executed by the subject detecting unit 211 can be realized as an image signal process. For example, when the image signal process is executed by a DSP (Digital Signal Processor), the subject detecting process can be realized by a program and instructions given to the DSP.

The image configuration determining process unit 212 determines an appropriate image configuration corresponding to the image content of captured image data by using the captured image data and the detected subject information supplied from the subject detecting unit 211, and executes image configuration acquisition control based on a determination result.

That is, as in the above-described case of the operation of the image configuration determining block 62 illustrated in FIG. 9, the image configuration determining process unit 212 controls and provides instructions to the pan/tilt/zoom control block 63 so as to obtain the composition and capturing view angle according to the determination result on the basis of the determination result of the image configuration.

Also, the image configuration determining process unit 212 monitors the image content of captured image data and waits for acquisition of image content corresponding to the determined appropriate image configuration during the image configuration acquisition control. Then, when recognizing that the image content having the determined image configuration has been obtained, the image configuration determining process unit 212 instructs the capturing/recording block 61 to record the captured image data.

In response to the instructions, the capturing/recording block 61 records the captured image data obtained at the time. The captured image data recorded in this way has the image content according to the image configuration determined by the image configuration determining process unit 212.

Now, a description is given about the correspondence between the structure of the imaging system illustrated in FIGS. 9 and 10 and the structure of the digital still camera 1 and the pan/tilt head 10 illustrated in FIGS. 7 and 8. The correspondence described here should be interpreted as an example of normal possibilities, and a correspondence other than that described here can also be adopted.

The capturing/recording block 61 in the digital still camera 1 illustrated in FIGS. 9 and 10 corresponds to the part including the optical system unit 21, the image sensor 22, the A/D converter 23, the signal processing unit 24, the encoding/decoding unit 25, and the medium controller 26 illustrated in FIG. 7, for example. The captured image data used in an image configuration determining process by the image configuration determining block 62 can be obtained in a predetermined signal process stage in the signal processing unit 24, for example.

The image configuration determining block 62 in the digital still camera 1 illustrated in FIGS. 9 and 10 corresponds to the image signal processing function corresponding to a predetermined process in the subject detecting unit 211 in the signal processing unit 24 illustrated in FIG. 7, for example. Also, the image configuration determining block 62 corresponds to the processing function corresponding to the image configuration determining process unit 212 and the managing function of the capturing history information in the capturing history holding unit 213 executed by the control unit (CPU) 27. As the storage area serving as the capturing history information holding unit 213, the RAM 29 or the flash memory 30 illustrated in FIG. 7 can be used.

The pan/tilt/zoom control block 63 illustrated in FIGS. 9 and 10 corresponds to the processing function executed by the control unit 27 illustrated in FIG. 7 for pan/tilt/zoom control, for example.

The communication control block 64 in the digital still camera 1 illustrated in FIG. 9 corresponds to the pan/tilt head communication unit 34 illustrated in FIG. 7 and the processing function executed by the control unit 27 for communication using the pan/tilt head communication unit 34, for example.

The communication control block 71 in the pan/tilt head 10 illustrated in FIG. 9 corresponds to the communication unit 52 illustrated in FIG. 8 and the process executed by the control unit 51 for communication using the communication unit 52.

The pan/tilt control block 72 illustrated in FIG. 9 corresponds to the execution function of a process about pan/tilt control among control processes executed by the control unit 51 illustrated in FIG. 8, and outputs signals to control the motions of the pan mechanism unit 53 and the tilt mechanism unit 56 to the pan driving unit 55 and the tilt driving unit 58 in response to a control signal input thereto.

As described above, in the imaging system having the structure illustrated in FIGS. 9 and 10, the following operation is automatically executed during photography (capturing/recording of image data) by the digital still camera: an appropriate image configuration is decided (determined) and then captured image data of image content having the appropriate image configuration is recorded. Accordingly, a photo image of a considerably good quality can be obtained even if the user performs shooting without determining the state of respective forming elements of an image configuration including a composition.

Also, this system eliminates the necessity of someone to perform shooting by holding a camera, so that everyone existing in a shooting site can become a subject. Furthermore, even if a user as a subject is not aware of being within a view angle range of the camera, a photo with the subject in the range can be obtained. That is, the opportunity to shoot a natural state of people at the shooting site increases, so that many photos having an unprecedented atmosphere can be obtained.

Figure 11:
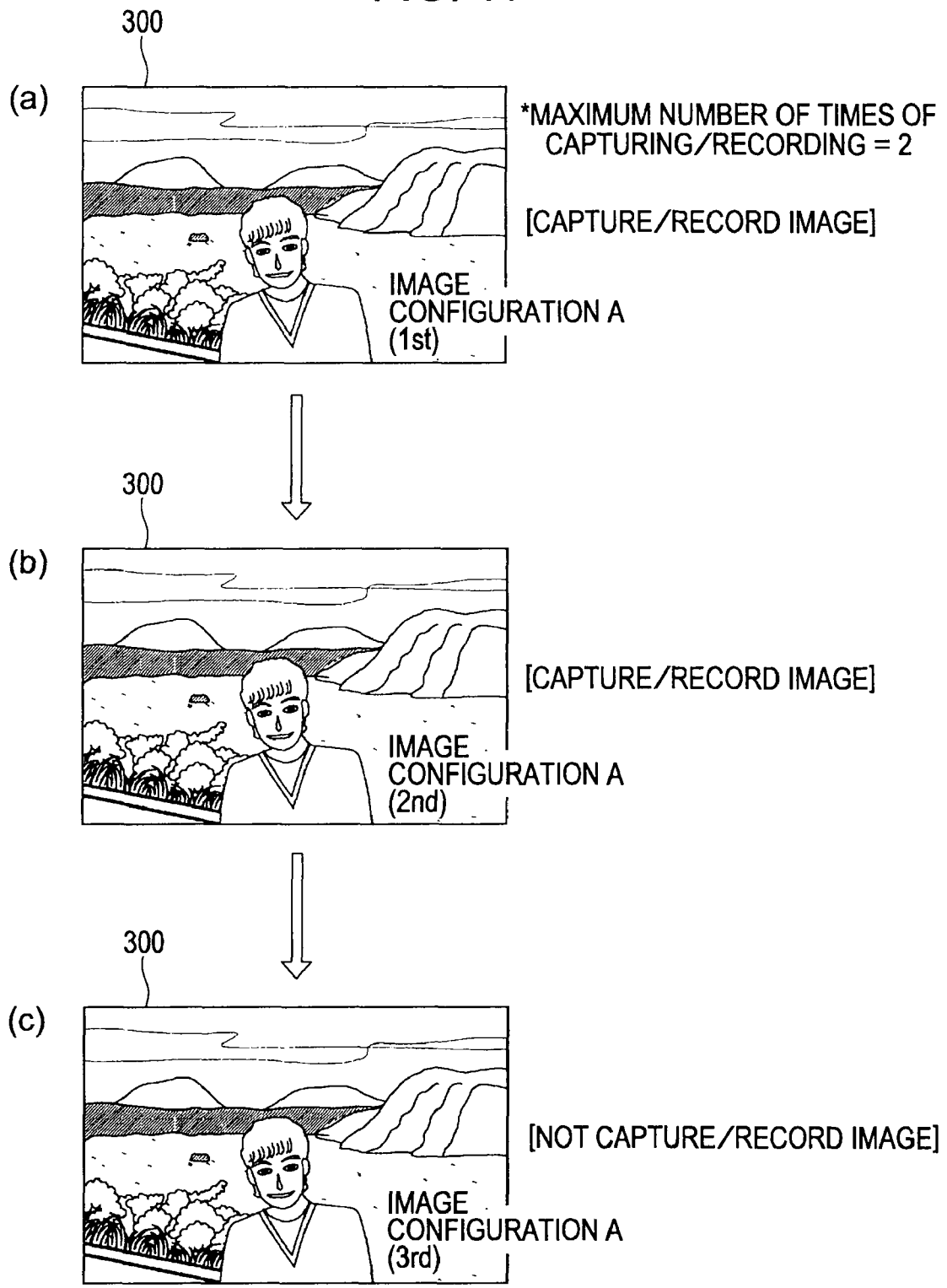
FIG. 11 illustrates an example of a rule of the most basic automatic capturing/recording related to image configuration determination in the imaging system of the embodiment.

Next, with reference to FIG. 11, a description is given about the most basic rule of automatic capturing/recording in the imaging system according to this embodiment. This corresponds to a process of recordable/non-recordable setting according to a determination whether a determined image configuration has been exhausted.

This embodiment is based on the assumption that the imaging system of this embodiment does not capture/record image data having a same image configuration over a preset maximum number of times of capturing/recording (specified number of times). The description given below with reference to FIG. 11 is based on the assumption that the maximum number of times of capturing/recording is set to 2.

Then, assume that the image configuration determining process unit 212 starts an image configuration determining process and executes image configuration acquisition control so that a first determination result is reflected. As a result, captured image data having the image content illustrated in part (a) in FIG. 11 is obtained. The image content illustrated here has an image configuration A in the frame 300. The image configuration A corresponds to the image configuration determined by the image configuration determining process unit 212.

In this stage, recording of the captured image data having the image configuration A has not been executed at all. That is, even if capturing/recording is performed this time, the number of times of capturing/recording does not exceed the above-described maximum number of times. Thus, in this case, the image configuration determining process unit 212 instructs the capturing/recording block 61 to capture/record the image data at the timing when the image content illustrated in part (a) in FIG. 11 is obtained. In this way, the captured image data having the image content illustrated in part (a) in FIG. 11 is recorded. This captured image data is the first recorded data having the image configuration A. In other words, a first photo image having the image configuration A has been captured/recorded.

Then, assume that the image configuration determining process unit 212 executes an image configuration determining process by using the same image configuration determining algorithm, thereby determining the image configuration A to be an appropriate image configuration as in the previous time. Also assume that, as a result of image configuration acquisition control according to this determination result, captured image data of the image content having the image configuration A, same as the image configuration illustrated in part (a) in FIG. 11, is obtained as illustrated in part (b) in FIG. 11.

As described above, the maximum number of times of capturing/recording is set to 2, and thus the second capturing/recording can be executed this time. Thus, the image configuration determining process unit 212 allows the capturing/recording block 61 to execute capturing/recording.

In the stage where the second capturing/recording has been done on the image data of the image content having the image configuration A illustrated in part (b) in FIG. 11, the maximum number of times (=2) of capturing/recording has been completed. As for the correspondence with FIGS. 3 and 4, the stage illustrated in part (b) in FIG. 11 where capturing/recording has been completed corresponds to the stage where use of the determined image configuration A by the determination result using unit 203 has been exhausted.

Furthermore, assume that the image configuration determining process unit 212 executes an image configuration determining process by using the same image configuration determining algorithm thereafter, thereby determining the image configuration A to be an appropriate image configuration as in the previous time. Also, assume that, as a result of image configuration acquisition control according to this determination result, captured image data having the image content same as that illustrated in parts (a) and (b) in FIG. 11 is obtained as illustrated in part (c) in FIG. 11.

In this stage, the image configuration A has been exhausted, as described above. In other words, since the captured image data having the image configuration A has been recorded twice, one more recording causes the number of recordings to be 3, which is over the maximum number of times of capturing/recording 2.

Therefore, at this time, the image configuration determining process unit 212 does not instruct the capturing/recording block 61 to execute capturing/recording. That is, capturing/recording by the capturing/recording block 61 is not executed. Also, even if image data having the image configuration A is obtained by an image configuration determination thereafter, capturing/recording is not executed.

As described above, the imaging system according to this embodiment has a basic structure of not recording captured image data having image content of the same image configuration over the preset maximum number of times of capturing/recording (a determination result of an exhausted image configuration is not used any more). In this way, by limiting the number of times of capturing/recording of one image configuration, images having the same image configuration can be prevented from being redundantly recorded during automatic capturing/recording of image data having image content according to a determined appropriate image configuration.

For example, image content depends on the state of a specific element, such as a pan/tilt position, the position of a subject in the frame, the orientation of a subject in the frame, and each individual as a subject in the frame.

In this embodiment, a combination (configuration) of states of respective elements determining the image content is called an image configuration. Each element determining the image content can be regarded as an element forming (determining) an image configuration and is thus called an image configuration forming element (image configuration determining element).

Next, a description is given about examples of the image configuration forming element and examples of automatic capturing/recording based on image configuration determination that can be adopted in the imaging system of this embodiment.

Figure 12:
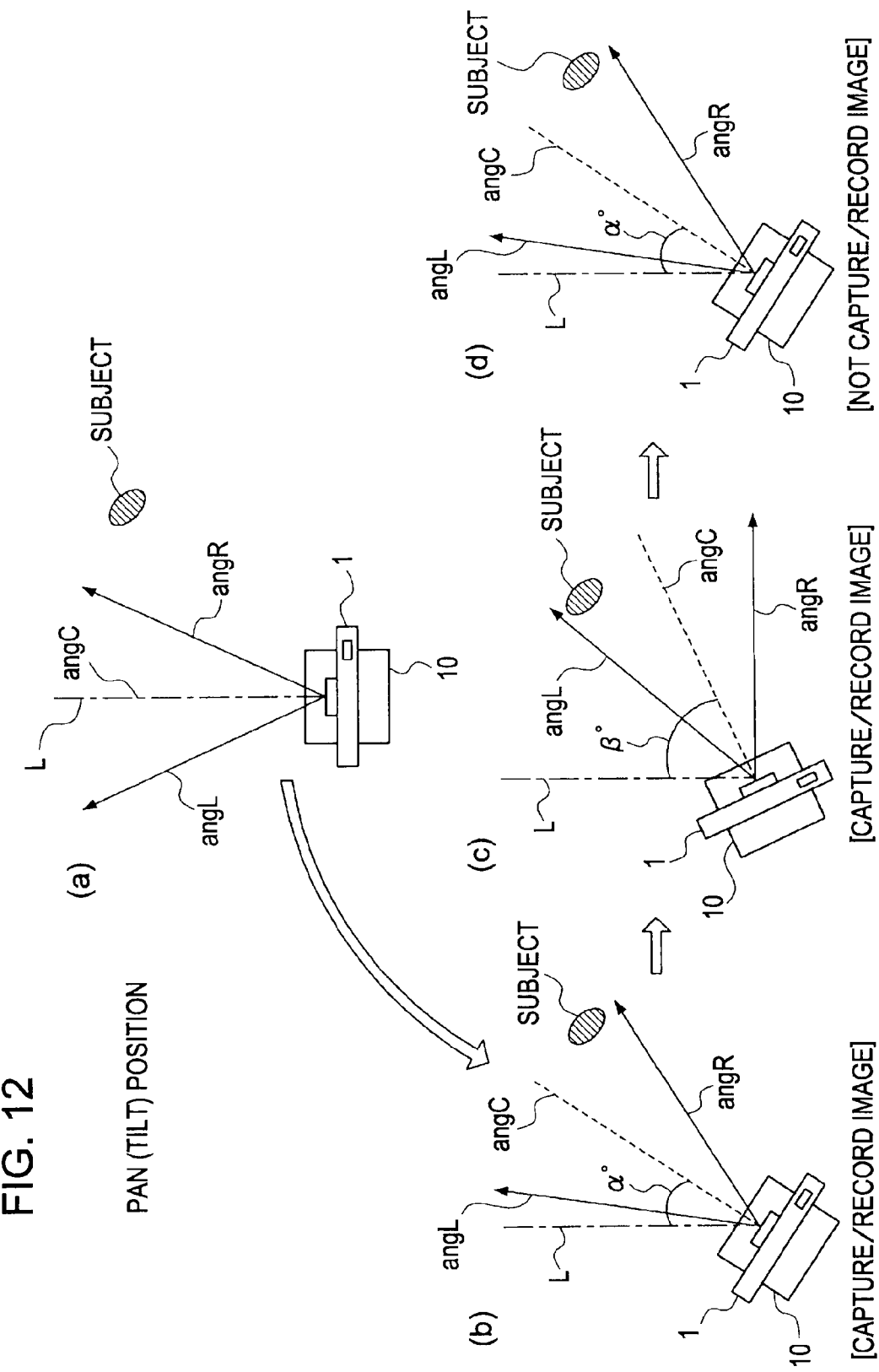
FIG. 12 conceptually illustrates an example of an operation of automatic capturing/recording of the imaging system when pan and tilt positions are adopted as an image configuration forming element.

FIG. 12 conceptually illustrates operation examples of automatic capturing/recording in the imaging system in the case where pan and tilt positions set by the pan mechanism unit 53 and the tilt mechanism unit 56 in the pan/tilt head 10 are adopted as an image configuration forming element. Here, a description is given about only pan directions to simplify the description.

Referring to FIG. 12, part (a) illustrates the pan/tilt head 10 and the digital still camera 1 attached thereto viewed from the top. In this figure, the digital still camera 1 is placed at a position set as a reference (referent position: e.g., a center position in a movable range) in the movable range in pan directions (horizontal directions) of the pan mechanism unit 53 of the pan/tilt head 10. A reference line L coincides with or is parallel to an optical axis (imaging optical axis) of the lens unit 3 (optical system unit 21) in the state where the digital still camera 1 exists at the reference position in the pan direction.

Here, an angle of view (zoom angle) is expressed by center of angle of view angC, left end of angle of view angL, and right end of angle of view angR. The center of angle of view angC coincides with the imaging optical axis of the digital still camera 1. The angle between the center of angle of view angC and the left end of angle of view angL is equal to the angle between the center of angle of view angC and the right end of angle of view angR. In order to simplify the description, it is assumed that the angle of view (zoom angle) is fixed here.

Also, assume that a subject exists at a position on a front-right side of the digital still camera 1 near the position where the digital still camera 1 and the pan/tilt head 10 are placed as illustrated in FIG. 12. For convenience of the description, assume that the subject does not move and the absolute position thereof is fixed.

For example, assume that the digital still camera 1 of this embodiment starts to search for a subject in the state illustrated in part (a) in FIG. 12 and executes pan control associated with image configuration determination and image configuration acquisition control. As a result, an image in which the subject is positioned within the capturing view angle is obtained as an appropriate image configuration as illustrated in part (b) in FIG. 12. In the state illustrated in part (b) in FIG. 12, a pan position is indicated as an angle $\alpha°$ (the angle between the reference line and the center of angle of view).

Then, assume that the digital still camera 1 captures/records the image data captured at this pan position the number of times corresponding to the preset maximum number of times of capturing/recording.

Then assume that, after the image data in the state illustrated in part (b) in FIG. 12 has been captured/recorded the maximum number of times, a process of searching for a subject and determining an image configuration is executed again. Then, assume that image configuration acquisition control is executed according to the determination result, whereby a pan position based on a pan angle $\beta°$ different from the angle illustrated in part (b) in FIG. 12 is obtained, as illustrated in part (c) in FIG. 12. In the positional state illustrated in part (c) FIG. 12, the digital still camera 1 can execute capturing/recording.

Furthermore, assume that, in the state illustrated in part (c) FIG. 12, a process of searching for a subject and determining an image configuration is executed and image configuration acquisition control is executed according to the determination result, whereby a pan position of the state illustrated in part (d) in FIG. 12 is obtained.

However, the pan position illustrated in part (d) in FIG. 12 corresponds to a pan angle $\alpha°$ as in part (b) in FIG. 12. In the stage illustrated in part (b) in FIG. 12, the maximum number of times of capturing/recording has been completed. Therefore, capturing/recording is not executed under the state obtained in the stage illustrated in part (d) in FIG. 12.

In this embodiment, the above-described automatic capturing/recording at a pan position is actually executed on the basis of the capturing view angle determined by a combination of pan and tilt positions. That is, in a plurality of pan and tilt positions obtained from a plurality of times of image configuration determining process and image configuration acquisition control, a different image configuration can be formed if the tilt position is different even if the pan position is the same, for example.

In this way, according to this embodiment, a pan/tilt position is adopted as an image configuration forming element. If capturing/recording in the same pan/tilt position is executed the maximum number of times, then, capturing/recording in the pan/tilt position is not executed any more.

When the imaging system according to this embodiment is used, the digital still camera 1 is placed at a certain position while being attached to the pan/tilt head 10. Thus, the background in the frame of a captured image is the same if the pan/tilt position is the same.

That is, by limiting the number of times of capturing/recording at the same pan/tilt position, which is an image configuration forming element, images having the same background can be prevented from being redundantly captured/recorded.

As described above, in the subject detecting process according to this embodiment, an individual recognizing process is performed on each of detected individual subjects and thus each subject and each individual can be identified by associating them with each other. Thus, information of an individual of each subject specified in the individual recognizing process is adopted as an image configuration forming element in this embodiment. Accordingly, even when a subject as the same person is placed in the frame in the same composition, the image configuration in the frame can be determined to be different if the individual is different.

Figure 13:
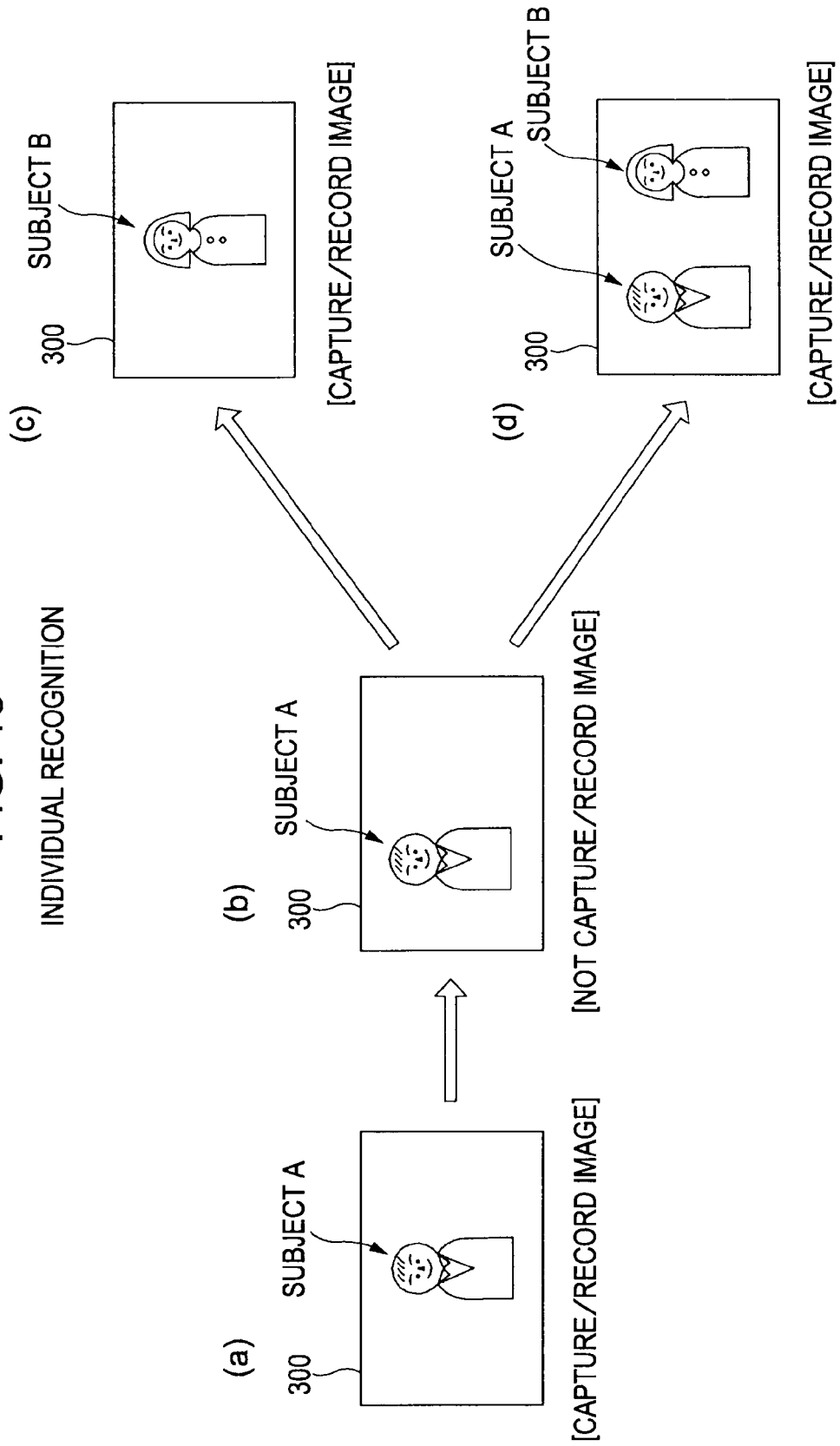
FIG. 13 illustrates an example of automatic capturing/recording when an individual recognition result is adopted as an image configuration forming element.

FIG. 13 illustrates an example of an image configuration determining process and automatic capturing/recording in the case where an individual recognition result (individual feature parameters) is mainly adopted as an image configuration forming element.

First, assume that an image configuration according to image content of captured image data illustrated in part (a) in FIG. 13 is determined to be appropriate. In the image illustrated in part (a) in FIG. 13, the state where "a subject is A" is determined to be appropriate about an image configuration forming element of an individual recognition result. Subject A can be discriminated from another subject by an individual recognizing process executed at detection of the subject.

In the imaging system, assume that the image data of image content having the image configuration illustrated in part (a) in FIG. 13 is captured/recorded the maximum number of times. In this case, image data having the image configuration illustrated in part (b) in FIG. 13, which is the same as that illustrated in part (a) in FIG. 13 where only subject A exists, is not captured/recorded any more.

Then, assume that the content of a captured image changes from the state illustrated in part (b) in FIG. 13 to the state illustrated in part (c) in FIG. 13 where only subject B different from subject A exists in the frame 300. Subject B is a subject recognized as an individual different from subject A by an individual recognizing process.

In accordance with this change, the state where "subject is B" is determined to be an appropriate image configuration in terms of an individual recognition result. In this case, when the number of subjects is one, the image illustrated in part (a) or (b) in FIG. 13 where only subject A exists is determined to have an image configuration different from that of the image illustrated in part (c) in FIG. 13 where only subject B exists. Therefore, the digital still camera 1 can capture the image data having the image content illustrated in part (c) in FIG. 13 in the range of the preset maximum number of times of capturing/recording.

On the other hand, assume that the image content of a captured image changes from the state illustrated in part (b) in FIG. 13 to the state illustrated in part (d) in FIG. 13 where two subjects A and B exist in the frame. In accordance with this change, the state where "subjects are A and B" is determined to be appropriate in terms of an individual recognition result as a result of determining an appropriate image configuration based on the image content illustrated in part (d) in FIG. 13. The appropriate image configuration determined in accordance with the image content illustrated in part (d) in FIG. 13 is also different from the image configuration illustrated in part (b) in FIG. 13. Therefore, the digital still camera 1 can capture the image data having the image content illustrated in part (d) in FIG. 13 in the range of the preset maximum number of times of capturing/recording.

In such a manner of image configuration determination, images of a same specific person or images of a combination of a plurality of same persons can be prevented from being redundantly captured/recorded.

In the subject detecting process executed by the subject detecting unit 211 according to this embodiment, a facial expression of a detected person as a subject, e.g., whether the subject is smiling, can be detected.

Figure 14:
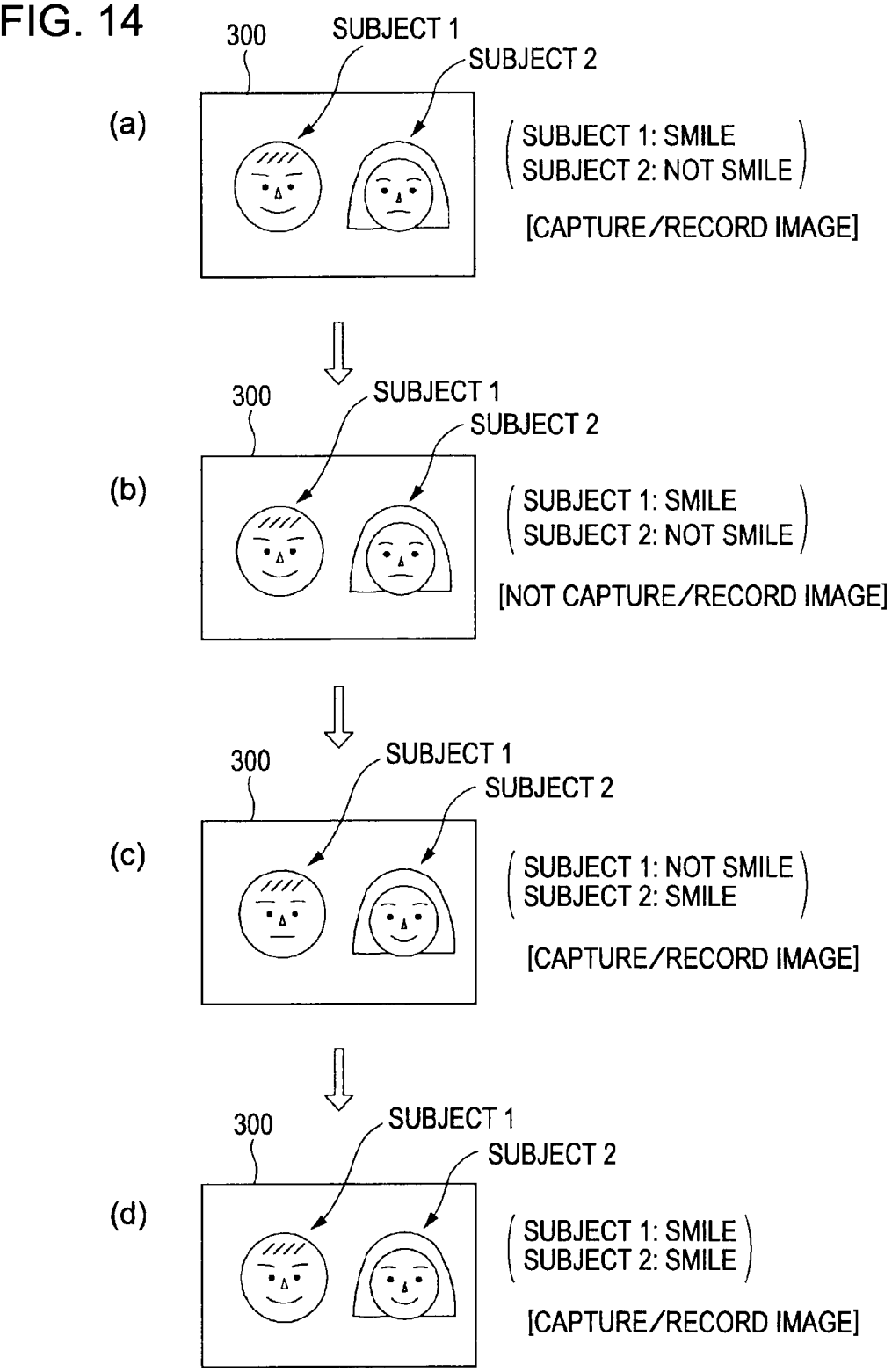
FIG. 14 illustrates an example of automatic capturing/recording when a smile detection result is adopted as an image configuration forming element.

FIG. 14 illustrates an example of an image configuration determining process and automatic capturing/recording in the case where a smile detection result is adopted as an image configuration forming element.

First, assume that the image content illustrated in part (a) in FIG. 14 is obtained. In the image content illustrated in part (a) in FIG. 14, two subjects 1 and 2 are placed on the right and left in the frame 300 of a captured image. As for smile (expression), subject 1 is smiling whereas subject 2 is not smiling.

For example, as a result of executing an image configuration determination on this image, the state where "subject 1 is smiling whereas subject 2 is not smiling" is determined to be appropriate as for smile, and thus the image illustrated in part (a) in FIG. 14 is captured/recorded the maximum number of times. Thereafter, even if a combination of the same subjects and smile as that illustrated in part (a) in FIG. 14 is obtained as illustrated in part (b) in FIG. 14, image data of this image is not captured/recorded.

Then, assume that the image content changes to that illustrated in part (c) in FIG. 14: subject 1 is not smiling whereas subject 2 is smiling. In accordance with this change, the state where "subject 1 is not smiling whereas subject 2 is smiling" is set to be appropriate as a smile parameter in the determined appropriate image configuration. The image configuration illustrated in part (c) in FIG. 14 is different from that illustrated in part (a) or (b) in FIG. 14. Thus, the image having the image content illustrated in part (c) in FIG. 14 can be captured/recorded the preset maximum number of times.

Also, assume that the image changes from the state illustrated in part (c) in FIG. 14 to the state illustrated in part (d) in FIG. 14, where both of subjects 1 and 2 are smiling. The appropriate image configuration determined at this time is "subject 1 is smiling and subject 2 is smiling". The image configuration illustrated in part (d) in FIG. 14 is different from any of the image configurations illustrated in parts (a), (b) and (c) in FIG. 14. Thus, the image having the image content illustrated in part (d) in FIG. 14 can be captured/recorded the preset maximum number of times.

In this way, when a smile detection result about an expression is adopted as an image configuration forming element, images of the same expression can be prevented from being redundantly captured/recorded.

In the detection of expression, an angry face or a crying face may be detected instead of a smiling face, and such a detected expression may be adopted as an image configuration forming element.

Figure 15:
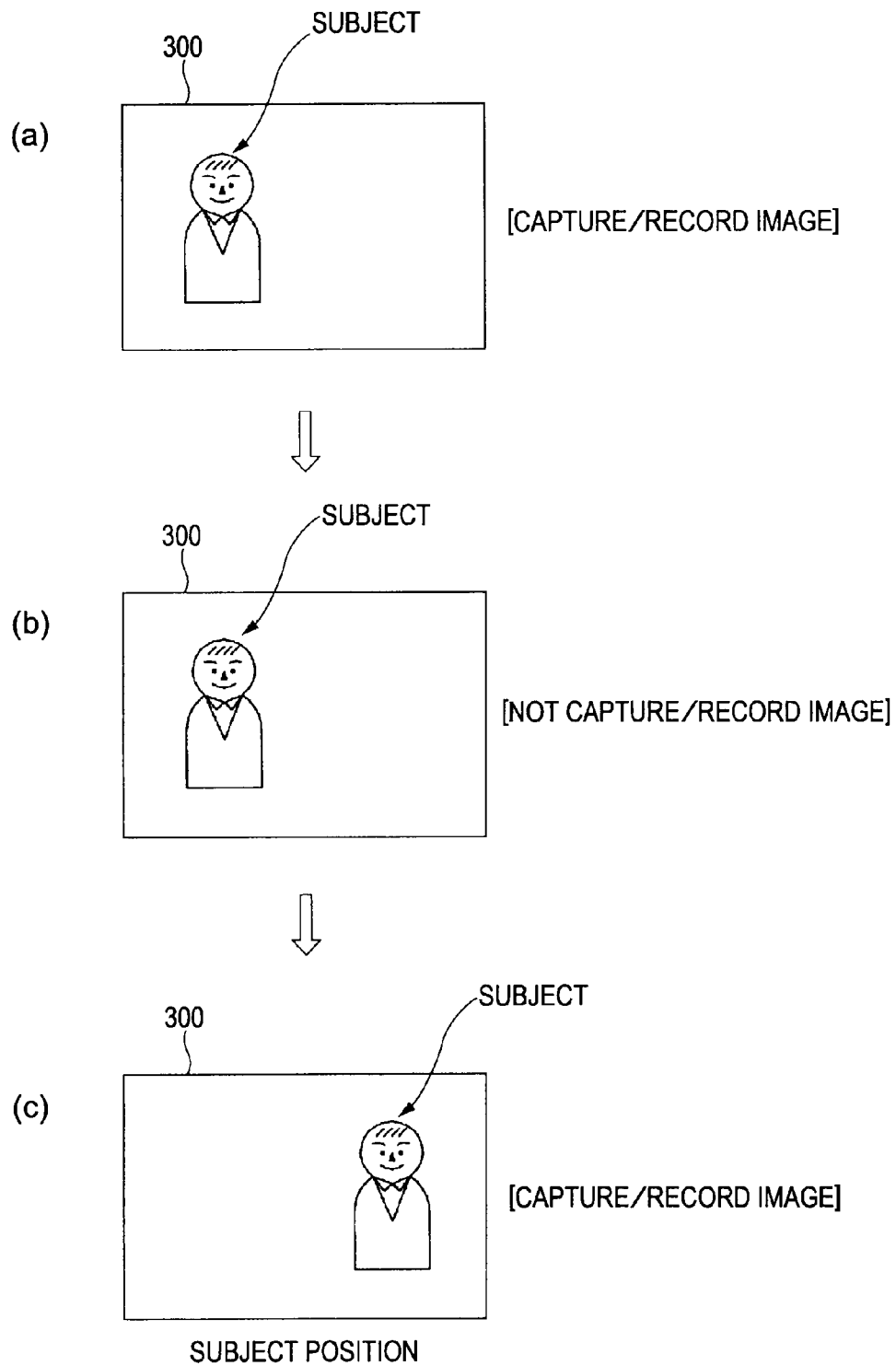
FIG. 15 illustrates an example of automatic capturing/recording when a subject position in a frame is adopted as an image configuration forming element.

FIG. 15 illustrates an example of an image configuration determining process and automatic capturing/recording in the case where a subject position in the frame is adopted as an image configuration forming element. Information of a subject position can be obtained in a subject detecting process executed by the subject detecting unit 211.

Here, as illustrated in part (a) in FIG. 15, assume that captured image data having image content in which a subject is positioned on the left from the center in the horizontal direction in the frame 300 is obtained.

In this case, the digital still camera 1 according to this embodiment determines that the image content illustrated in part (a) in FIG. 15 has an appropriate image configuration. Thus, the imaging system can record the captured image data having the image content illustrated in part (a) in FIG. 15 the present maximum number of times.

Also assume that, after the image having the image content illustrated in part (a) in FIG. 15 has been recorded the maximum number of times, the image illustrated in part (b) in FIG. 15, where a subject exists at the same position as that in part (a) in FIG. 15, is obtained. However, the image configurations illustrated in parts (a) and (b) in FIG. 15 are determined to be the same, and thus the image illustrated in part (b) in FIG. 15 is not recorded.

Then, assume that the image content changes to that illustrated in part (c) in FIG. 15 thereafter.

In the image content illustrated in part (c) in FIG. 15, a subject is positioned on the right from the center in the frame 300. For example, if the position corresponding to part (c) in FIG. 15 is determined to be appropriate as a subject position in an appropriate image configuration determined at this time, the image configuration illustrated in part (c) in FIG. 15 is different from that illustrated in part (a) or (b) in FIG. 15. Thus, the digital still camera 1 can record the captured image data illustrated in part (c) in FIG. 15 the preset maximum number of times.

In this way, by adopting information of a subject position as an image configuration forming element, images of a subject at the same position in the frame can be prevented from being redundantly captured.

Also, in the subject detecting process executed by the subject detecting unit 211 according to this embodiment, the orientation of the face of a detected subject in the image can be detected (face orientation detection).

Figure 16:
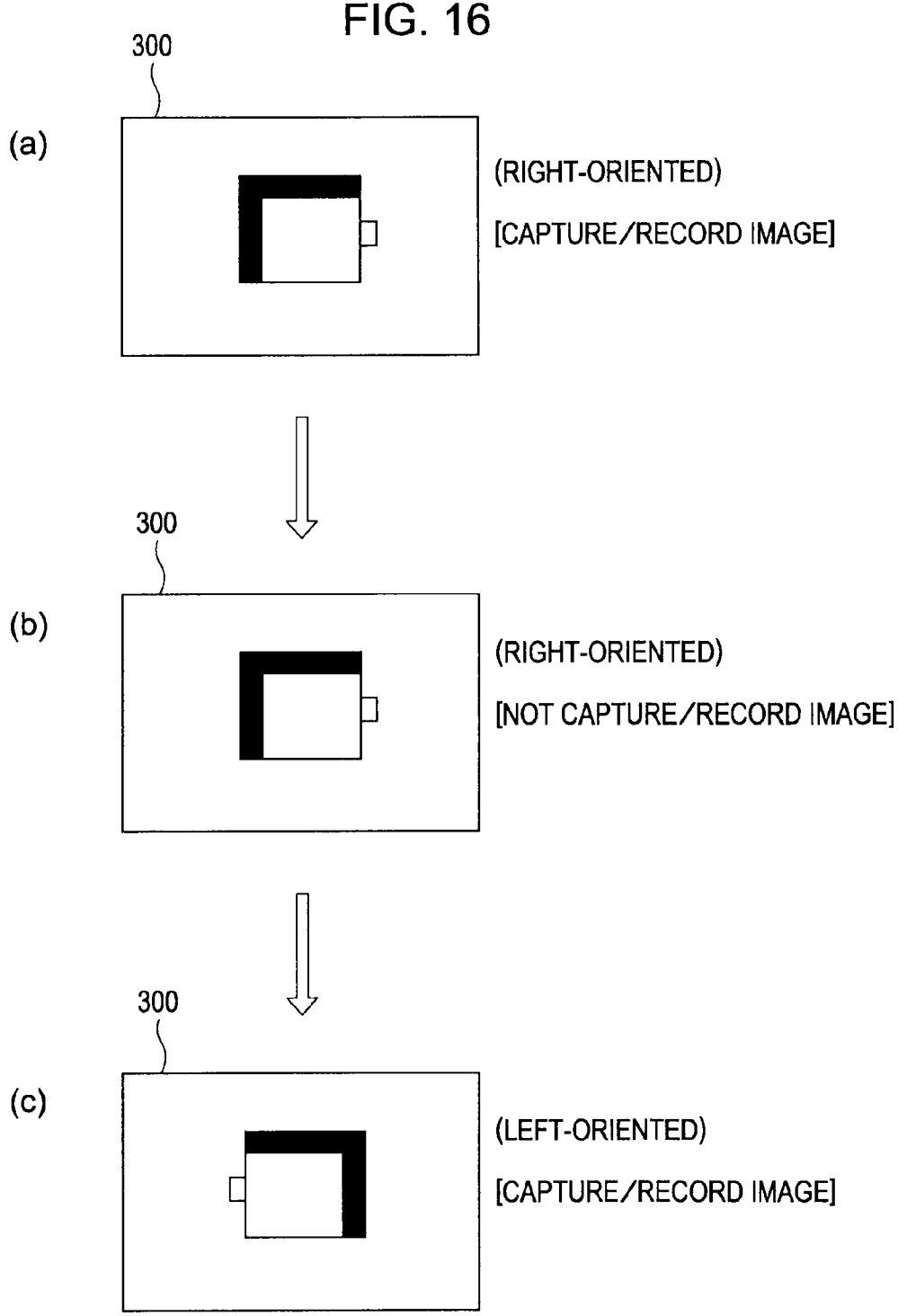
FIG. 16 illustrates an example of automatic capturing/recording when a face orientation of a subject detected by face orientation detection is adopted as an image configuration forming element.

FIG. 16 illustrates an example of an image configuration determining process and automatic capturing/recording in the case where the face orientation of a subject detected by the above-described face orientation detection is adopted as an image configuration forming element.

Part (a) in FIG. 16 illustrates image content in which the face of a subject in the frame 300 is right-oriented (orientation viewed from the side of an image observer). For example, if the state of "right-oriented" is determined to be appropriate for the face orientation of the subject as a result of image configuration determination according to the image content illustrated in part (a) in FIG. 16, the captured image data having the image content illustrated in part (a) in FIG. 16 can be recorded the preset maximum number of times.

After the captured image data has been recorded the maximum number of times, if the same image configuration determination result is obtained for the image illustrated in part (b) in FIG. 16, where the face of the subject is right-oriented as in part (a) in FIG. 16, the image illustrated in part (b) in FIG. 16 is not captured/recorded because the image configurations illustrated in parts (a) and (b) in FIG. 16 are determined to be the same.

On the other hand, assume that the image content changes to that illustrated in part (c) in FIG. 16 thereafter.

In the image content illustrated in part (c) in FIG. 16, the subject is left-oriented. If the state of "left-oriented" is determined to be appropriate for the face orientation by the image configuration determination according to the image content illustrated in part (c) in FIG. 16, the image configuration illustrated in part (c) in FIG. 16 is different from that in part (a) or (b) in FIG. 16. Thus, the captured image data having the image content illustrated in part (c) in FIG. 16 can be recorded the preset maximum number of times.

Accordingly, images of a subject as a person in the same orientation can be prevented from being redundantly captured/recorded.

Figure 17:
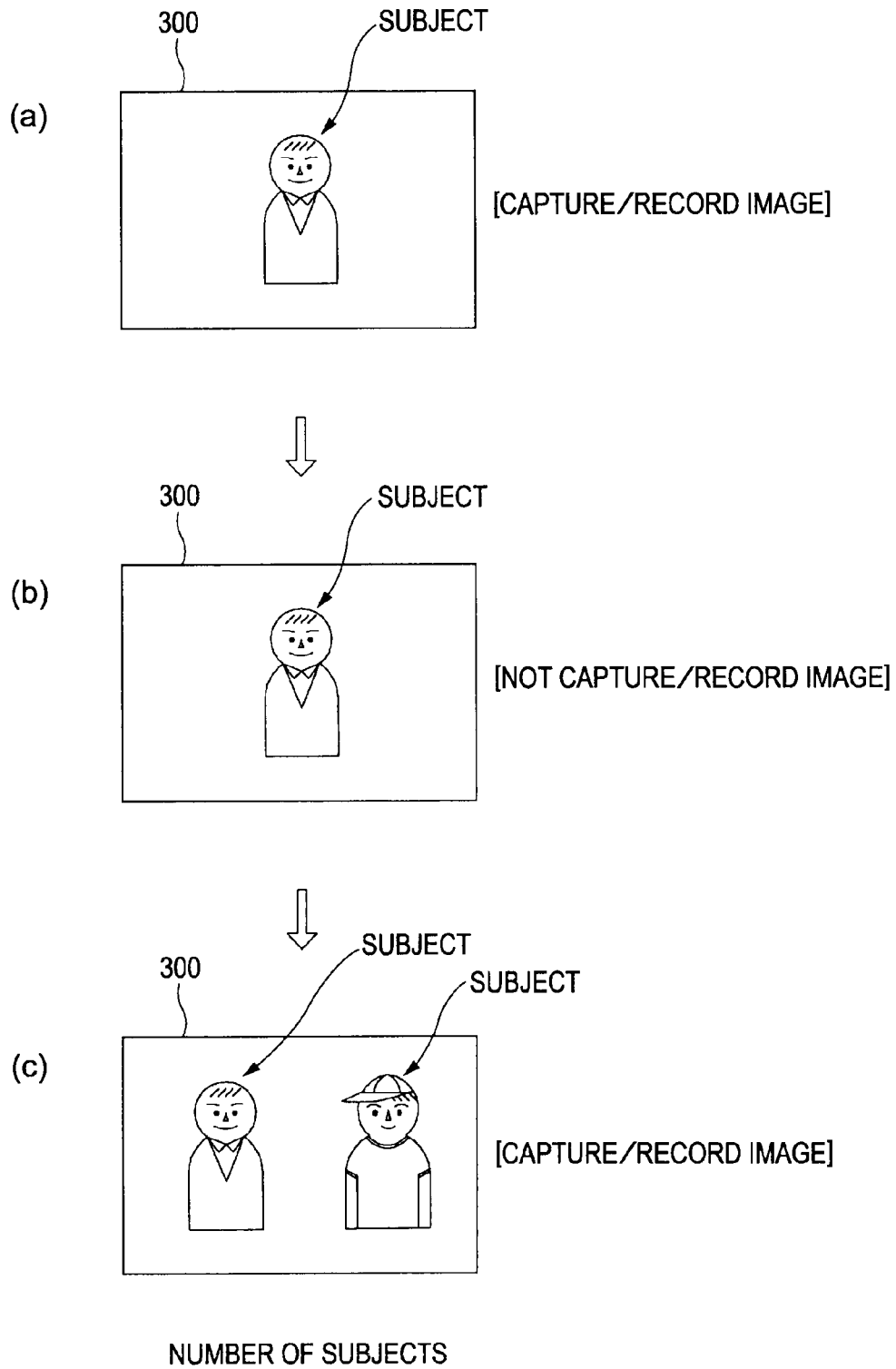
FIG. 17 illustrates an example of automatic capturing/recording when the number of subjects existing in a frame is adopted as an image configuration forming element.

FIG. 17 illustrates an example of an image configuration determining process and automatic capturing/recording in the case where the number of subjects existing in the frame is adopted as an image configuration forming element.

Information of the number of subjects can be obtained in the subject detecting process executed by the subject detecting unit 211.

First, as illustrated in part (a) in FIG. 17, assume that a captured image in which one subject exists in the frame 300 is obtained. Also, assume that an image configuration determination result indicating that the number of subjects is "1" is appropriate is obtained on the basis of the image content. Then, assume that the captured image data having the image content illustrated in part (a) in FIG. 17 is recorded the preset maximum number of times.

After that, if an image in which the number of subjects is one as in part (a) in FIG. 17 is obtained as illustrated in part (b) in FIG. 17, the image illustrated in part (b) in FIG. 17 is not captured/recorded because the image configurations illustrated in parts (a) and (b) in FIG. 17 are determined to be the same.

Then, assume that the image content changes to the image content in which the number of subjects in the frame is two, as illustrated in part (c) in FIG. 17. This image content has an image configuration different from that illustrated in part (a) or (b) in FIG. 17 where the number of subjects is one, in terms of the image configuration forming element as the number of subjects. Thus, if the image content illustrated in part (c) in FIG. 17 is determined to be an appropriate image configuration, the captured image data thereof can be recorded the preset maximum number of times.

In this way, by using the number of subjects as an image configuration forming element, images having the same number of subjects can be prevented from being redundantly captured/recorded.

Figure 18:
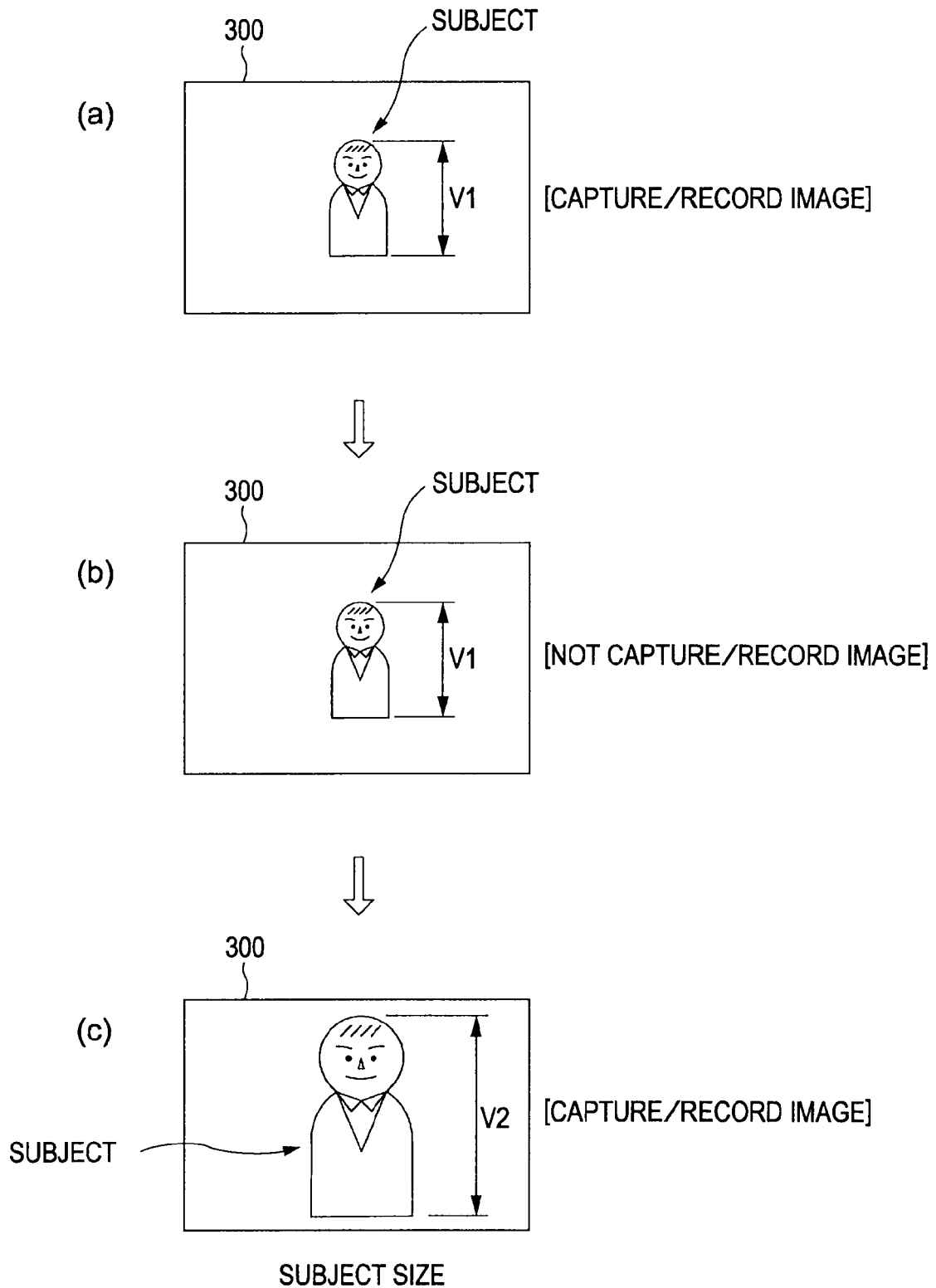
FIG. 18 illustrates an example of automatic capturing/recording when a subject size in a frame is adopted as an image configuration forming element.

FIG. 18 illustrates an example of an image configuration determining process and automatic capturing/recording in the case where a subject size in the frame is adopted as an image configuration forming element. Information of a subject size can be obtained in the subject detecting process executed by the subject detecting unit 211.

First, assume that a captured image in which a subject exists in the frame 300 is obtained as illustrated in part (a) in FIG. 18.

Also, assume that a result indicating the state where the subject size is "V1 (vertical size)" is appropriate is obtained in an image configuration determining process based on the image content. Then, assume that image configuration acquisition control (e.g., zoom control) is performed so that the subject size is set to V1 more accurately as necessary and that the captured image data having the image content illustrated in part (a) in FIG. 18 is recorded the preset maximum number of times.

Thereafter, if an image having a subject of the same size as that in part (a) in FIG. 18 is obtained as illustrated in part (b) in FIG. 18, the image illustrated in part (b) in FIG. 18 is not captured/recorded because the image configurations illustrated in parts (a) and (b) in FIG. 18 are determined to be the same.

On the other hand, assume that an actual person as a subject approaches the digital still camera 1 and that the image changes to that illustrated in part (c) in FIG. 18, where the subject size is larger than that in parts (a) and (b) in FIG. 18.

Then, assume that the subject size (vertical size is "V2 (V2>V1)") is determined to be appropriate in an appropriate image configuration determined on the basis of the image content. In accordance with this image configuration determination result, image configuration acquisition control (e.g., zoom control) is executed as necessary so that the subject size is set to V2 more accurately, and then the captured image data having the image content illustrated in part (c) in FIG. 18 can be recorded the present maximum number of times.

In this way, by using a subject size as an image configuration forming element, images of a subject having the same size in the frame can be prevented from being redundantly captured/recorded.

In the imaging system according to this embodiment, the process described above with reference to FIG. 4 as a basic structure can be applied.

That is, in the case where a determined appropriate image configuration has been exhausted, that is, in the case where the maximum number of times of capturing/recoding has been completed, the subsequent image configuration determining process can be continued by changing the image configuration determining algorithm. Accordingly, images having various appropriate image configurations can be captured/recorded even if no significant change occurs in the surrounding environment of the imaging system.

Now, a description is given about some examples of changing the image configuration determining algorithm in the imaging system of this embodiment.

FIG. 19 illustrates a first example of changing the image configuration determining algorithm.

First, part (a) in FIG. 19 illustrates the image content of an image obtained on the basis of an appropriate image configuration determined by a first image configuration determining algorithm. Here, assume that the subject size in this image is V1 and that the value of a zoom factor set at this time is Z1.

Here, assume that the image having the image content illustrated in part (a) in FIG. 19 has been captured/recorded the maximum number of times.

Thereafter, even if the image illustrated in part (a) in FIG. 19 is obtained by the first image configuration determining algorithm, the image is not captured/recorded.

Thus, in this case, the parameter of the subject size forming an appropriate image configuration is changed as an image configuration determining algorithm. Here, the parameter is changed by multiplying the subject size set in the first image configuration determining algorithm by "a".

Accordingly, an image captured at a zoom factor Z1×a can be obtained by image configuration acquisition control according to an image configuration determination result. In this image, the subject size in the frame 300 is increased to V1×a as illustrated in part (b) in FIG. 19.

Accordingly, the subject size is different from that in part (a) in FIG. 19, so that a different image configuration is obtained. Thereafter, the digital still camera 1 can record the captured image data having the image content illustrated in part (b) in FIG. 19 the preset maximum number of times.

In the above-described example, the parameter is changed to increase the subject size in accordance with the change of the image configuration determining algorithm. Alternatively, the parameter may be changed to decrease the subject size.

Figure 20:
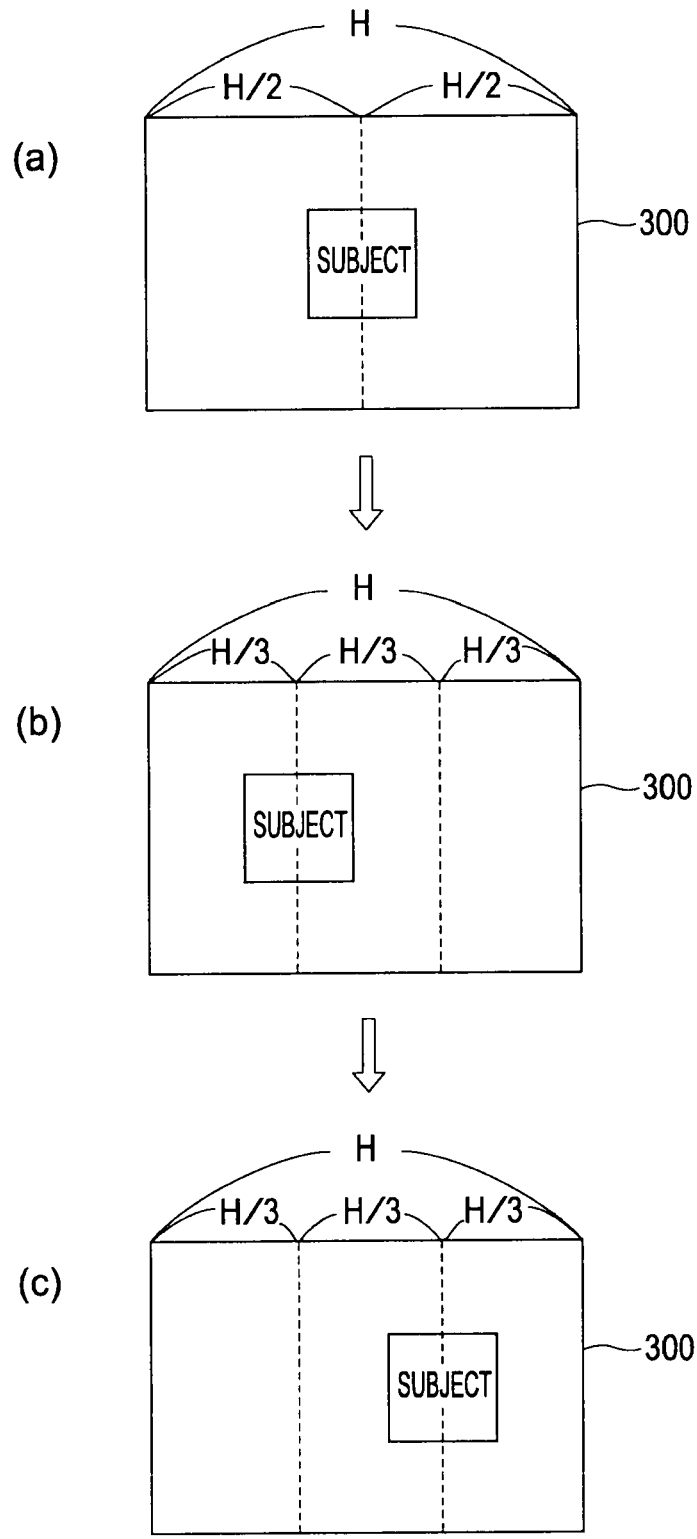
FIG. 20 illustrates a second example of changing an image configuration determining algorithm.

FIG. 20 illustrates a second example of changing the image configuration determining algorithm.

For example, part (a) in FIG. 20 illustrates image content of a captured image obtained by image configuration acquisition control based on a first image configuration determining algorithm. When attention is focused on the position of a subject in this image, the subject exists at a position where a perpendicular passes at the half of a horizontal size H of the frame 300, that is, at almost the center in the horizontal direction of the frame. That is, in the appropriate image configuration determined at this time, the state where the subject is positioned at "the center in the horizontal direction" is specified as appropriate.

Then, assume that the image having the image content with the subject position illustrated in part (a) in FIG. 20 is captured/recorded the maximum number of times.

After the image having the image content with the subject position illustrated in part (a) in FIG. 20 has been captured/recorded the maximum number of times, the image having the image configuration illustrated in part (a) in FIG. 20 is not captured/recorded any more. Thus, the subject position in the frame is changed on the basis of a second image configuration determining algorithm.

Part (b) in FIG. 20 illustrates a captured image obtained by image configuration acquisition control based on the second image configuration determining algorithm. In this figure, the subject is positioned on the left virtual line among virtual lines dividing the frame in the horizontal direction into three sections. That is, in this image configuration determining algorithm, the state where the subject is placed at "a position on the left virtual line among virtual lines dividing the frame in the horizontal direction into three sections" is set as appropriate.

In this way, by executing image configuration determination and image configuration acquisition control by changing the subject position to be specified as an image configuration determining algorithm, a captured image with a different subject position can be obtained. Then, the image having the image content with the subject position illustrated in part (b) in FIG. 20 can be captured/recorded the maximum number of times.

Furthermore, after the image having the image content with the subject position illustrated in part (b) in FIG. 20 has been captured/recorded the maximum number of times, the image having the image configuration illustrated in part (b) in FIG. 20 is not captured/recorded any more.

Thus, the second image configuration determining algorithm is changed to a third image configuration determining algorithm, that is, a parameter of the subject position different from the parameters in the first and second image configuration determining algorithms is set.

Part (c) in FIG. 20 illustrates a captured image obtained as a result of an image configuration determining process based on the third image configuration determining algorithm. In this figure, the subject is positioned on the right virtual line among the virtual lines dividing the frame in the horizontal direction into three sections. That is, in the image configuration determining algorithm in this case, "a position on the right virtual line among virtual lines dividing the frame in the horizontal direction into three sections" is set as an appropriate subject position.

Then, the image having the image content with the subject position illustrated in part (c) in FIG. 20 can be captured/recorded the maximum number of times.

As can be understood from the description given above with reference to FIG. 20, the image configuration determining algorithm can be changed a plurality of times in this embodiment.

Also, the subject position can be variously changed in a pattern other than that illustrated in FIG. 20.

Figure 21:
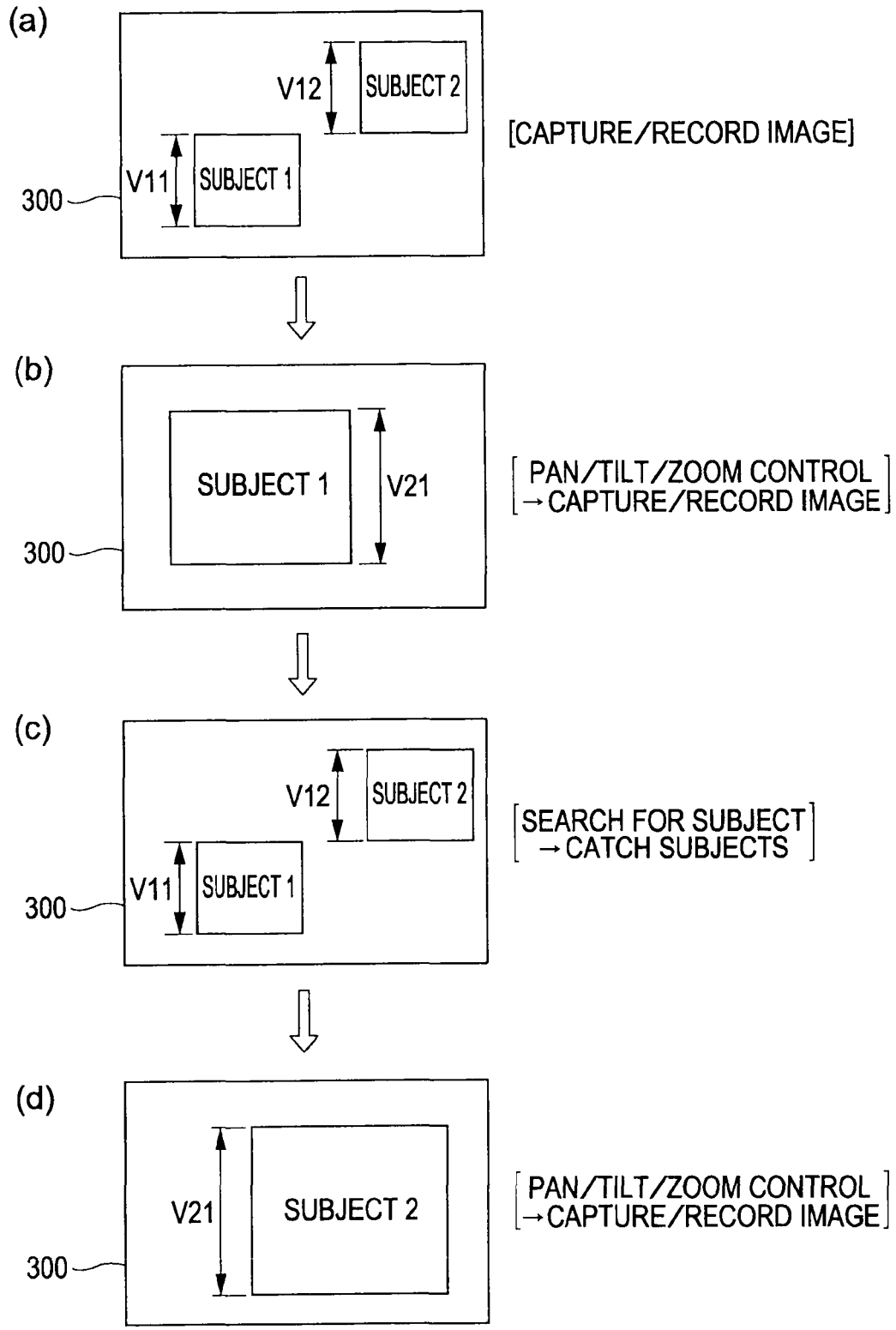
FIG. 21 illustrates a third example of changing an image configuration determining algorithm.

FIG. 21 illustrates a third example of changing the image configuration determining algorithm.

First, assume that the captured image illustrated in part (a) in FIG. 21 is obtained by image configuration acquisition control based on a first image configuration determining algorithm. In the image content illustrated in part (a) in FIG. 21, two subjects 1 and 2 exist in the frame 300. In the horizontal direction of the frame, subject 1 is positioned on the left whereas subject 2 is positioned on the right.

Assume that the digital still camera 1 captures/records the image data having the image content illustrated in part (a) in FIG. 21 the maximum number of times in accordance with the first image configuration determining algorithm.

According to the image configuration determination result based on this image configuration determining algorithm, "subjects 1 and 2 exist" is specified as appropriate on the basis of the state where two subjects 1 and 2 have been detected. Also, the state where "subject 1 has a size V11 whereas subject 2 has a size V12" is specified as appropriate.

Then, assume that captured image data having an image configuration in which both subjects 1 and 2 exist is obtained as in part (a) in FIG. 21. However, the captured image data of this image content is not recorded, and an image configuration determining process is executed by using a second image configuration determining algorithm. Part (b) in FIG. 21 illustrates the image content of a captured image obtained as a result of the image configuration determining process based on the second image configuration determining algorithm.

In part (b) in FIG. 21, only subject 1 among subjects 1 and 2 exists within the frame 300, and subject 1 has a predetermined subject size V21 that is larger than the subject size in part (a) in FIG. 21.

That is, in the second image configuration determining algorithm, the state where "only subject 1 exists" is specified as appropriate even if subjects 1 and 2 are detected in the frame. Also, the size "V2" larger than V11 is specified as appropriate in accordance with the single subject 1.

Then, the image having the image configuration illustrated in part (b) in FIG. 21 is captured/recorded the maximum number of times, so that the image data having the image configuration illustrated in part (b) in FIG. 21 is not captured/recorded any more. Accordingly, the image configuration determining algorithm is changed to a third image configuration determining algorithm.

In the third image configuration determining algorithm, the state where "only subject 2 exists", not subject 1, is specified as appropriate. As for size, "V21" is specified as appropriate.

An example of transition of image content of a captured image obtained by an image configuration determining process and image configuration acquisition control based on the third image configuration determining algorithm is illustrated in parts (c) and (d) in FIG. 21.

Here, assume that subjects 1 and 2 are detected and caught by search for a subject in a process according to the third image configuration determining algorithm as illustrated in part (c) in FIG. 21. The image content illustrated in part (c) in FIG. 21 is the same as that illustrated in part (a) in FIG. 21. At this time, however, the image configuration determining algorithm has already been changed to the third image configuration determining algorithm, and thus the captured image illustrated in part (c) in FIG. 21 is not recorded.

Instead, image configuration acquisition control is executed to obtain image content in which only subject 2 exists in the frame and subject 2 has a subject size of V21 in accordance with the third image configuration determining algorithm. As a result, an image having the image content illustrated in part (d) in FIG. 21 is obtained. The digital still camera 1 can execute the maximum number of times of capturing/recording on the image data having the image content obtained in this way.

Figure 22:
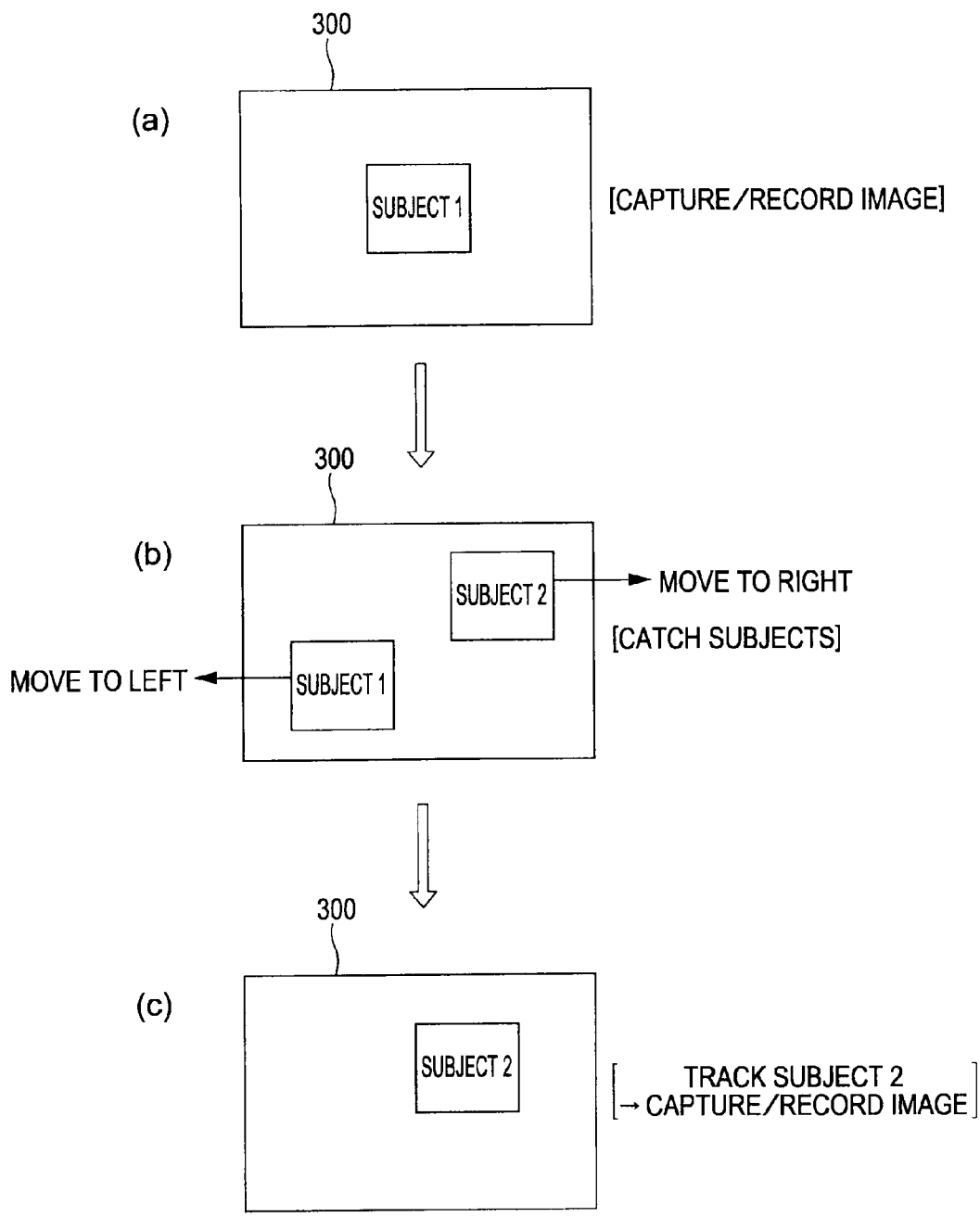
FIG. 22 illustrates a fourth example of changing an image configuration determining algorithm.

FIG. 22 illustrates a fourth example of changing the image configuration determining algorithm.

First, assume that the captured image illustrated in part (a) in FIG. 22 is obtained by image configuration acquisition control based on a first image configuration determining algorithm. That is, in this case, the state where "subject 1 exists" is specified as appropriate.

Also, assume that the digital still camera 1 executes the maximum number of times of capturing/recording on the image data having the image content illustrated in part (a) in FIG. 22.

Then, assume that image content in which subjects 1 and 2 exist in the frame is obtained as illustrated in part (b) in FIG. 22, as a result of search for a subject.

Note that, in this case, subject 1 is moving in the left direction in the frame whereas subject 2 is moving in the right direction in the frame by chance when the captured image illustrated in part (b) in FIG. 22 is obtained.

When such a state is detected, that is, the state where the moving directions of the subjects once detected and searched are different from each other, the image configuration determining algorithm is changed to obtain an image configuration not to place the two subjects 1 and 2 in the frame but to place any one of the two subjects in the frame. At this time, the subject that has not been captured/recorded is selected as a subject to be placed in the frame from among subjects 1 and 2. That is, subject 2 is selected in this case. At this selection, subjects 1 and 2 can be discriminated from each other by using an individual recognition result, for example.

Then, the imaging system of this embodiment (digital still camera 1 and pan/tilt head 10) executes control of a pan direction as image configuration acquisition control to track moving subject 2 in the state illustrated in part (b) in FIG. 22. Then, assume that the captured image illustrated in part (c) in FIG. 22 is obtained as a result of tracking subject 2. This captured image corresponds to an appropriate image configuration determined by the changed image configuration determining algorithm. Accordingly, the digital still camera 1 can capture/record the image data having the image content illustrated in part (c) in FIG. 22 the maximum number of times.

Next, a description is given about an example of a technical structure to realize automatic capturing/recording executed by the imaging system of this embodiment described above.

The example of the structure of the digital still camera 1 and the pan/tilt head 10 forming the imaging system of this embodiment has been described above with reference to FIGS. 7 and 8.

The capturing history information held in the capturing history holding unit 213 is described below.

FIG. 23 illustrates an example of a structure of the capturing history information.

The capturing history information includes a set of capturing history information units 1 to n. Each capturing history information unit stores history information of one automatic capturing/recording.

Each capturing history information unit includes, as illustrated in FIG. 23, file name, capturing date/time information, pan/tilt position information, number-of-subjects information, individual recognition information, in-frame position information, size information, face orientation information, and expression information.

The file name indicates a file name of captured image data recorded as a file in the memory card 40 by corresponding automatic capturing/recording. Alternatively, a file path may be used instead of the file name. In any case, the capturing history information unit is associated with the captured image data stored in the memory card 40 by the information of the file name or file path.

The capturing date/time information indicates the date/time when the corresponding automatic capturing/recording was executed.

The pan/tilt position information indicates the pan/tilt position that is set when the corresponding automatic capturing/recording was executed. The pan/tilt position information may be obtained from the pan/tilt/zoom control block 63.

The number-of-subjects information indicates the number of subjects (detected individual subjects) existing in the image (frame) of the corresponding captured image data, that is, the captured image data stored in the memory card 40 by the corresponding automatic capturing/recording.

The individual recognition information is information of an individual recognition result (individual recognition information) about each subject existing in the image of the corresponding captured image data.

The in-frame position information is information indicating the position in the frame of each subject existing in the image of the corresponding captured image data. For example, the in-frame position information can be expressed as a coordinate position of a point corresponding to the barycenter calculated for each subject in the frame.

The size information is information indicating the size in the frame of each subject existing in the image of the corresponding captured image data.

The face orientation information is information indicating the face orientation detected for each subject existing in the image of the corresponding captured image data.

The expression information is information indicating the expression (e.g., smile or not smile) detected for each subject existing in the image of the corresponding captured image data.

FIGS. 24 and 25 illustrate another example of the structure of the capturing history information.

According to the description given above, the in-frame position information, size information, face orientation information, and expression information are given for each subject existing in the image of the corresponding captured image data. In this case when data of individual recognition information as an individual recognition process result is to be obtained for each subject as in this embodiment, the above-described in-frame position information, size information, face orientation information, and expression information can be associated with each subject recognized as an individual (individual recognition information). FIGS. 24 and 25 illustrate an example of the structure in the case where the in-frame position information, size information, face orientation information, and expression information are associated with each subject recognized as an individual.

First, FIG. 24 illustrates the structure of the entire capturing history information. That is, in this example, the entire structure illustrated in FIG. 24 is held instead of the structure illustrated in FIG. 23.

The capturing history information illustrated in FIG. 24 is the same in terms of being formed of a set of the capturing history information units 1 to n. However, the information forming each capturing history information unit includes file name, capturing date/time information, pan/tilt position information, and individual recognition information.

Furthermore, the individual recognition information has the structure illustrated in FIG. 25.

The individual recognition information illustrated in FIG. 25 is formed as a set of individual recognition information units 1 to m. Each individual recognition information unit corresponds to a subject existing in the image of the corresponding captured image data in one-to-one relationship. Thus, the number of subjects existing in the image of the corresponding captured image data (number-of-subjects information) can be recognized on the basis of the number of individual recognition information units.

Each individual recognition information unit includes individual subject ID, individual feature parameters, in-frame position information, size information, face orientation information, and expression information.

The individual subject ID is a unique identifier given to each recognized individual during an individual recognition process. For example, if the same subject A is automatically captured/recorded in different opportunities, the same individual subject ID corresponding to subject A is stored as individual recognition information in the capturing history information corresponding to those automatic capturing/recording.

For example, in an individual recognizing process, values obtained according to the recognizing process are calculated as predetermined parameters that can represent an individual feature value. The values of the parameters calculated in this way are stored as individual feature parameters.

For example, in the case of determining whether a subject as an individual detected in current captured image data has already been captured/recorded, individual feature parameters obtained in real time from an individual recognizing process performed on the subject existing in the current captured image data may be compared with individual feature parameters stored in the individual recognition information in the capturing history information.

The in-frame position information, size information, face orientation information, and expression information in each individual recognition information unit indicate the in-frame position, subject size, face orientation, and expression of the subject as the corresponding individual.

Hereinafter, descriptions are given under the assumption that the capturing history information has the structure illustrated in FIGS. 24 and 25.

Figure 26:
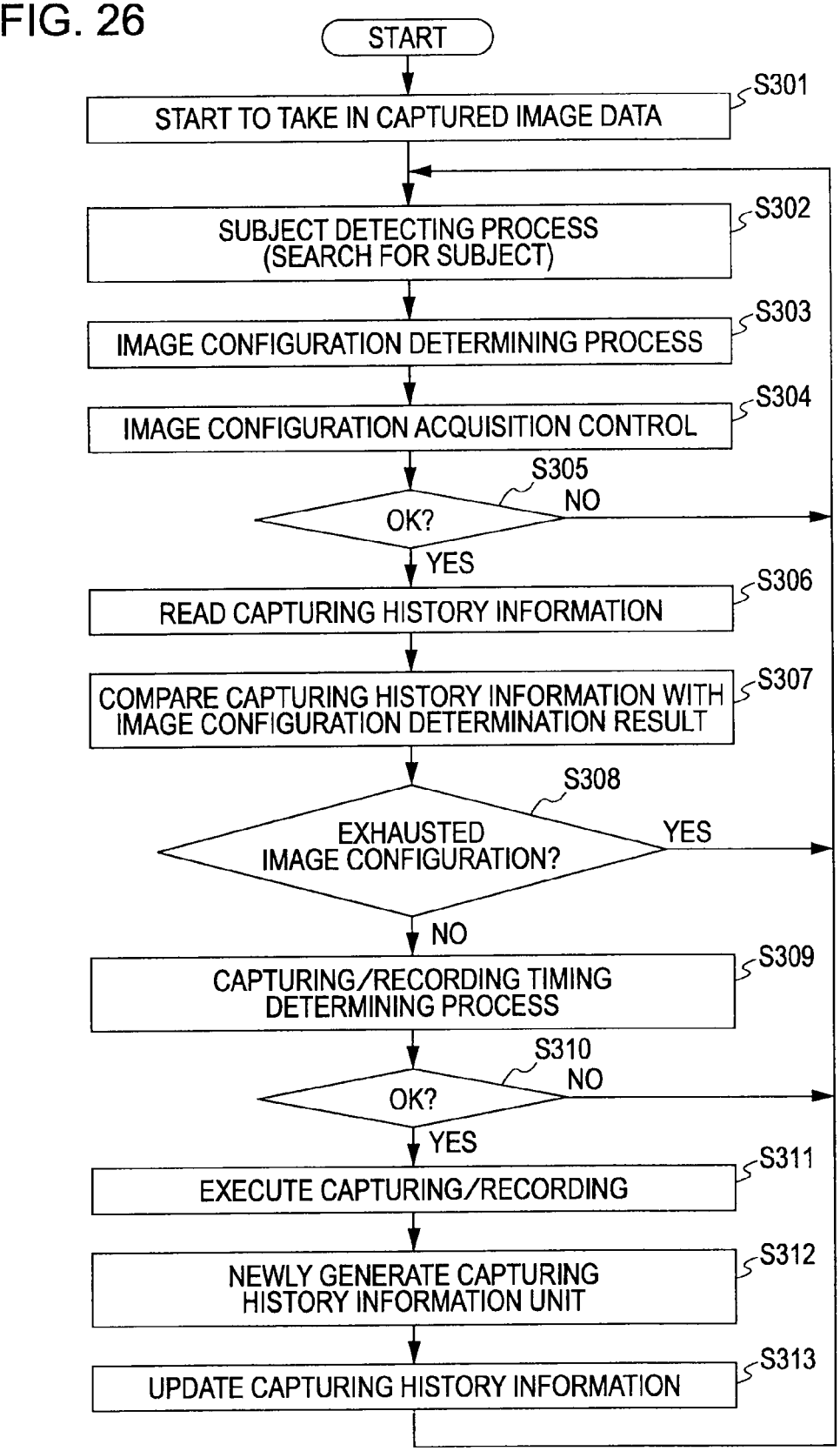
FIG. 26 is a flowchart illustrating a first example of a process procedure for automatic capturing/recording in the imaging system of the embodiment.

The flowchart in FIG. 26 illustrates a first example of a process procedure executed by the image configuration determining bock 62 in accordance with automatic capturing/recording in the imaging system of this embodiment. The first example of the process procedure corresponds the procedure of not changing the image configuration determining algorithm illustrated in FIG. 3 in the correspondence with the above-described basic structure.

Referring to FIG. 26, the subject detecting unit 211 starts to take in captured image data in step S301.

In step S302, the subject detecting unit 211 executes the subject detecting process described above by using the captured image data that has been taken in. Accordingly, individual feature parameters recognized for each individual subject, and an in-frame position, a subject size, a face orientation, and en expression of each individual subject are detected. This subject detecting process is executed for each image frame or a predetermined number of frames, for example.

In step S303, the image configuration determining process unit 212 recognizes the individual corresponding to each subject that is currently detected and various conditions including the number of subjects and a subject size by using the subject detection information and the captured image data obtained in step S302, and executes an image configuration determining process in accordance with a predetermined image configuration determining algorithm.

In step S304, the image configuration determining process unit 212 executes image configuration acquisition control to obtain image content of captured image data having an appropriate image configuration determined in the image configuration determining process. For example, if a subject position and a subject size are set as forming elements of this appropriate image configuration, the image configuration determining process unit 212 instructs the pan/tilt/zoom control block 63 to obtain the set subject position and subject size (pan/tilt/zoom control).

The image configuration determining process unit 212 determines whether image content having the appropriate image configuration of the captured image data has been obtained (OK) in step S305 while executing the image configuration acquisition control in step S304. For this determination, the image configuration determining process unit 212 can use subject detection information that can be obtained from a subject detecting process performed by the subject detecting unit 211 on the captured image data of which image content changes according to the image configuration acquisition control.

If image content having the appropriate image configuration is obtained at certain timing by execution of the image configuration acquisition control, a positive determination result is obtained in step S305. In this case, the process proceeds to step S306.

On the other hand, if image content having the appropriate image configuration is not obtained by execution of all controls necessary for the image configuration acquisition control, a negative determination result is obtained in step S305. In this case, the process returns to step S302, where a subject detecting process to search for a subject is executed.

In step S306, the image configuration determining process unit 212 reads the capturing history information from the capturing history holding unit 213. Then, in step S307, the image configuration determining process unit 212 compares the capturing history information with the image configuration determination result obtained in step S303. The information items forming the image configuration determination result mainly include various pieces of information about the subject determined to be a capturing target, as described below. The various pieces of information can be the information items forming the individual recognition information illustrated in FIG. 25.

Also, the image configuration determination result includes information of an actual pan/tilt position at the timing when the image content having the appropriate image configuration is obtained by the image configuration acquisition control (the timing when a positive determination result is obtained in step S305). The pan/tilt position information is obtained from the image configuration acquisition control in step S304 and thus can be regarded as an element forming the image configuration determination result.

In step S308, the image configuration determining process unit 212 determines whether the image configuration determined in step S303 has been exhausted (exhausted image configuration) on the basis of the result obtained in step S307. That is, the image configuration determining process unit 212 determines whether the captured image data of the image content having the image configuration determined in step S303 has been captured/recorded the preset maximum number of times.

A specific example of the process procedure corresponding to steps S307 and S308 is described below with reference to FIG. 27.

If the image configuration has been exhausted and a positive determination result is obtained in step S308, the process returns to step S302, where search for a subject restarts. In such a case where the determined image configuration is determined to have been exhausted, search for a subject, a subject detecting process, and an image configuration determining process are executed again. Accordingly, image data having the same image configuration can be prevented from being captured/recorded more than the maximum number of times.

On the other hand, if the image configuration has not been exhausted and a negative determination result is obtained in step S308, the process proceeds to step S309.

In step S309, the image configuration determining process unit 212 executes a determining process about capturing/recording timing, and then determines in step S310 whether the capturing/recording timing has come (OK) on the basis of the result of the determining process.

The digital still camera 1 of this embodiment is capable of detecting a facial expression of a detected subject. The capturing/recording timing determined in step S309 relates to the detection of expression.

For example, assume that an appropriate expression, which is one of image configuration forming elements, of a specific detected individual subject is determined to be smile as a result of the image configuration determination executed in step S303.

In this case, it is determined in step S309 whether the expression of the specific detected individual subject that is currently detected in real time is smile. That is, in the image configuration acquisition control, acquisition of smile, which is specified as one of image configuration forming elements, is waited for.

Then, when smile of the specific detected individual subject is detected at certain timing, a positive determination result is obtained in step S310, so that the process proceeds to step S311. On the other hand, if smile of the specific detected individual subject is not detected within a predetermined time period, a negative determination result is obtained in step S310, so that the process returns to step S302.

In step S311, the image configuration determining process unit 212 allows capturing/recording to be executed. Specifically, the image configuration determining process unit 212 instructs the recording control system of the digital still camera 1 to execute an operation of recording the captured image data obtained at the time in the memory card 40 as a still image file.

Then, in step S312, the image configuration determining process unit 212 newly generates a capturing history information unit (FIGS. 24 and 25) on which the capturing/recording result of this time is reflected. In step S313, the capturing history information held in the capturing history holding unit 213 is updated with the newly generated capturing history information unit.

Now, a specific example of the process corresponding to steps S307 and S308 in FIG. 26 is described with reference to the flowchart in FIG. 27. The process corresponding to steps S307 and S308 is a process to compare the capturing history information with image configuration determination information, and is a process to eventually output a determination result indicating whether the determined appropriate image configuration has been exhausted.

Figure 27:
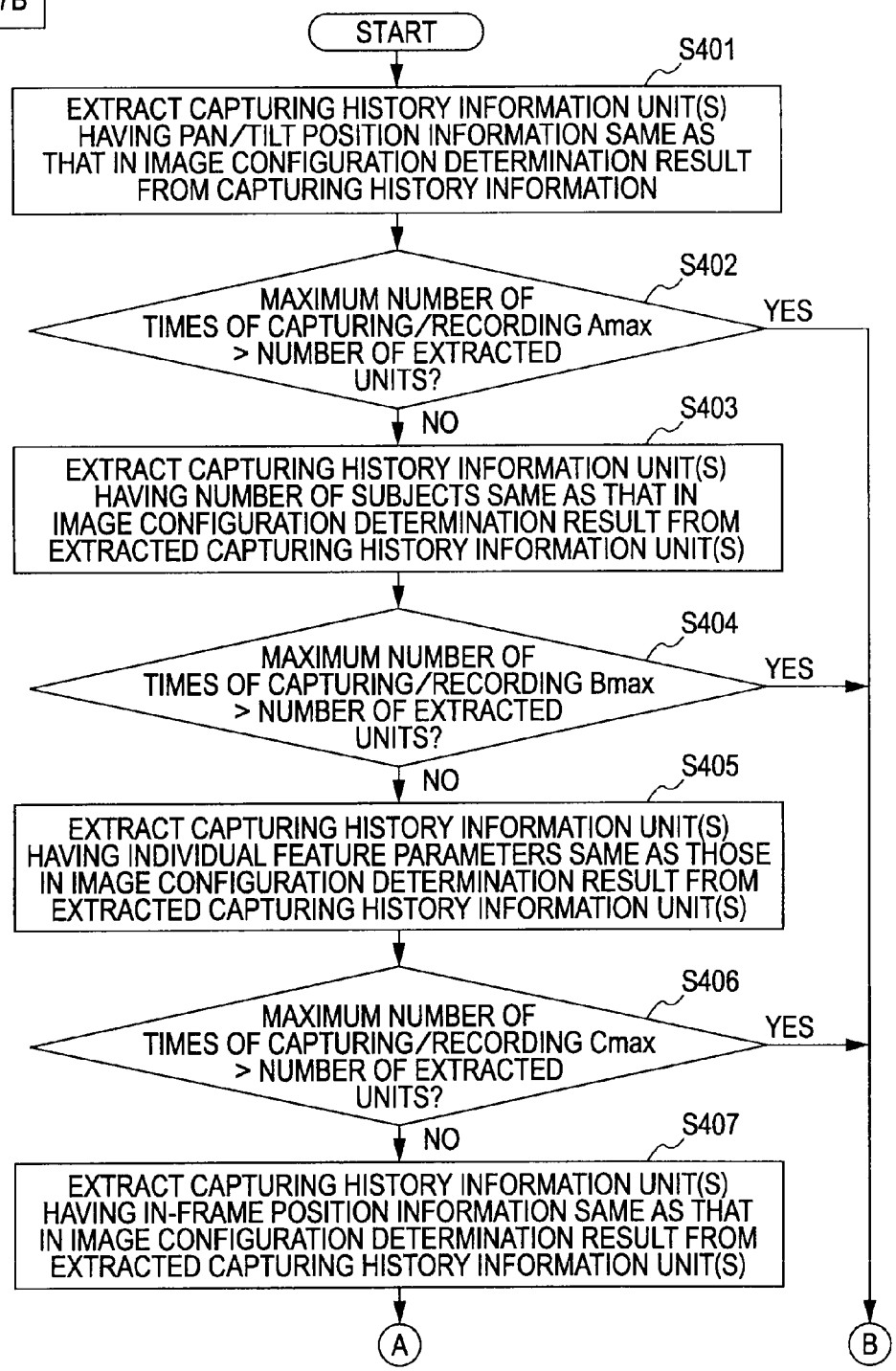
FIG. 27 is a flowchart illustrating an example of a procedure of a process of determining an exhausted image configuration in the imaging system of the embodiment.

Referring to FIG. 27, in step S401, the image configuration determining process unit 212 extracts, from the capturing history information, one or more capturing history information units having the pan/tilt position information same as the pan/tilt position information obtained as an image configuration determination result. As described above, the pan/tilt position information obtained as an image configuration determination result indicates the pan/tilt position that is actually set in the pan/tilt mechanism unit when an OK determination is obtained in step S305 as a result of the image configuration acquisition control in step S304 in FIG. 26.

Then, in step S402, the image configuration determining process unit 212 determines whether the number of capturing history information units extracted in step S401 (the number of extracted units) is smaller than a maximum number of times of capturing/recording Amax that is set according to the pan/tilt position as an image configuration forming element.

Obtaining a positive determination result in step S402 means that the maximum number of times Amax of capturing/recording has not been completed on the captured image data having the image configuration determined this time when attention is focused on only the pan/tilt position as an image configuration forming element. In other words, capturing/recording at the pan/tilt position determined this time as an element of the image configuration can be executed the number of times expressed by subtracting the number of extracted units from the maximum number of times Amax.

Thus, in this case, the process proceeds to step S416, where a determination result indicating that the image configuration determined this time has not been exhausted is immediately output.

Step S416 corresponds to obtaining a negative determination result indicating that the image configuration has not been exhausted in step S308 in FIG. 26.

On the other hand, obtaining a negative determination result in step S402 means that the number of pieces of captured image data recorded at the pan/tilt position same as that in the image configuration determined this time is equal to the maximum number of times of capturing/recording Amax. In this case, it is possible that the image configuration determined this time has been exhausted.

In this stage, however, whether capturing/recording has been done is not determined about image configuration forming elements other than the pan/tilt position information in the image configuration determined this time. Thus, the process proceeds to step S403, where the image configuration determining process unit 212 determines whether capturing/recording has been done about the other image configuration forming elements.

In step S403, the image configuration determining process unit 212 extracts, from the capturing history information unit(s) extracted in step S401 (extracted capturing history information unit(s)), one or more capturing history information units having the number of subjects same as the number of subjects obtained as the image configuration determination result this time. Then, in step S404, the image configuration determining process unit 212 determines whether the number of extracted units is smaller than a maximum number of times of capturing/recording Bmax that is set according to the number of subjects.

If a positive determination result is obtained in step S404, it means that the maximum number of times Bmax of capturing/recording has not been completed on the image having the image content including the number of subjects same as that in the image configuration determined this time. That is, in this stage, the image has not been exhausted in terms of the number of subjects as an image configuration forming element. Therefore, the image having the number of subjects same as that in the image configuration determined this time can be captured/recorded the number of times expressed by subtracting the number of extracted units from the maximum number of times of capturing/recording Bmax. Thus, in this case, the process proceeds to step S416, where a determination result indicating that the image configuration has not been exhausted is output, as in the case of obtaining a positive determination result in step S402.

On the other hand, if a negative determination result is obtained in step S404, the process proceeds to step S405 like in the case of obtaining a negative determination result in step S402, that is, in order to determine whether the image has been captured/recorded about the image configuration forming elements other than the pan/tilt position information and the number of subjects.

In step S405, the image configuration determining process unit 212 extracts, from the capturing history information unit (s) extracted in step S403, one or more capturing history information units having the individual feature parameters same as the individual feature parameters obtained as the image configuration determination result this time. Then, in step S406, the image configuration determining process unit 212 determines whether the number of the extracted units is smaller than a maximum number of times of capturing/recording Cmax that is set according to the individual feature parameters.

If a positive determination result is obtained in step S406, a determination result indicating that the image configuration has not been exhausted is output in step S416. If a negative determination result is obtained, the process proceeds to step S407.

In step S407, the image configuration determining process unit 212 extracts, from the capturing history information unit (s) extracted in step S405, one or more capturing history information units having the in-frame position information same as the in-frame position information obtained as the image configuration determination result this time. Then, in step S408, the image configuration determining process unit 212 determines whether the number of the extracted units is smaller than a maximum number of times of capturing/recording Dmax that is set according to the in-frame position information.

If a positive determination result is obtained in step S408, a determination result indicating that the image configuration has not been exhausted is output in step S416. If a negative determination result is obtained, the process proceeds to step S409.

In step S409, the image configuration determining process unit 212 extracts, from the capturing history information unit (s) extracted in step S407, one or more capturing history information units having the size information same as the size information obtained as the image configuration determination result this time. Then, in step S410, the image configuration determining process unit 212 determines whether the number of the extracted units is smaller than a maximum number of times of capturing/recording Emax that is set according to the size information.

If a positive determination result is obtained in step S410, a determination result indicating that the image configuration has not been exhausted is output in step S416. If a negative determination result is obtained, the process proceeds to step S411.

In step S411, the image configuration determining process unit 212 extracts, from the capturing history information unit (s) extracted in step S409, one or more capturing history information units having the face orientation information same as the face orientation information obtained as the image configuration determination result this time. Then, in step S412, the image configuration determining process unit 212 determines whether the number of the extracted units is smaller than a maximum number of times of capturing/recording Fmax that is set according to the face orientation information.

If a positive determination result is obtained in step S412, a determination result indicating that the image configuration has not been exhausted is output in step S416. If a negative determination result is obtained, the process proceeds to step S413.

In step S413, the image configuration determining process unit 212 extracts, from the capturing history information unit (s) extracted in step S411, one or more capturing history information units having the expression information same as the expression information obtained as the image configuration determination result this time. Then, in step S414, the image configuration determining process unit 212 determines whether the number of the extracted units is smaller than a maximum number of times of capturing/recording Gmax that is set according to the expression information.

If a positive determination result is obtained in step S414, a determination result indicating that the image configuration has not been exhausted is output in step S416.

On the other hand, if a negative determination result is obtained in step S414, it means that the image configuration has been exhausted in terms of all the image configuration forming elements: pan/tilt position information, the number of subjects, individual feature parameters, in-frame position information, size information (subject size), face orientation information, and expression information.

Therefore, in this case, the process proceeds to step S415, where a determination result indicating that the image configuration determined this time has been exhausted is output.

Step S415 corresponds to obtaining a positive determination result in step S308 in FIG. 26.

Next, a second example of the process procedure executed by the image configuration determining block 62 is described with reference to the flowchart in FIG. 28. The second example of the process corresponds to the process of changing the image configuration determining algorithm illustrated in FIG. 4 in the correspondence with the above-described basic structure.

Furthermore, in the imaging system of this embodiment, the image configuration determining algorithm can be classified into two types: a first-type image configuration determining algorithm and a second-type image configuration determining algorithm.

The first-type image configuration determining algorithm is, for example, an image configuration determining algorithm that uses the image configuration forming elements except expression, i.e., pan/tilt position, the number of subjects, individual feature parameters, in-frame position, subject size, and face orientation, in order to determine an exhausted image configuration in FIG. 27.

On the other hand, the second-type image configuration determining algorithm is an image configuration determining algorithm that uses expression as an image configuration forming element in order to determine an exhausted image configuration in FIG. 27.

The first-type image configuration determining algorithm is an algorithm that mainly uses the image configuration forming elements to determine a composition as an image configuration. On the other hand, the second-type image configuration determining algorithm is associated with the capturing/recording timing determining process in step S309 illustrated in FIG. 26, and is an algorithm that uses the image configuration forming element to determine the capturing/recording timing. In view of this point, an algorithm to determine the capturing/recording timing when the face orientation is determined to be appropriate may be used. In this case, the face orientation can be used in the second-type image configuration determining algorithm.

Figure 28:
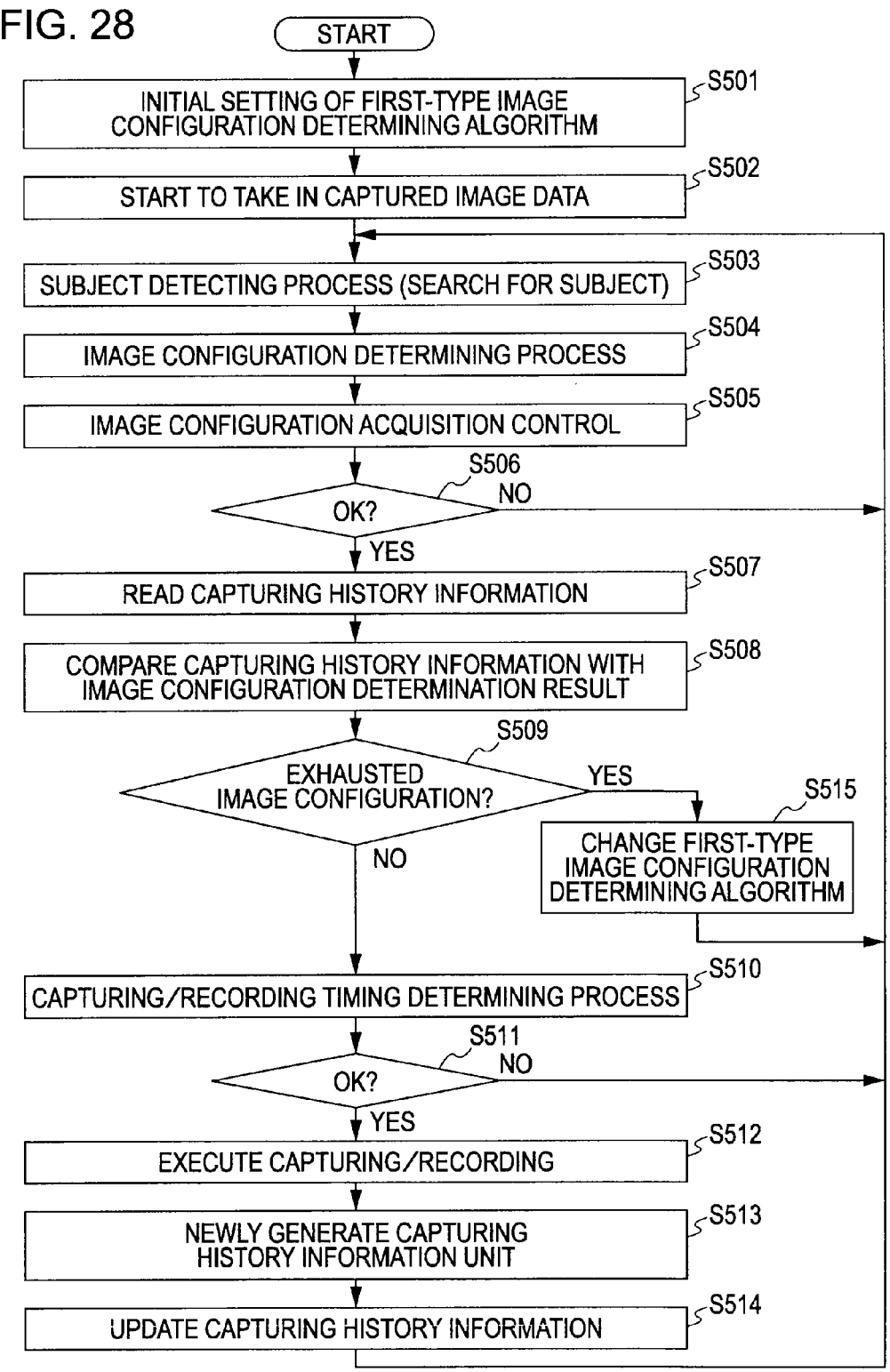
FIG. 28 is a flowchart illustrating a second example of the process procedure for automatic capturing/recording in the imaging system of the embodiment.

The second example illustrated in FIG. 28 is a process procedure of changing the first-type image configuration determining algorithm among the first-type and second-type image configuration determining algorithms.

Referring to FIG. 28, in step S501, the image configuration determining process unit 212 sets an algorithm that is predetermined for initial setting, among a plurality of first-type image configuration determining algorithms.

Steps S502 to S514 are the same as steps S301 to S313 in FIG. 26.

However, if a positive determination result is obtained in a process of determining whether the image configuration has been exhausted in step S509, the first-type image configuration determining algorithm is changed to another in step S515, and then the process returns to step S503.

With this process, if the determined image configuration has been exhausted, the image configuration determining process is executed again with a different first-type image configuration determining algorithm, so that a new image configuration can be determined to be an appropriate image configuration. Accordingly, even if no significant change occurs in the image content of captured image data, image data of image content having a different image configuration can be captured/recorded.

Note that the number of variations of the first-type image configuration determining algorithm that is changeable in step S515 is not particularly limited. If all the changeable algorithms are used by repeating step S515, the first algorithm is used again and then the algorithms may be changed one after another.

A specific example of step S515 is described. In the correspondence with FIG. 19, an algorithm defining V1 as a subject size to satisfy a condition of an appropriate image configuration (part (a) in FIG. 19) is changed to an algorithm defining V1×a as a subject size (part (b) in FIG. 19).

In the correspondence with FIG. 20, an algorithm defining a subject position to satisfy a condition of an appropriate image configuration is changed from part (a) to part (b) in FIG. 20 or from part (b) to part (c) in FIG. 20.

In the correspondence with FIG. 21, an algorithm defining the number of subjects to satisfy a condition of an appropriate image configuration is changed from part (a) to part (b) in FIG. 21, that is, the number of subjects is changed from 2 to 1. Furthermore, the subject itself to satisfy the condition of an appropriate image configuration is changed from subject 1 to subject 2 as illustrated as transition from part (b) to parts (c) and (d) in FIG. 21.

At this time, the algorithm may be changed from the algorithm to capture only an individual as subject 1 to the algorithm to capture only an individual as subject 2 by using the individual recognition parameters of subjects 1 and 2, as a rule of changing the subject itself.

Alternatively, the algorithm may be changed from the algorithm to capture only a subject on the left to the algorithm to capture only a subject on the right.

Figure 29:
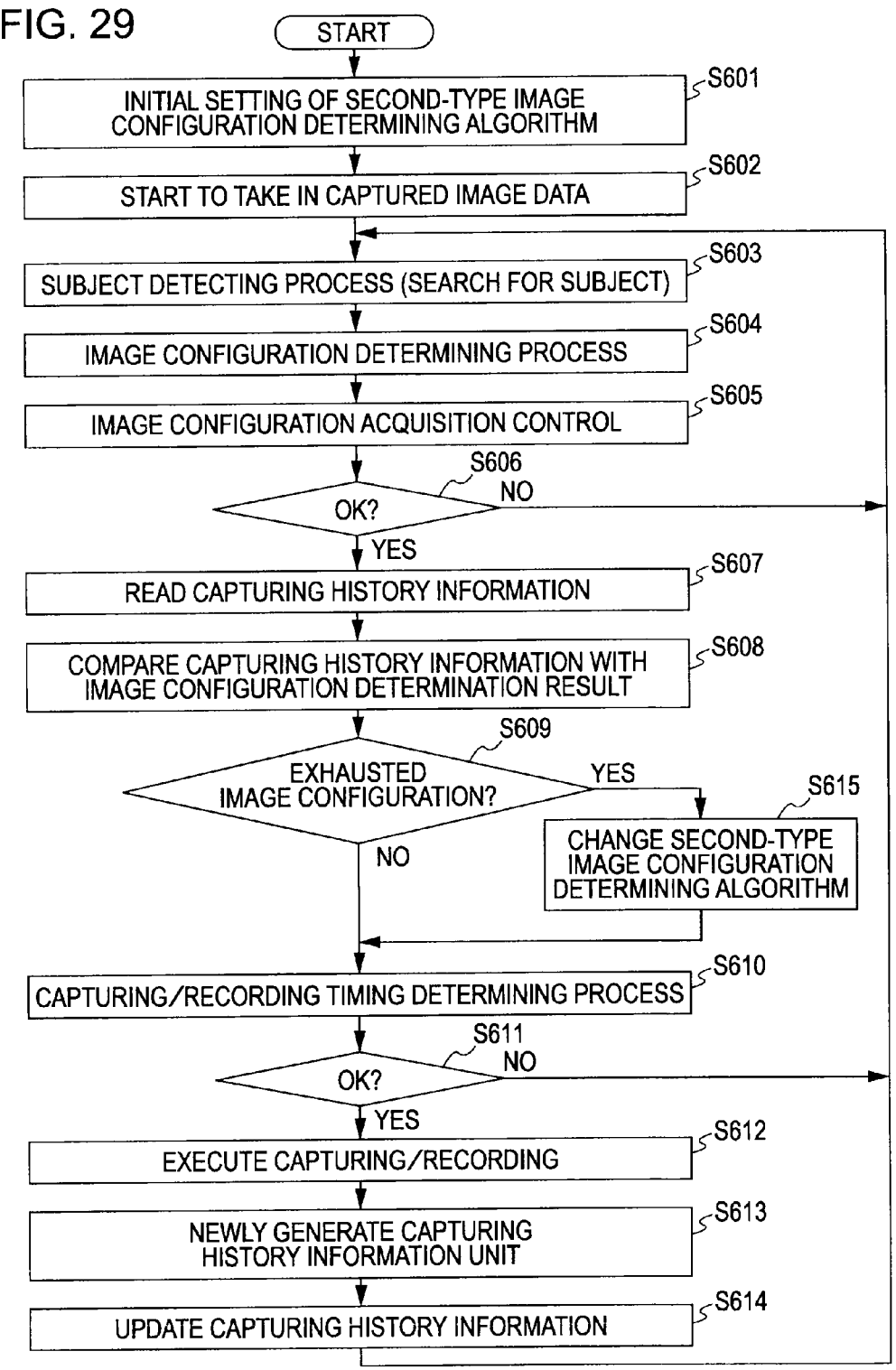
FIG. 29 is a flowchart illustrating a third example of the process procedure for automatic capturing/recording in the imaging system of the embodiment.

FIG. 29 illustrates a third example of the process procedure executed by the image configuration determining block 62.

Like the second example illustrated in FIG. 28, the third example of the process corresponds the process of changing the image configuration determining algorithm illustrated in FIG. 4 in the correspondence with the above-described basic structure. However, in the third example, the second-type image configuration determining algorithm among the first-type and second-type image configuration determining algorithms is changed.

Referring to FIG. 29, in step S601, the image configuration determining process unit 212 sets an algorithm that is predetermined for initial setting, among a plurality of second-type image configuration determining algorithms.

Steps S602 to S614 are the same as steps S301 to S313 in FIG. 26.

However, if a positive determination result is obtained in the process of determining whether the image configuration has been exhausted in step S609, the second-type image configuration determining algorithm is changed in step S615, and then the process proceeds to step S610. In step S610, it is determined whether capturing/recording timing is OK in accordance with the algorithm changed in step S615.

For example, assume that the algorithm defining a smile as an expression condition of an appropriate image configuration is changed to an algorithm defining non-smile in step S615. Accordingly, the capturing/recording timing is determined to be OK in steps S610 and S611 when the subject existing in the captured image data at the time is not smiling.

In the second-type image configuration determining algorithm, too, the number of variations of the algorithm to be changed is not limited. In accordance with repetition of step S615, the algorithm may be changed by rotating the plurality of variations.

The second-type image configuration determining algorithm relates to capturing/recording timing. Thus, in the flow of the process illustrated in FIG. 29, the process does not return to step S603 after the second-type image configuration determining algorithm is changed in step S615, but the process proceeds to step S610 to execute the capturing/recording timing determining process.

Alternatively, the process may return from step S615 to S603. This is because, in such a procedure, the capturing/recording timing determining process based on a changed second-type image configuration determining algorithm is eventually executed in step S610.

Figure 30:
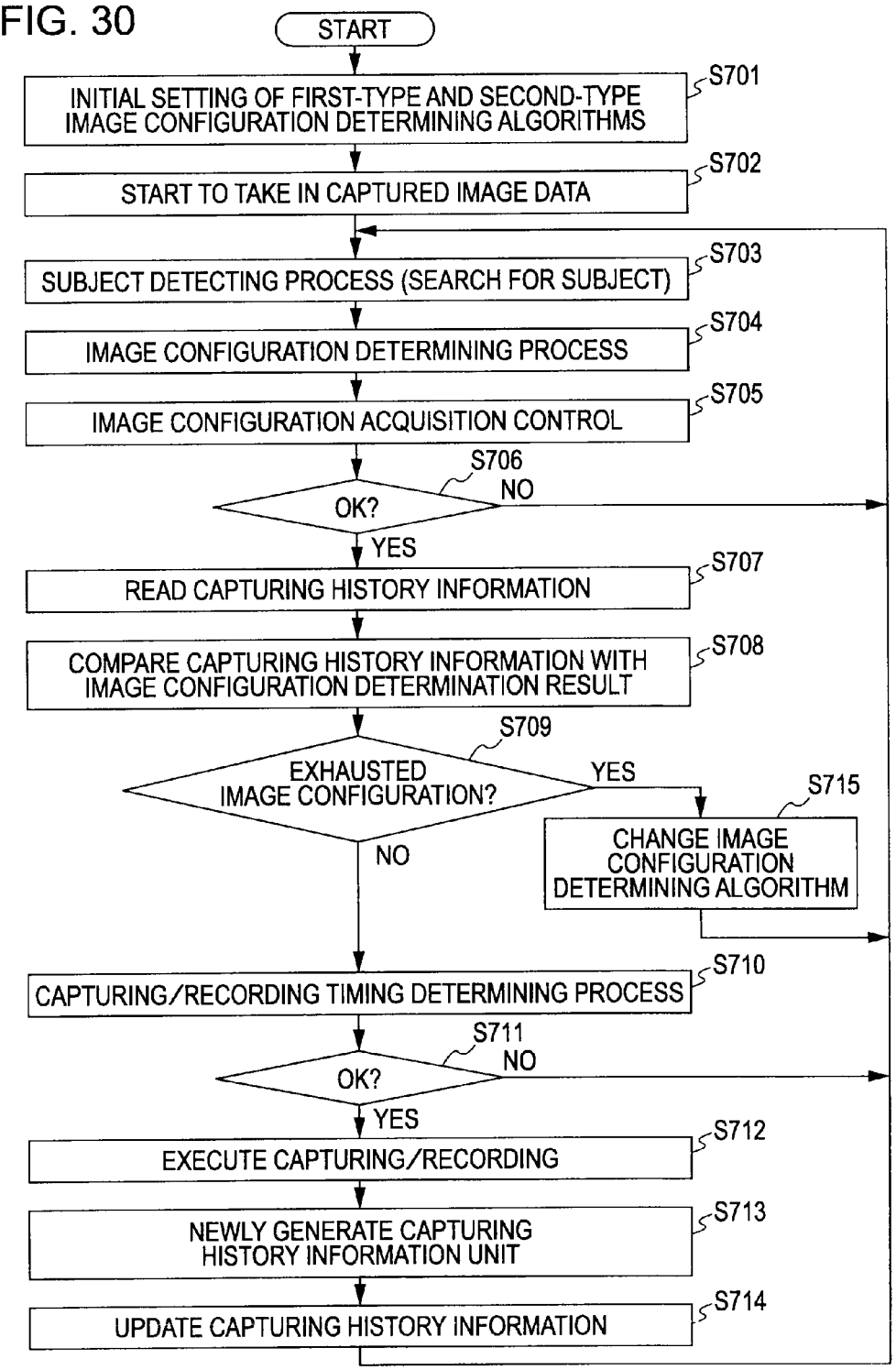
FIG. 30 is a flowchart illustrating a fourth example of the process procedure for automatic capturing/recording in the imaging system of the embodiment.

FIG. 30 illustrates a fourth example of the process procedure executed by the image configuration determining block 62.

The fourth example of the process corresponds the process of changing the image configuration determining algorithm illustrated in FIG. 4 in the correspondence with the above-described basic structure. However, in the fourth example, both the first-type and second-type image configuration determining algorithms may be changed.

Referring to FIG. 30, in step S701, the image configuration determining process unit 212 sets first-type and second-type image configuration determining algorithms that are predetermined for initial setting, among a plurality of first-type image configuration determining algorithms and a plurality of second-type image configuration determining algorithms.

Steps S702 to S714 are the same as steps S301 to S313 in FIG. 26.

However, if a positive determination result is obtained in a process of determining whether the image configuration has been exhausted in step S709, the image configuration determining algorithm is changed in step S715, and then the process returns to step S703.

In step S715, at least any one of the first-type and second-type image configuration determining algorithms may be changed. That is, only the first-type image configuration determining algorithm may be changed, or only the second-type image configuration determining algorithm may be changed. Alternatively, both the first-type and second-type image configuration determining algorithms may be simultaneously changed.

Regarding how to change the image configuration determining algorithm in step S715, which is also applied to the first to third examples, an appropriate image configuration determining algorithm to be used next may be set on the basis of the image configuration determining algorithm that is currently set.

A specific example of step S715 is described.

In the state where subjects A and B that have been individually recognized are detected in search for subjects, assume that an image configuration determining algorithm to obtain an image configuration determination result "only subject A exists, expression is smile" is set. In this case, the state where "only an individual as subject A exists" is specified as appropriate in the first-type image configuration determining algorithm, whereas the state where "expression is smile" is specified as appropriate in the second-type image configuration determining algorithm.

Also, assume that the algorithm is changed to an algorithm "only subject B exists, expression is not smile" in step S715 in a certain stage thereafter. This is a change from the first-type image configuration determining algorithm specifying that the state where "only an individual as subject A exists" is appropriate to the first-type image configuration determining algorithm specifying that the state where "only an individual as subject B exists" is appropriate. Also, this is a change from the second-type image configuration determining algorithm specifying that the state where "expression is smile" is appropriate to the second-type image configuration determining algorithm specifying that the state where "expression is not smile" is appropriate.

Incidentally, the maximum number of times of capturing/recording for each image configuration forming element illustrated in FIG. 27 corresponds to the number of images having the same image configuration of each forming element that can be captured/recorded. According to the description given above, the maximum number of times of capturing/recording is preset and fixed. Alternatively, the maximum number of times of capturing/recording, that is, the maximum number of times of recording a captured image having the same image configuration, can be adaptively changed in accordance with a predetermined condition.

Now, an example of the structure of adaptively changing the maximum number of times of capturing/recording is described.

The digital still camera 1 of this embodiment is capable of executing individual recognition. Thus, an individual recognizing process is executed by the digital still camera 1 of this embodiment on people who exist in a site where the imaging system of this embodiment is placed, and individual feature parameters obtained through the recognition are registered in advance.

FIG. 31 illustrates an example of a structure of an individual registration table that is formed by registering individual feature parameters. The individual registration table is held in the RAM 29 or the flash memory 30, for example.

The individual registration table illustrated in FIG. 31 includes registered data units 1 to i. Each of the registered data units corresponds to a recognized individual.

As illustrated in FIG. 31, the registered data unit includes individual subject ID, feature parameters 1 to j, and main subject information.

The individual subject ID is a unique identifier assigned to each individual registered in the individual registration table. The feature parameters 1 to j are various parameters that are obtained as a result of an individual recognizing process and that specify the individual. By using the feature parameters 1 to j, the face of each individual can be specifically identified.

Main subject information indicates whether the corresponding individual is a main subject. Here, the main subject means an individual subject having high importance among subjects as individuals (individual subjects) to be captured by the imaging system of this embodiment.

A user can select a main subject from among the individuals registered in the individual registration table and register the selected main subject by performing a predetermined operation on the digital still camera 1. In accordance with this operation, a value indicating the main subject is stored as main subject information in the registered data unit corresponding to the individual registered as a main subject in the individual registration table.

In this embodiment, the digital still camera 1 captures/records more images having an image configuration including the individual set as a main subject among the registered individuals than images having an image configuration not including the individual set as a main subject.

For example, images of a main character of a party or the like should preferably be captured/recorded more than images of other people. Such a demand can be satisfied by adopting the above-described structure.

Next, a description is given about an example of a process procedure to realize an operation of capturing/recording more images of an individual set as a main subject (main-subject-conscious capturing/recording).

In the description given below, the case where main-subject-conscious capturing/recording is performed in the process of the fourth example illustrated in FIG. 30 is used as an example. In order to realize the main-subject-conscious capturing/recording in the process illustrated in FIG. 30, the process illustrated in FIG. 32 is additionally inserted between steps S706 and S707 in FIG. 30.

Figure 32:
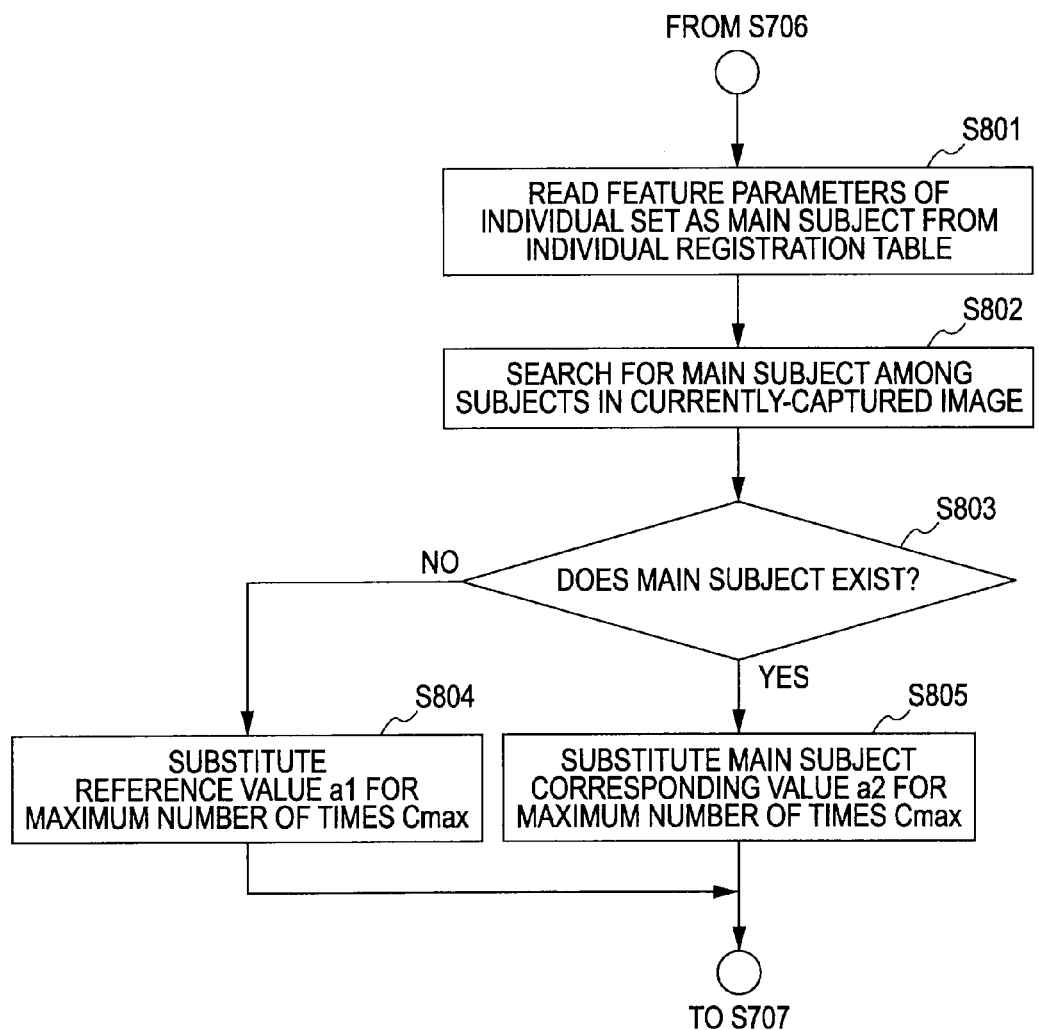
FIG. 32 is a flowchart illustrating an example of a process procedure for main-subject-conscious capturing/recording.

Referring to FIG. 32, in step S801, the image configuration determining process unit 212 searches the individual registration table currently held in the RAM 29 or the flash memory 30 for the individual set as a main subject. For this purpose, the image configuration determining process unit 212 may search for the registered data unit having main subject information indicating a main subject among the registered data units forming the individual registration table. Then, the feature parameters are read and obtained from the individual registration table. That is, in step S801, the individual feature parameters of the individual set as a main subject are obtained.

Then, in step S802, the image configuration determining process unit 212 searches for the main subject among subjects detected from the captured image data that is currently obtained (currently-captured image data). For this purpose, the image configuration determining process unit 212 may search for the subject having the individual feature parameters that match the individual feature parameters obtained in step S801, among the individual feature parameters of the respective subjects detected from the currently-captured image data. The subject having the matching individual feature parameters is determined to be the main subject.

Then, in step S803, the image configuration determining process unit 212 determines whether the main subject exists in the image of the currently-captured image data on the basis of the search result obtained in step S802.

If a negative determination result is obtained in step S803, the process proceeds to step S804, where the image configuration determining process unit 212 substitutes a reference value a1 for the maximum number of times of capturing/recording Cmax that is set for the individual feature parameters (step S406 in FIG. 27).

On the other hand, if a positive determination result is obtained in step S803, the process proceeds to step S805, where the image configuration determining process unit 212 substitutes a main subject corresponding value a2 for the maximum number of times of capturing/recording Cmax that is set for the individual feature parameters (step S406 in FIG. 27).

The main subject corresponding value a2 is a predetermined value larger than the reference value a1.

Therefore, during execution of the process illustrated in FIG. 27 as steps S708 and S709 in FIG. 30, when the main subject corresponding value a2 is substituted for the maximum number of times of capturing/recording Cmax, the maximum number of times of capturing/recording Cmax that is compared with the number of extracted units in step S406 is larger than that when the reference value a1 is substituted. That is, the upper limit of the number of times of capturing/recording until an image is determined to be exhausted becomes high as for the individual feature parameters as an image configuration forming element.

Accordingly, when an individual as a main subject is a subject, the number of times of capturing/recording increases. As a result, captured images including an individual set as a main subject can be recorded more than other captured images.

While the imaging system of this embodiment is being used, it is possible that a user moves the digital still camera 1 together with the pan/tilt head 10 to place it in a different positional state or in a different surrounding environment.

Also, the capturing history information held in the capturing history holding unit 213 is used to determine whether an image configuration has been exhausted or not, as described above.

If the imaging system (digital still camera 1 and pan/tilt head 10) is moved as described above, the image captured at the time is inevitably different from the image captured before the imaging system is moved even if the pan/tilt position is the same. Furthermore, depending on the surrounding environment, an individual as a subject can vary before/after the movement.

In view of the above-described conditions, the capturing history information obtained before movement has no reliability after the imaging system has been moved. Thus, after the imaging system has been moved, the capturing history information obtained before movement should not be used.

In such a case, for example, a user moves and places the imaging system and then clears (erases) the capturing history information held in the capturing history holding unit 213 by performing a predetermined operation on the digital still camera 1. Thereafter, in the digital still camera 1, capturing history information is newly formed by a capturing history information unit newly generated in accordance with automatic capturing/recording and is sequentially updated.

However, it is inconvenient for the user to clear the capturing history information every time the imaging system is moved. If the user forgets to clear the capturing history information, a captured image having an appropriate image configuration is not recorded disadvantageously.

In view of this, the capturing history information held in the capturing history holding unit 213 should be automatically cleared in accordance with a movement of the imaging system.

Figure 33:
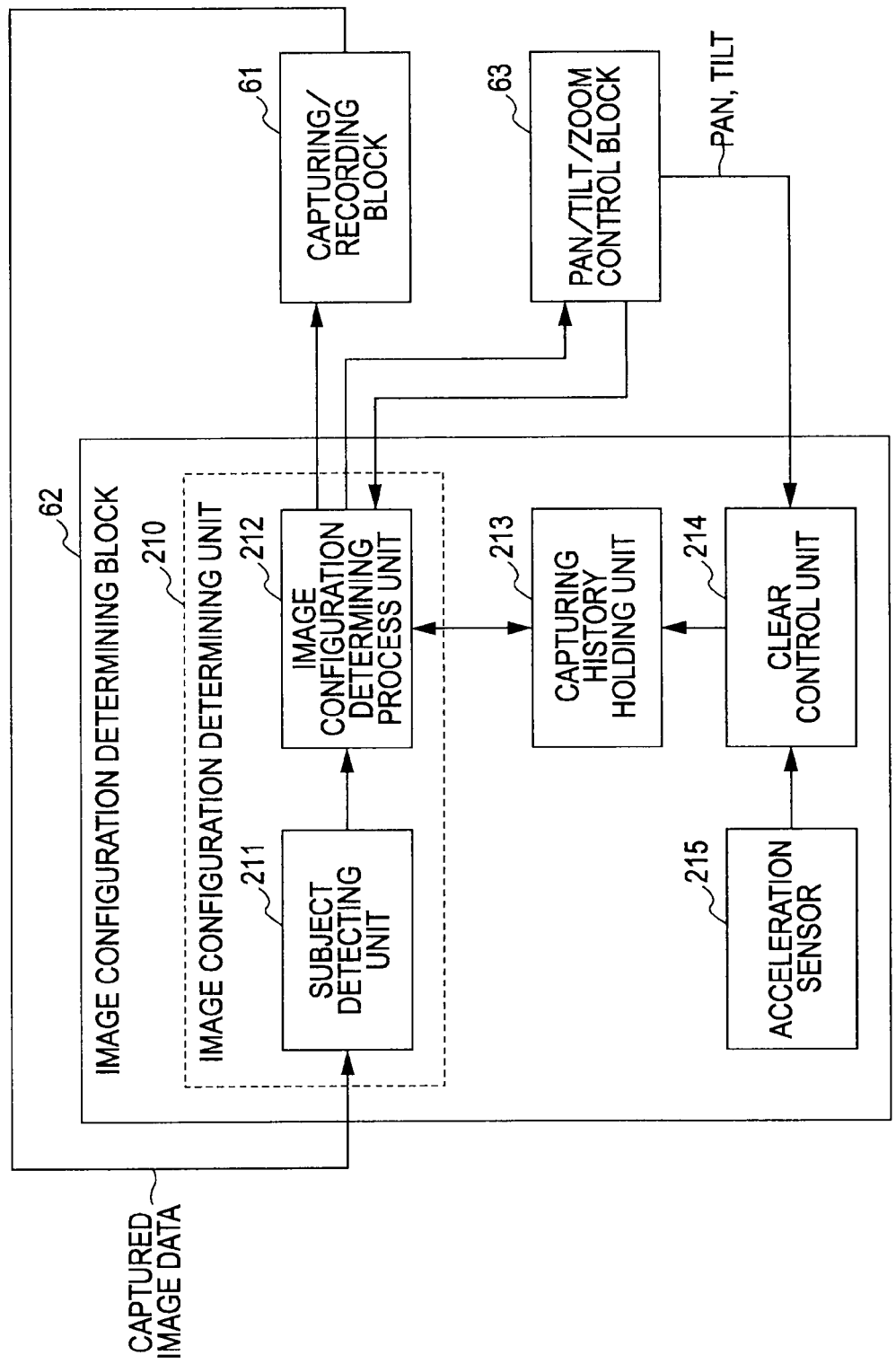
FIG. 33 illustrates an example of a structure of an image configuration determining block capable of clearing capturing history information.

FIG. 33 illustrates an example of a structure of the image configuration determining block 62 capable of automatically clearing capturing history information as described above. In FIG. 33, the parts same as those in FIG. 10 are denoted by the same reference numerals and the ///corresponding description is omitted.

In the image configuration determining block 62 illustrated in FIG. 33, a clear control unit 214 and an acceleration sensor 215 are additionally provided in the structure illustrated in FIG. 10.

The acceleration sensor 215 is actually fixed to a predetermined position of the digital still camera 1 and detects acceleration that occurs in itself, that is, a motion caused by a force applied to the digital still camera 1. A structure to detect a motion other than the acceleration sensor, such as a gyro sensor, may be adopted as long as the motion of the digital still camera 1 can be detected.

The clear control unit 214 executes a process of clearing the capturing history information held in the capturing history holding unit 213 on the basis of a pan/tilt control signal output from the pan/tilt/zoom control block 63 and an acceleration value detected in the acceleration sensor 215.

Figure 34:
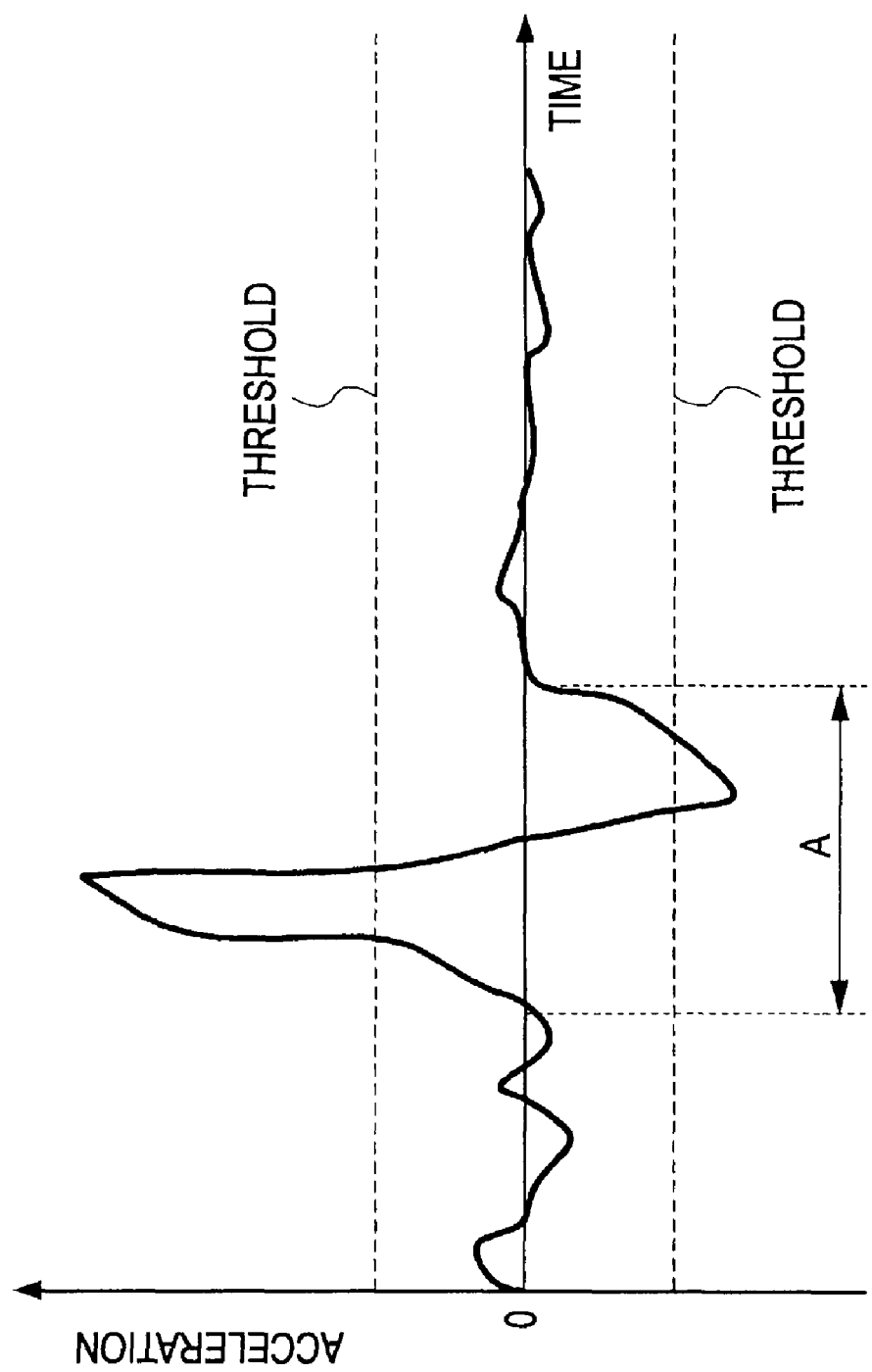
FIG. 34 illustrates comparison of acceleration values detected by an acceleration sensor in a stationary state and a state where the digital still camera is forcefully moved.

FIG. 34 illustrates changes in acceleration value detected in the acceleration sensor 215 over time. As an acceleration sensor, a sensor capable of detecting respective acceleration values in directions of three axes: X axis, Y axis, and Z axis, has been used. Such a sensor capable of performing detection in three axes may be adopted as the acceleration sensor 215 of this embodiment. In FIG. 34, however, acceleration values detected only in a single axis direction are illustrated in order to simplify the illustration for easy understanding.

For example, in the state where the digital still camera 1 is stationary while being fixed in a certain position and not being moved in a pan/tilt direction by the pan/tilt head 10 (stationary state), the acceleration value detected is substantially 0 as shown in the periods before/after period A in FIG. 34.

On the other hand, if a user holds and moves the digital still camera 1, for example, an acceleration value larger than that in the stationary state occurs as shown in period A in FIG. 34.

Then, a threshold is set as illustrated in FIG. 34 in view of a typical and average acceleration value that can be obtained when a user holds and moves the digital still camera 1 and a typical and average acceleration value that can be obtained in the stationary state. Then, the threshold is compared with a detected acceleration value. If the absolute value of the acceleration value exceeds the threshold, it can be determined that the digital still camera 1 (imaging system) is moved.

Figure 35:
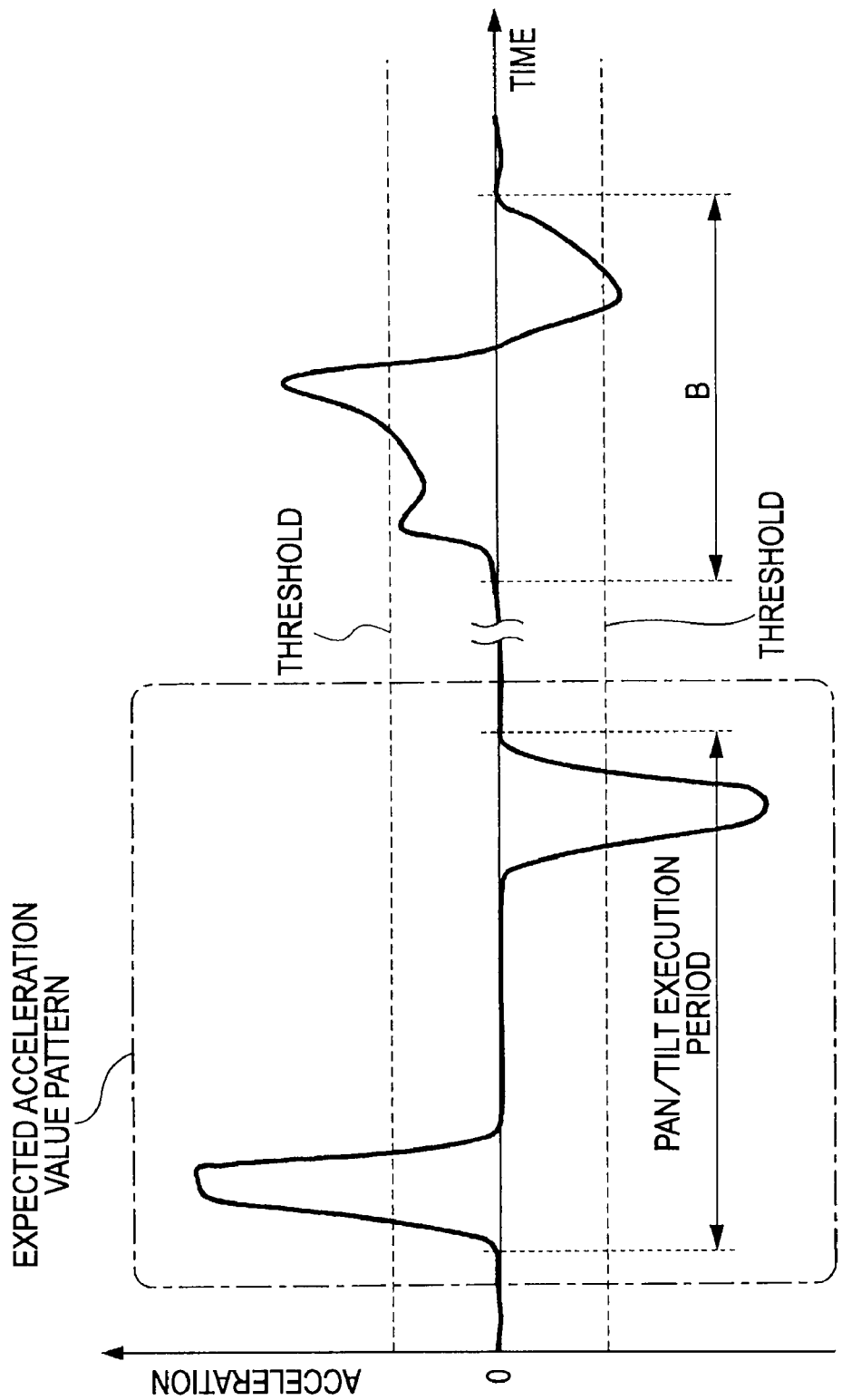
FIG. 35 illustrates an example of a pattern of acceleration values detected by the acceleration sensor when the digital still camera is being driven by the pan/tilt head.

FIG. 35 also illustrates changes in acceleration value detected in the acceleration sensor 215 over time.

For example, assume that the digital still camera 1 is moved by the pan/tilt head 10 under the state where the digital still camera 1 is attached to the pan/tilt head 10 and is set at a fixed point.

The velocity and activation of motions in the pan and tilt directions caused by the pan/tilt head 10 are predetermined. Therefore, the pattern of acceleration values detected by the acceleration sensor 215 in accordance with a motion of the pan/tilt head 10 in a pan/tilt direction under the state where the pan/tilt head 10 is not moved and is at a fixed position is substantially constant.

Such a pattern of acceleration values that can be obtained when the pan/tilt head 10 moves in a pan/tilt direction is illustrated as an expected acceleration value pattern surrounded by a chain line in FIG. 35. In a pan/tilt execution period when the pan/tilt head 10 is moving in a pan/tilt direction, a predetermined pattern of changes in acceleration value is obtained.

On the other hand, when a user moves the imaging system by holding it in hand in the state where the pan/tilt head 10 is moving in a pan/tilt direction, a component of an acceleration value caused by the movement of the imaging system by the user is combined into the expected acceleration value pattern. Thus, in this case, a pattern completely different from the expected acceleration value pattern appears as shown as an acceleration value pattern in period B in FIG. 35.

Figure 36:
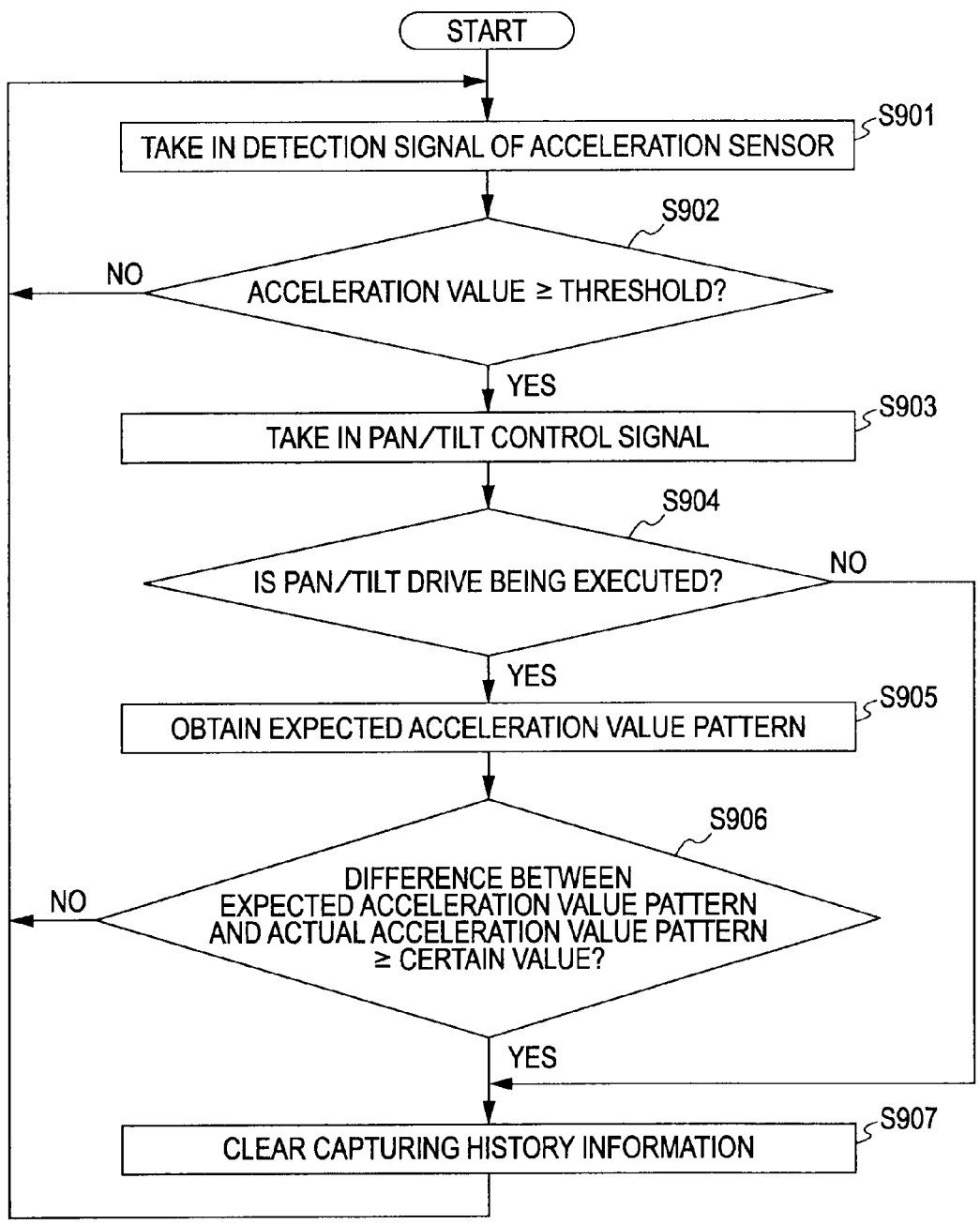
FIG. 36 is a flowchart illustrating an example of a process procedure to clear the capturing history information executed by a clear control unit illustrated in FIG. 33.

The flowchart in FIG. 36 illustrates an example of a process procedure executed by the clear control unit 214 illustrated in FIG. 33.

First, the clear control unit 214 takes in a detection signal output from the acceleration sensor 215 in step S901, and determines whether an acceleration value (absolute value) indicated by the detection signal that has been taken in is equal to or larger than the threshold in step S902.

If a negative determination result is obtained in step S902, it means that the digital still camera 1 is in the state where any motion according to movement in a pan/tilt direction does not occur and where any forced motion due to handling by a user does not occur. That is, the digital still camera 1 is in a stationary state. Thus, the process returns to step S901 in this case.

On the other hand, if a positive determination result is obtained in step S902, it is possible that the digital still camera 1 is being moved in a pan/tilt direction by the pan/tilt head 10 or is being forcefully moved. In this case, the process proceeds to step S903.

In step S903, the clear control unit 214 takes in a pan/tilt control signal from the pan/tilt/zoom control block 63.

Then, in step S904, the clear control unit 214 determines whether pan/tilt drive is currently being executed, that is, whether movement in a pan direction and/or a tilt direction by the pan/tilt head 10 is being executed. For example, if an effective pan/tilt control signal indicating that pan/tilt drive is being executed is not taken in step S903, it means that the pan/tilt/zoom control block 63 does not execute pan/tilt control and that the digital still camera 1 is not moved by the pan/tilt head 10 according to the pan/tilt control. In this case, a negative determination result is obtained in step S904. On the other hand, if an effective pan/tilt control signal is taken in step S903, it means that the digital still camera 1 is being moved by the pan/tilt head 10 accordingly, so that a positive determination result is obtained.

If a negative determination result is obtained in step S904, the clear control unit 214 skips steps S905 and S906 to step S907. If a positive determination result is obtained, the clear control unit 214 executes steps S905 and S906.

In the stage of step S905, it has been recognized that panning/tilting of the digital still camera 1 is being executed by the pan/tilt head 10, but it has not been determined whether the digital still camera 1 (and the pan/tilt head 10) is being forcefully moved in this panning/tilting state. Thus, this point is determined in steps S905 and S906.

For this purpose, the clear control unit 214 obtains the expected acceleration value pattern in step S905. Information of the expected acceleration value pattern is stored as preset data in the flash memory 30, for example. Thus, the expected acceleration value pattern can be obtained by reading the data.

In step S906, the clear control unit 214 compares the expected acceleration value pattern obtained in step S905 with an actual acceleration value pattern indicated by the detection signal taken in step S901, and determines whether the difference therebetween is equal to or larger than a certain value (whether approximation rate is at a certain value or lower).

If a negative determination result is obtained in step S906, the clear control unit 214 determines that a panning/tilting operation is being executed while the pan/tilt head 10 is not forcefully moved but is in the stationary state. In this case, the process returns to step S901.

On the other hand, if a positive determination result is obtained in step S906, it is determined that the pan/tilt head 10 is executing a panning/tilting operation and that the pan/tilt head 10 and the digital still camera 1 fixed thereto are forcefully being moved. In this case, the clear control unit 214 executes step S907.

In this way, according to this embodiment, the state where the pan/tilt head 10 and the digital still camera 1 fixed thereto are being moved by a force other than that of the pan/tilt mechanism (movable mechanism unit) of the pan/tilt head 10 can be properly detected even when a panning/tilting operation is being executed.

As can be understood from the description given above, the process reaches step S907 when the pan/tilt head 10 and the digital still camera 1 fixed thereto are forcefully being moved regardless of that the pan/tilt head 10 is executing a panning/tilting operation or not.

In step S907, the clear control unit 214 executes a process to clear (erase) the capturing history information held in the capturing history holding unit 213.

Next, modifications of the imaging system according to the above-described embodiment are described with reference to FIGS. 37 and 38.

Figure 37:
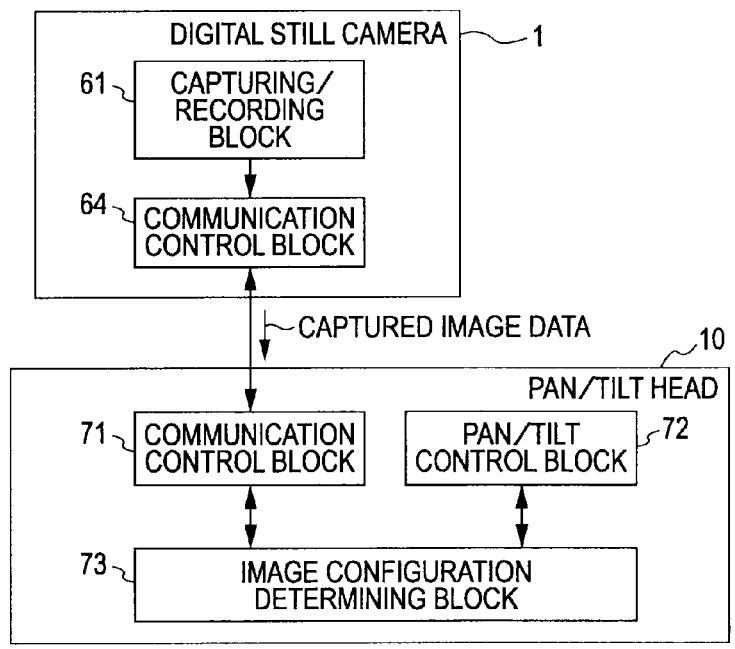
FIG. 37 is a block diagram illustrating another example of the internal structure of the imaging system of the embodiment.

Referring to FIG. 37, in the digital still camera 1, captured image data obtained by the capturing/recording block 61 is transmitted from the communication control block 64 to the communication control block 71 in the pan/tilt head 10.

Also, FIG. 37 illustrates the communication control block 71, the pan/tilt control block 72, and an image configuration determining block 73 as a structure of the pan/tilt head 10.

The captured image data received by the communication control block 71 is output to the image configuration determining block 73. The image configuration determining block 73 has a structure corresponding to that of the image configuration determining block 62 illustrated in FIGS. 9, 10, and 33, and executes an image configuration determining process on the basis of the captured image data input thereto. Also, in this case, the image configuration determining block 73 calculates a movement amount of the pan mechanism unit and the tilt mechanism unit to realize a capturing direction (capturing view angle) to obtain a determined appropriate image configuration, and outputs a pan/tilt control signal indicating the movement amount to the pan/tilt control block 72. Accordingly, panning/tilting is performed to obtain the appropriate image configuration determined by the image configuration determining block 73.

As described above, in the imaging system illustrated in FIG. 37, captured image data is transmitted from the digital still camera 1 to the pan/tilt head 10, and then an image configuration is determined on the basis of the captured image data and pan/tilt control is executed in accordance with the determination in the pan/tilt head 10.

In order to enable zoom (angle of view) control as control of a capturing view angle in the structure illustrated in FIG. 37, an angle of view according to the appropriate image configuration determined by the image configuration determining block 73 of the pan/tilt head 10 may be transmitted to the capturing/recording block 61 through communication between the communication control blocks 64 and 71, and the capturing/recording block 61 may drive the zoom lens so as to obtain the angle of view.

Figure 38:
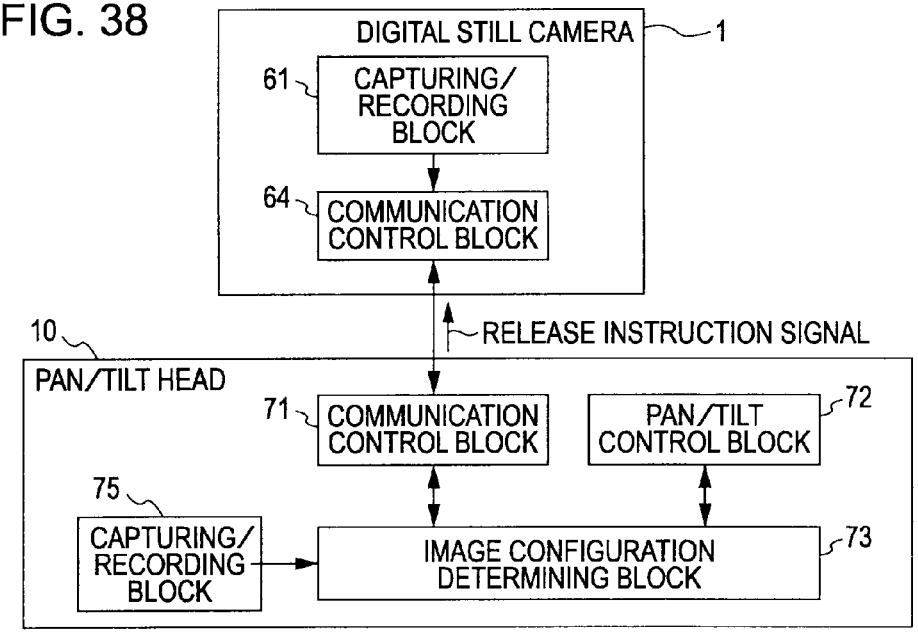
FIG. 38 is a block diagram illustrating another example of the internal structure of the imaging system of the embodiment.

FIG. 38 illustrates an example of a structure as another modification of the imaging system according to this embodiment. In FIG. 38, the parts same as those in FIG. 37 are denoted by the same reference numerals, and the corresponding description is omitted.

In this system, the pan/tilt head 10 includes a capturing/recording block 75. As the capturing/recording block 61 illustrated in FIGS. 9, 10, and 33, the capturing/recording block 75 includes an optical system and an imaging device (image sensor) to capture images so as to obtain a signal based on imaging light (image signal), and also includes a signal processing unit to generate captured image data from the image signal and a recording control system for the captured image data.

The captured image data generated by the capturing/recording block 75 is output to the image configuration determining block 73.

The direction in which the capturing/recording block 75 captures imaging light (capturing direction) should preferably be the same as the capturing direction of the digital still camera 1 attached to the pan/tilt head 10 as much as possible. That is, the capturing/recording block 75 is provided in the pan/tilt head 10 so that an image captured by the capturing/recording block 75 is the same as an image captured by the capturing/recording block 61 of the digital still camera 1 as much as possible.

In this case, the image configuration determining block 73 and the pan/tilt control block 72 execute determination of an image configuration and drive control of the pan/tilt mechanism according to an image configuration determination result in the same manner as described above with reference to FIG. 37.

Note that, in this case, the image configuration determining block 73 allows the communication control block 71 to transmit an instruction signal to instruct the digital still camera 1 to execute capturing/recording according to the timing to allow the digital still camera 1 to execute capturing/recording. The digital still camera 1 executes capturing/recording by receiving the instruction signal, so that the image data obtained at the time by the capturing/recording block 61 is captured/recorded.

In this way, in the other modification, all the control and process about image configuration determination and image configuration acquisition control except execution of capturing/recording can be performed on the side of the pan/tilt head 10.

In the description given above, pan control and tilt control are executed by controlling the motion of the pan/tilt mechanism of the pan/tilt head 10. Alternatively, instead of using the pan/tilt head 10, imaging light reflected by a reflective mirror may be allowed to enter the optical system unit 21 of the digital still camera 1, and the reflected light may be moved to obtain a result of panning/tinting as an image obtained based on the imaging light.

Also, a result equivalent to that of panning/tilting can be obtained by executing control of shifting, in horizontal and vertical directions, a pixel area to take in an image signal effective as an image from the imaging device (image sensor 22) of the digital still camera 1. In this case, the pan/tilt head 10 or another device for panning/tilting other than the digital still camera 1 is unnecessary, and the operations corresponding to the image configuration acquisition control of this embodiment can be completed only by the digital still camera 1.

Also, angle-of-view control (zoom control) can be realized by executing image processing of extracting a part of image area from captured image data, instead of driving the zoom lens.

Also, panning/tilting can be performed by providing a mechanism capable of changing an optical axis of the lens in the optical system unit of the digital still camera 1 in a horizontal/vertical direction and by controlling the motion of this mechanism.

In the imaging system according to the above-described embodiment, seven parameters are adopted as image configuration forming elements: pan/tilt position information, the number of subjects, individual feature parameters, in-frame position information, size information (subject size), face orientation information, and expression information. Also, other parameters can be adopted as the image configuration forming elements.

For example, parameters about image data itself, such as brightness (luminance) of the image, color information, and contrast, can be adopted as the image configuration forming elements. For example, when brightness (luminance) and color information of the image are used as parameters, a change in brightness or color of the image due to a change in lighting in the surrounding environment generates a different image configuration even if the subject and composition do not change.

In the description given above, the imaging system includes the pan/tilt head 10 and the digital still camera 1 attached thereto. However, the structure of capturing/recording based on the image configuration determination and an image configuration determination result according to this embodiment can be realized only by the digital still camera 1 without the pan/tilt head 10.

That is, even in the state where the digital still camera 1 of this embodiment is placed while being fixed, an image configuration is determined in accordance with an image captured there, whereby automatic capturing/recording is executed in accordance with the determination result. Such a manner of using the digital still camera 1 is sufficiently useful depending on a situation.

Next, a description is given about examples of applying the basic structure of image configuration determination of this embodiment described above with reference to FIGS. 2 and 3 to an apparatus other than the above-described imaging system.

Figure 39:
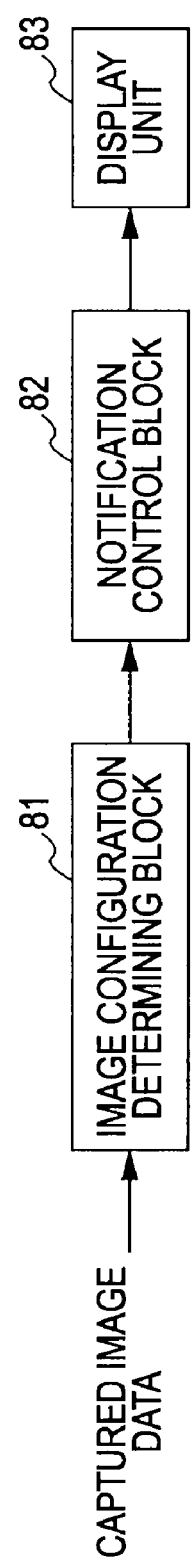
FIG. 39 is a block diagram illustrating an application example of the image configuration determining block in an embodiment other than the imaging system.

First, referring to FIG. 39, the structure of determining an image configuration of this embodiment is applied to a single imaging apparatus, such as a digital still camera. When an image captured by the imaging apparatus in a capturing mode has an appropriate image configuration according to a determination result, the imaging apparatus notifies the user of that fact by displaying it.

For this purpose, the imaging apparatus includes an image configuration determining block 81, a notification control block 82, and a display unit 83. The image configuration determining block 81 has a structure as the image configuration determining block 200 illustrated in FIG. 2.

For example, assume that the user holds the imaging apparatus in his/her hand by setting the imaging apparatus to a capturing mode and that capturing/recording can be executed anytime by a release operation (shutter button operation).

Under such a state, the image configuration determining block 81 takes in captured image data obtained through capturing at the time, executes a series of processes to determine an image configuration, and determines an appropriate image configuration.

Furthermore, the image configuration determining block 81 determines a matching degree and similarity between the image configuration of the captured image data actually obtained at the time and the determined appropriate image configuration. If a certain degree or more of similarity is obtained, the image configuration determining block 81 determines that the image content of the captured image data actually obtained through capturing has the appropriate image configuration. For example, according to an algorithm used in an actual case, if a certain degree or more of similarity that is sufficient to determine the matching between the image configuration of the captured image data and the appropriate image configuration is obtained, the image configuration is determined to be appropriate. Various algorithms can be applied to determine the matching degree and similarity. The algorithm varies depending on the adopted image configuration forming elements, and thus a specific example thereof is not particularly described here.

Information of a determination result indicating that the image content of the captured image data has an appropriate image configuration is output to the notification control block 82. In response to the input of the above-described information, the notification control block 82 executes display control to allow the display unit 83 to perform display in a predetermined form to notify the user that the image currently captured has an appropriate image configuration. The notification control block 82 is realized by a display control function including a microcomputer (CPU) in the imaging apparatus and a display image processing function to realize display of an image in the display unit 83. The notification about the appropriate image configuration given to the user may be realized by sound, such as an electronic sound or a synthesized sound.

The display unit 83 corresponds to the display unit 33 of the digital still camera 1 of this embodiment. For example, a display panel is provided at a predetermined position of the imaging apparatus while being exposed on a surface of the imaging apparatus. In a capturing mode, an image that is being captured at the time, called a through image, is typically displayed thereon. Thus, in the actual imaging apparatus, an image having content to notify the user that the image configuration is appropriate is displayed in the display unit 83 while being superimposed on the through image. The user performs a release operation when the notification about the appropriate image configuration is displayed. Accordingly, even if the user does not have sufficient knowledge or technique of photography, he/she can easily take a photo having an appropriate image configuration, that is, favorable image content.

Figure 40:
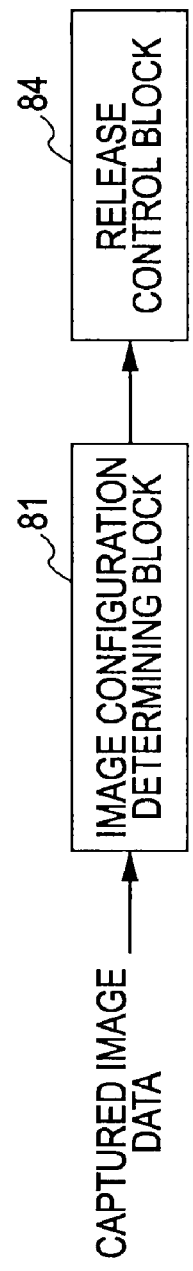
FIG. 40 is a block diagram illustrating an application example of the image configuration determining block in an embodiment other than the imaging system.

In the example illustrated in FIG. 40, as in the example illustrated in FIG. 39, the structure of determining an image configuration according to the embodiment is applied to a single imaging apparatus, such as a digital still camera.

In the structure illustrated in FIG. 40, as in FIG. 39, the image configuration determining block 81 executes a process of determining an appropriate image configuration on the basis of captured image data input thereto, determines which is an appropriate image configuration on the basis of image content of captured image data obtained in the timing thereafter, and then determines that the image content of the captured image data obtains the determined appropriate image configuration. Then, when determining that the captured image data has the appropriate image configuration, the image configuration determining block 81 notifies a release control block 84 of that fact.

The release control block 84 executes control to record captured image data (capturing/recording) and is realized by control executed by a microcomputer included in the imaging apparatus, for example. By receiving the above-described notification, the release control block 84 executes an image signal process and a recording control process so that the captured image data obtained at the time is stored in a storage medium or the like.

With this structure, when the user captures an image by holding the digital still camera 1 by his/her hand, a captured image can be automatically recorded at the timing when the captured image has image content having an appropriate image configuration.

The structures illustrated in FIGS. 39 and 40 can be applied to any still camera including the digital still camera. Also, the structures can be applied to a so-called silver-salt camera to record a captured image on a silver-salt film if the silver-salt camera is provided with an image sensor to take in imaging light obtained from an optical system by dividing the light and a digital image signal processing unit to receive and process a signal from the image sensor.

Figure 41:
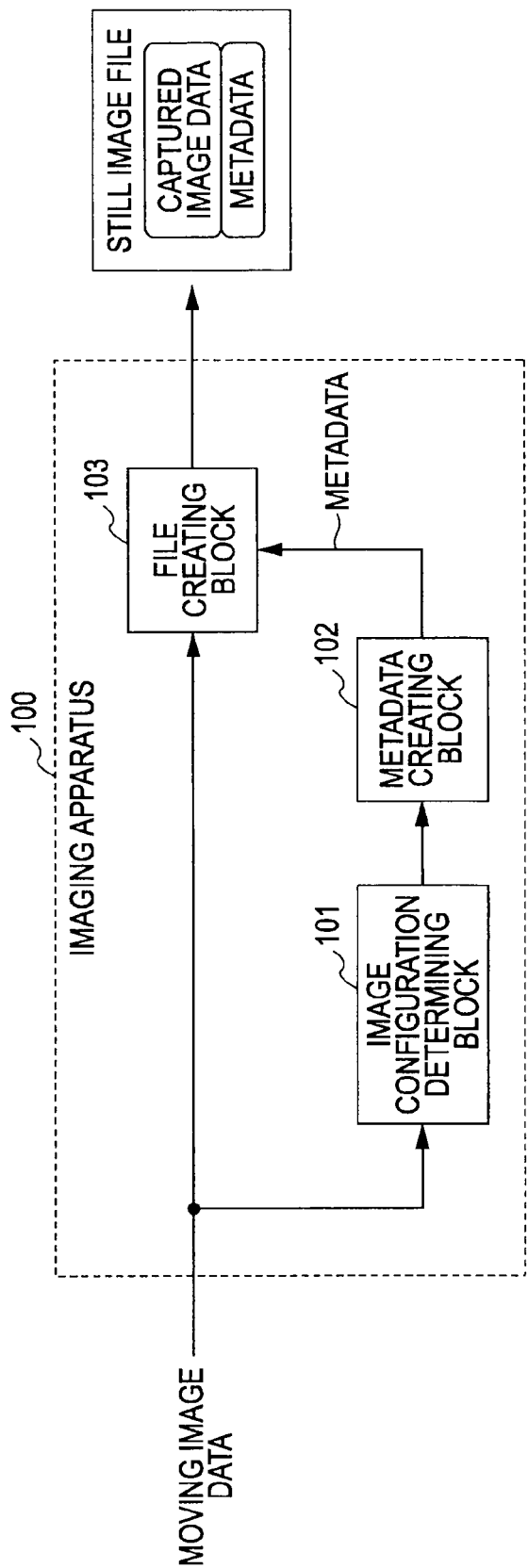
FIG. 41 is a block diagram illustrating an application example of the image configuration determining block in an embodiment other than the imaging system.

FIG. 41 illustrates an example of a structure in which the basic structure of image configuration determination of the embodiment is applied to an imaging apparatus such as a digital still camera. An imaging apparatus 100 illustrated in FIG. 41 includes an image configuration determining block 101, a metadata creating block 102, and a file creating block 103, as illustrated. Here, the image configuration determining block 101 corresponds to the image configuration determining block 200 illustrated in FIG. 2.

Captured image data obtained through capturing by a capturing/recording block (not illustrated here) is input to the image configuration determining block 101 and the file creating block 103 in the imaging apparatus 100. In this case, the captured image data input to the imaging apparatus 100 is captured image data that is to be stored in a storage medium in accordance with a release operation or the like, and is generated on the basis of an image signal obtained through capturing by the capturing/recording block (not illustrated here).

First, the image configuration determining block 101 executes an image configuration determining process constantly and repeatedly.

As the image configuration determining process in this case, a process is further executed to specify an image portion having a predetermined length-to-width ratio where the determined appropriate image configuration can be obtained (trimming image portion) in the entire image area of the input captured image data on the basis of a determination result. Then, the image configuration determining block 101 outputs information indicating the specified trimming image portion to the metadata creating block 102.

During execution of such a process, the image configuration determining block 101 holds history information of determination results (determination result history information). If a determined image configuration has been exhausted in the determination result history information, the image configuration determining block 101 does not specify a trimming image portion on the basis of the same image configuration determination result thereafter, as in FIG. 3. Alternatively, as in FIG. 4, the image configuration determining block 101 changes the image configuration determining algorithm and then executes an image configuration determining process and specification of a trimming image portion.

The metadata creating block 102 creates metadata (edit metadata) including information necessary to obtain an image having an appropriate image configuration from corresponding captured image data on the basis of the information input thereto, and outputs the metadata to the file creating block 103. The edit metadata is information indicating the trimming image portion in the image as corresponding captured image data, for example.

In the imaging apparatus 100 illustrated in FIG. 41, captured image data is recorded on a storage medium so as to be managed as a still image file in a predetermined format. Thus, the file creating block 103 converts the captured image data to a still image file format (create a file).

The file creating block 103 performs image compression coding corresponding to an image file format on the captured image data input thereto, so as to create a file main body including the captured image data. Also, the file creating block 103 creates a data portion including a header and an additional information block by storing the edit metadata input from the metadata creating block 102 in a predetermined storage position. Then, the file creating block 103 creates a still image file by using the file main body, header, and additional information block, and outputs the still image file. Accordingly, the still image file including the captured image data and metadata (edit metadata) can be obtained as a still image file to be recorded on the storage medium, as illustrated.

Figure 42:
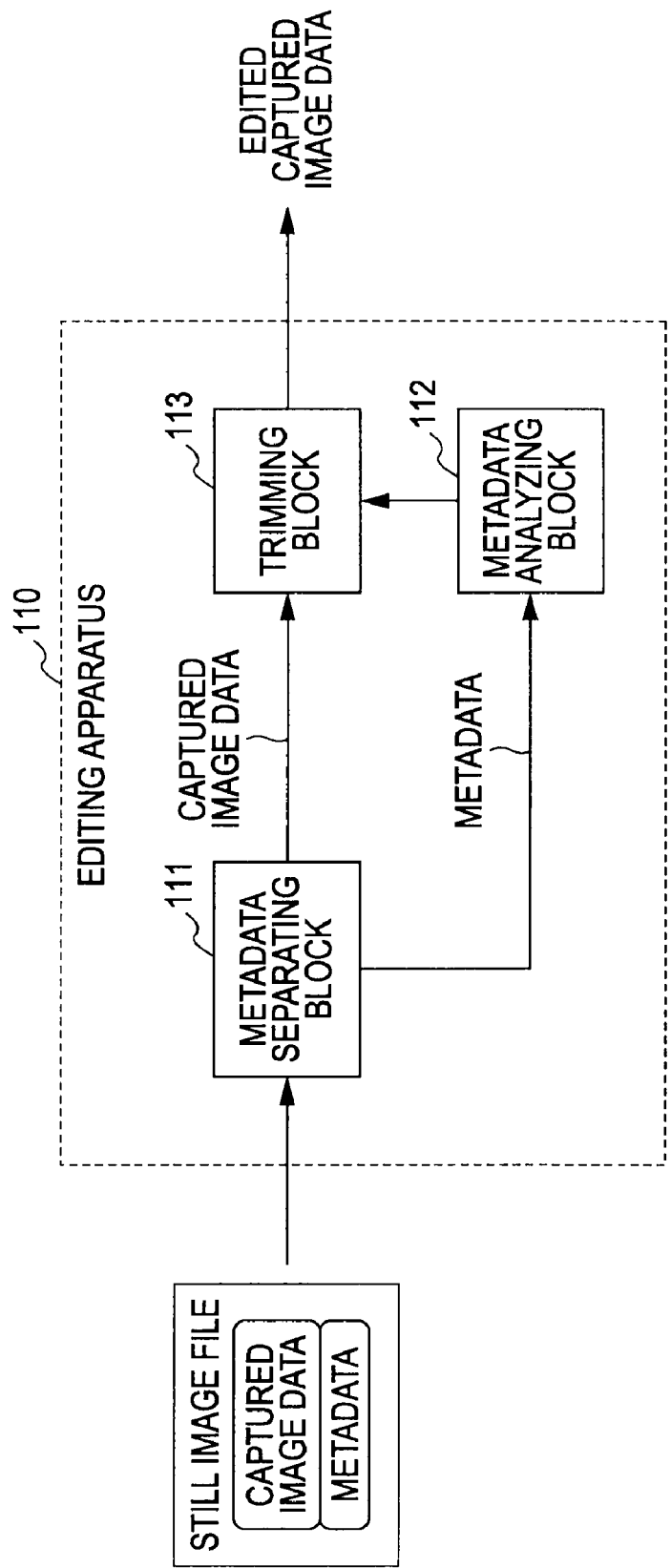
FIG. 42 is a block diagram illustrating an example of a structure of an editing apparatus corresponding to the imaging apparatus illustrated in FIG. 41.

FIG. 42 illustrates an example of a structure of an editing apparatus to edit the still image file created by the apparatus illustrated in FIG. 41.

An editing apparatus 110 illustrated in FIG. 42 takes in data of the still image file and inputs the data to a metadata separating block 111. The metadata separating block 111 separates the captured image data corresponding to the file main body from the metadata in the data of the still image file. The metadata obtained through the separation is output to a metadata analyzing block 112, whereas the captured image data is output to a trimming block 113.

The metadata analyzing block 112 executes a process of analyzing the metadata that is taken in. When analyzing the edit metadata in the analyzing process, the metadata analyzing block 112 recognizes a trimming image portion where an appropriate image configuration can be obtained. Then, the metadata analyzing block 112 outputs trimming instruction information about trimming of the recognized image portion to the trimming block 113.

The trimming block 113 executes an image process to extract the image portion indicated by the trimming instruction information input from the metadata analyzing block 112 from the captured image data input from the metadata separating block ill, and outputs the extracted image portion as edited captured image data, which is a piece of independent image data.

According to a system including the imaging apparatus and the editing apparatus illustrated in FIGS. 41 and 42, original still image data obtained through capturing (captured image data) can be stored without being processed, and also edit can be performed by extracting an image portion corresponding to an appropriate image configuration from the original still image data by using metadata. Furthermore, such an image portion to be extracted corresponding to an appropriate image configuration can be automatically determined, so that the user can perform edit very easily.

The function of the editing apparatus illustrated in FIG. 42 can be an image editing function in an application to edit image data installed in a personal computer and an application to manage image data, for example.

Figure 43:
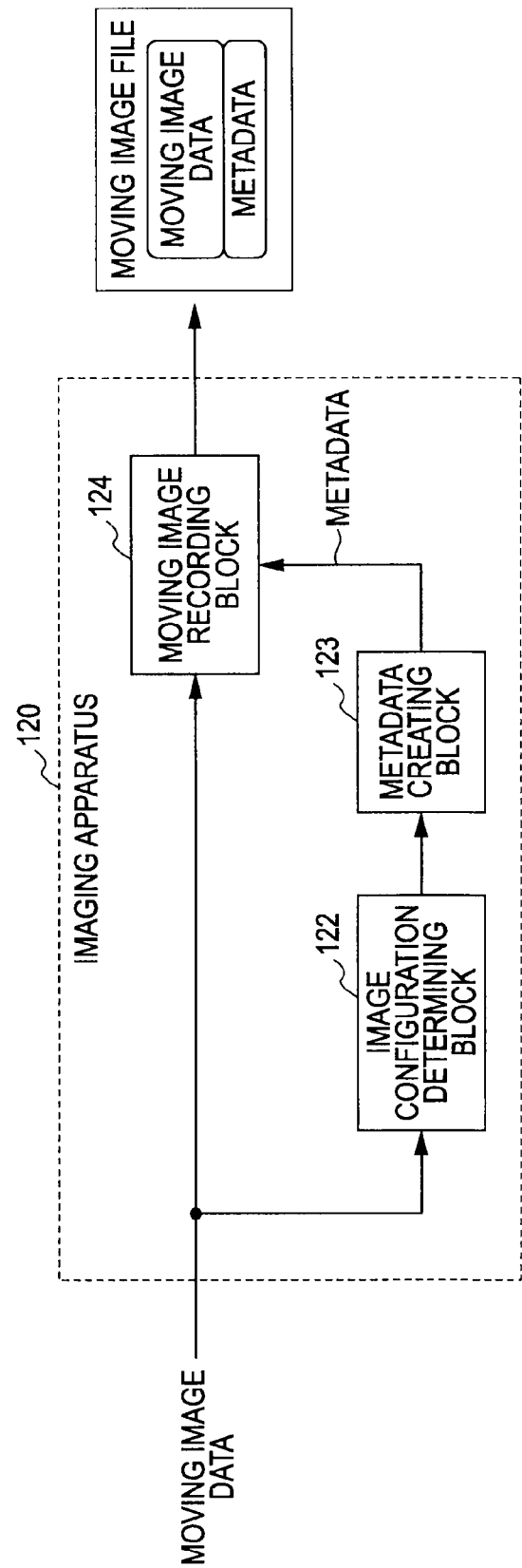
FIG. 43 is a block diagram illustrating an application example of the image configuration determining block in an embodiment other than the imaging system.

FIG. 43 illustrates an example of applying the structure of the image configuration determination of the embodiment to an imaging apparatus capable of capturing/recording moving images, such as a video camera.

Moving image data is input to an imaging apparatus 120 illustrated in FIG. 43. The moving image data is generated on the basis of an image signal obtained through capturing by an imaging unit included in the imaging apparatus 120. The moving image data is input to an image configuration determining block 122 and a moving image recording block 124 in the imaging apparatus 120.

In this case, the image configuration determining block 122 corresponds to the image configuration determining block 200 illustrated in FIG. 2. The image configuration determining block 122 constantly executes an image configuration determining process on images of moving image data input thereto. Furthermore, the image configuration determining block 122 compares the actual image content of the image of the moving image data with an appropriate image configuration obtained as a determination result, so as to determine the difference (similarity) therebetween and to make a good or bad determination.

As a result of the comparison, if the similarity between the image configuration obtained in the actually captured image and the determined appropriate image configuration has a certain value or more, the image configuration is determined to be favorable. On the other hand, if the similarity is lower than the certain value, the image is determined to be unfavorable.

When determining that the moving image data has a favorable image configuration, the image configuration determining block 122 outputs, to a metadata creating block 123, information (favorable image configuration section indicating information) indicating an image section where the favorable image configuration is obtained (favorable image configuration section) in the moving image data. The favorable image configuration section indicating information is information indicating a start position and an end position of the favorable image configuration section in the moving image data, for example.

Then, the image configuration determining block 122 holds determination result history information of the image configuration, but does not create the favorable image configuration section indicating information in accordance with a determination result of an exhausted image configuration on the basis of the determination result history information. Accordingly, images having a similar image configuration can be prevented from being specified as a favorable image configuration section.

In this case, the metadata creating block 123 generates various pieces of necessary metadata about the moving image data that is recorded as a file in a storage medium by the moving image recording block 124 described below. When receiving the favorable image configuration section indicating information from the image configuration determining block 122 as described above, the metadata creating block 123 generates metadata indicating that the image section indicated by the input favorable image configuration section indicating information has a favorable image configuration and outputs the metadata to the moving image recording block 124.

The moving image recording block 124 executes control to record the moving image data input thereto in a storage medium so that the moving image data is managed as a moving image file of a predetermined format. When metadata is output from the metadata creating block 123, the moving image recording block 124 executes control so that the metadata is recorded while being included in the metadata attached to the moving image file.

Accordingly, as illustrated in FIG. 43, the moving image file recorded on the storage medium includes the moving image data obtained through capturing and the metadata indicating the image section where a favorable image configuration is obtained.

The image section that is indicated by the metadata as described above and that has a favorable image configuration may be an image section of moving images having a certain time width or may be a still image extracted from the moving image data. Instead of the metadata, moving image data or still image data of the image section where a favorable image configuration is obtained may be generated, and the generated data may be recorded as secondary image data attached to the moving image file (or as a file independent of the moving image file).

In the structure in which the imaging apparatus 120 includes the image configuration determining block 122 as illustrated in FIG. 43, only the moving image section determined to be a favorable image configuration section by the image configuration determining block 122 may be recorded as a moving image file. Furthermore, image data corresponding to the image section determined to have a favorable image configuration by the image configuration determining block 122 may be output to an external apparatus through a data interface or the like.

Figure 44:
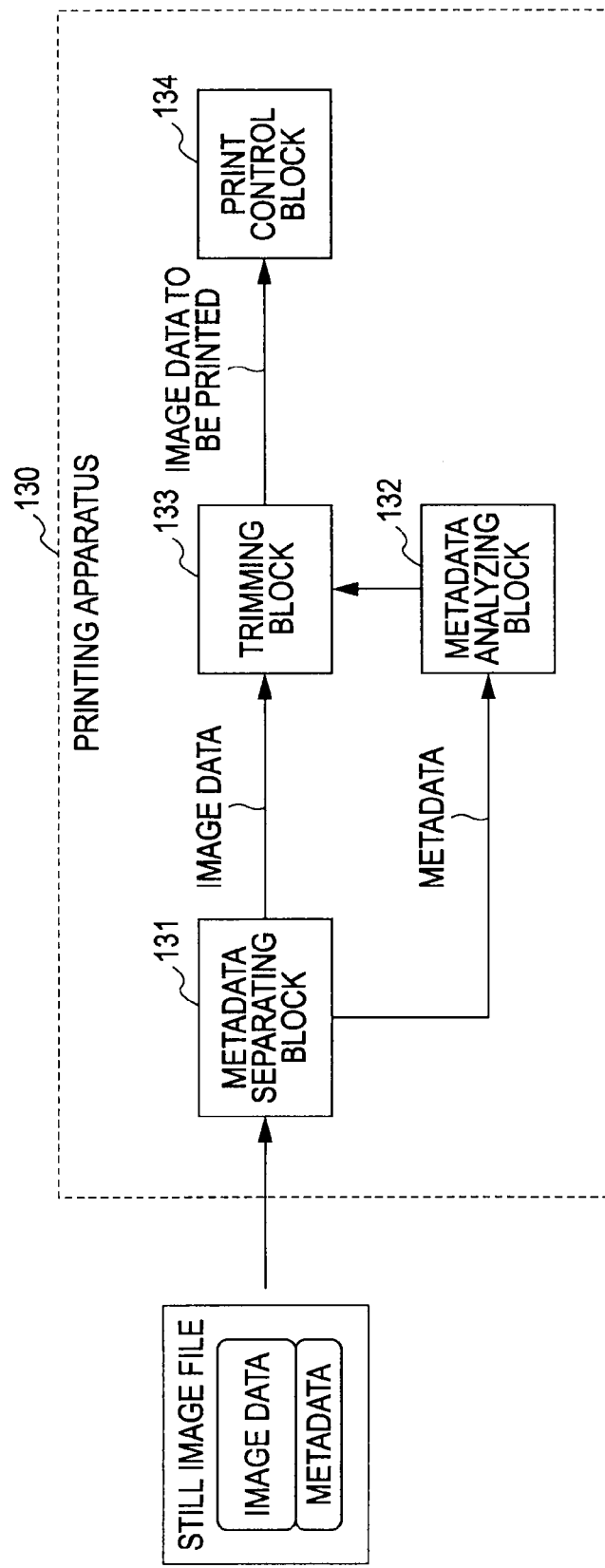
FIG. 44 is a block diagram illustrating an example of a structure of a printing apparatus corresponding to the imaging apparatus illustrated in FIG. 41.

Also, the printing apparatus 130 illustrated in FIG. 44 can be applied to an apparatus corresponding to the imaging apparatus 100 illustrated in FIG. 41, other than the editing apparatus illustrated in FIG. 42.

In this case, the printing apparatus 130 takes in a still image file as an image to be printed. The still image file includes a file generated and recorded by the imaging apparatus 100 and includes a substance of image data as a still image and metadata, as illustrated. Therefore, the metadata includes image configuration edit metadata of the same content as that in the still image file illustrated in FIGS. 41 and 42.

The file that has been taken in is input to a metadata separating block 131. Like the metadata separating block 111 illustrated in FIG. 42, the metadata separating block 131 separates the image data corresponding to the file main body from the metadata attached thereto in the data of the still image file. The metadata obtained through the separation is output to a metadata analyzing block 132, whereas the image data is output to a trimming block 133.

The metadata analyzing block 132 executes the analyzing process same as that executed by the metadata analyzing block 112 illustrated in FIG. 42 on the metadata that has been taken in, and outputs trimming instruction information to the trimming block 133.

Like the trimming block 113 illustrated in FIG. 42, the trimming block 133 executes an image process to extract an image portion indicated by the trimming instruction information input from the metadata analyzing block 132 from the image data input from the metadata separating block 131. Then, the trimming block 133 outputs, to a print control block 134, image data of a printing format generated from the extracted image portion as image data to be printed.

The print control block 134 executes control to operate a printing mechanism (not illustrated here) by using the input image data to be printed.

With this operation, an image portion having an appropriate image configuration is automatically extracted from the entire image of the input image data and is printed as an image in the printing apparatus 130.

The structure of the image configuration determination according to the embodiment of the present invention can be applied to various apparatuses, systems, and application software other than the imaging systems and imaging apparatuses described above.

The above-described embodiment is based on the assumption that a subject (target individual subject) is a person. However, the embodiment of the present invention can be applied to the case where a subject is an animal, not a person.

As described above, at least part of the structure based on the embodiment of the present invention can be realized by allowing a CPU or DSP to execute a program.

Such a program may be written and stored in a ROM or the like during manufacturing. Alternatively, the program may be stored in a removable storage medium and then stored in a nonvolatile storage area or the flash memory 30 compatible with the DSP by installing (including updating) it from the storage medium. Alternatively, the program may be installed via a data interface, such as a USB or IEEE 1394 under control by another host apparatus. Furthermore, the program may be stored in a storage device in a server on a network and may be obtained by downloaded it from the server by allowing the digital still camera 1 to have a network function.

The present application contains subject matter related to that disclosed in Japanese Priority Patent Application JP 2008-166243 filed in the Japan Patent Office on Jun. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image recording apparatus, comprising:
an imaging unit configured to obtain captured image data through capturing;
an image configuration determining unit configured to determine an image configuration of image content of the captured image data;
an image configuration acquisition control unit configured to execute image configuration acquisition control to obtain captured image data of image content in which the image configuration of the image content of the captured image data corresponds to a determined image configuration;
a capturing/recording unit configured to record the captured image data on a storage medium when the image configuration of the captured image data of the image content corresponding to the determined image configuration is obtained through execution of the image configuration acquisition control;
a capturing history information holding unit configured to hold capturing history information that is information about image configurations of respective pieces of captured image data recorded by the capturing/recording unit;
an image configuration exhaustion determining unit configured to determine whether the image configuration of the captured image data determined by the image configuration determining unit is the same as that of image data that has been recorded a predetermined number of times by referring to the capturing history information; and a recording setting unit configured to prevent recording by the capturing/recording unit of captured image data having the image configuration that is determined to have been recorded the predetermined number of times by the image configuration exhaustion determining unit.

2. The image recording apparatus according to claim 1, further comprising:

a mechanism control unit configured to control a mechanism unit to change a capturing view angle obtained by the imaging unit, wherein the image configuration acquisition control unit is configured to, as the image configuration acquisition control, control on the mechanism control unit in order to obtain a capturing view angle according to the determined image configuration.

3. The image recording apparatus according to claim 1, wherein the image configuration acquisition control unit is configured to wait to obtain image content having the image configuration determined for the captured image data, as the image configuration acquisition control.

4. The image recording apparatus according to claim 1, wherein the image configuration determining unit is configured to determine the appropriate image configuration by changing an algorithm to determine the image configuration when the image configuration exhaustion determining unit determines that recording has been executed the predetermined number of times.

5. The image recording apparatus according to claim 1, further comprising:

a predetermined number changing unit configured to change the predetermined number of times in accordance with image content of captured image data used in determination by the image configuration determining unit.

6. The image recording apparatus according to claim 1, further comprising:

a motion detecting unit configured to detect a motion of the image recording apparatus; and an erasing unit configured to erase the capturing history information held in the capturing history information holding unit when the motion detecting unit detects the motion of the image recording apparatus.

7. The image recording apparatus according to claim 6, wherein the motion detecting unit is configured not to detect, as motion, a motion of the image recording apparatus caused only by an operation of a mechanism unit, and when the mechanism unit is operating and when the image recording apparatus is moved by a force other than a force of the mechanism unit, the motion detecting is configured to detect the motion as motion.

8. An image recording apparatus, comprising:

an imaging unit for obtaining captured image data through capturing;

image configuration determining means for determining an image configuration of image content of the captured image data;

image configuration acquisition control means for executing image configuration acquisition control to obtain captured image data of image content in which the image configuration of the image content of the captured image data corresponds to a determined image configuration;

capturing/recording means for recording the captured image data on a storage medium when the image configuration of the captured image data of the image content corresponding to the determined image configuration is obtained through execution of the image configuration acquisition control;

capturing history information holding means for holding capturing history information that is information about image configurations of respective pieces of captured image data recorded by the capturing/recording means;

image configuration exhaustion determining means for determining whether the image configuration of the captured image data determined by the image configuration determining means is the same as that of image data that has been recorded a predetermined number of times by referring to the capturing history information; and recording setting means for preventing recording by the capturing/recording means of captured image data having the image configuration that is determined to have been recorded the predetermined number of times by the image configuration exhaustion determining means.

9. An image recording method, comprising:

determining an image configuration of image content of captured image data obtained by an imaging unit;

executing image configuration acquisition control to obtain captured image data of image content in which the image configuration of the image content of the captured image data corresponds to a determined image configuration;

recording the captured image data on a storage medium when the image configuration of the captured image data of the image content corresponding to the determined image configuration is obtained through execution of the image configuration acquisition control;

holding capturing history information that is information about image configurations of respective pieces of captured image data recorded in the recording;

determining whether the image configuration of the captured image data determined in the determining is the same as that of image data that has been recorded a predetermined number of times by referring to the capturing history information; and preventing recording by the recording of captured image data having the image configuration that is determined to have been recorded the predetermined number of times by the determining.

10. A program encoded on a non-transitory readable medium that when executed by an image recording apparatus causes the image recording apparatus to perform the method comprising:

determining an image configuration of image content of captured image data obtained by an imaging unit;

executing image configuration acquisition control to obtain captured image data of image content in which the image configuration of the image content of the captured image data corresponds to a determined image configuration;

recording the captured image data on a storage medium when the image configuration of the captured image data of the image content corresponding to the determined image configuration is obtained through execution of the image configuration acquisition control;

holding capturing history information that is information about image configurations of respective pieces of captured image data recorded in the recording;

determining whether the image configuration of the captured image data determined in the determining is the same as that of image data that has been recorded a predetermined number of times by referring to the capturing history information; and preventing recording by the recording of captured image data having the image configuration that is determined to have been recorded the predetermined number of times by the determining.

11. An image processing apparatus, comprising:

image configuration determining means for determining an image configuration of image content of image data that is taken in;

image configuration acquisition control means for executing image configuration acquisition control to obtain image data of image content in which the image configuration of the image content of the image data corresponds to a determined image configuration;

image data using means for using the image data when the image configuration of the image data of the image content corresponding to the determined image configuration is obtained through execution of the image configuration acquisition control;

usage history information holding means for holding usage history information that is information about image configurations of respective pieces of image data used by the image data using means;

image configuration exhaustion determining means for determining whether the image configuration of the image data determined by the image configuration determining means is the same as that of image data that has been recorded a predetermined number of times by referring to the usage history information; and usage setting means for preventing usage by the image data using means of image data having the image configuration that is determined to have been recorded the predetermined number of times by the image configuration exhaustion determining means.

12. An image processing method, comprising:

determining an image configuration of image content of image data that is taken in;

executing image configuration acquisition control to obtain image data of image content in which the image configuration of the image content of the image data corresponds to a determined image configuration; using the image data when the image configuration of the image data of the image content corresponding to the determined image configuration is obtained through execution of the image configuration acquisition control;

holding usage history information that is information about image configurations of respective pieces of image data used in the using;

determining whether the image configuration of the image data determined in the determining is the same as that of image data that has been recorded a predetermined number of times by referring to the usage history information; and preventing usage of image data having the image configuration that is determined to have been recorded the predetermined number of times by the determining.

13. A program encoded on a non-transitory readable medium that when executed by an image recording apparatus causes the image recording apparatus to perform the method comprising:

determining an image configuration of image content of image data that is taken in;

executing image configuration acquisition control to obtain image data of image content in which the image configuration of the image content of the captured image data corresponds to a determined image configuration;

using the image data when the image configuration of the image data of the image content corresponding to the determined image configuration is obtained through execution of the image configuration acquisition control;

holding usage history information that is information about image configurations of respective pieces of image data used in the using;

determining whether the image configuration of the image data determined in the determining is the same as that of image data that has been recorded a predetermined number of times by referring to the usage history information; and preventing usage of image data having the image configuration that is determined to have been recorded the predetermined number of times by the determining.

14. An image processing apparatus comprising:

an image configuration determining unit configured to determine an image configuration of image content of image data that is taken in;

an image configuration acquisition control unit configured to execute image configuration acquisition control to obtain image data of image content in which the image configuration of the image content of the image data corresponds to a determined image configuration;

an image data using unit configured to use the image data when the image configuration of the image data of the image content corresponding to the determined image configuration is obtained through execution of the image configuration acquisition control;

a usage history information holding unit configured to hold usage history information that is information about image configurations of respective pieces of image data used by the image data using unit;

an image configuration exhaustion determining unit configured to determine whether the image configuration of the image data determined by the image configuration determining unit is the same as that of image data that has been recorded a predetermined number of times by referring to the usage history information; and a usage setting unit configured to prevent usage by the image data using unit of image data having the image configuration that is determined to have been recorded the predetermined number of times by the image configuration exhaustion determining unit.

* * * * *